US010158844B2

(12) United States Patent
Kovacovsky et al.

(10) Patent No.: US 10,158,844 B2
(45) Date of Patent: Dec. 18, 2018

(54) METHODS AND APPARATUS FOR SUPERPIXEL MODULATION WITH AMBIENT LIGHT SUPPRESSION

(71) Applicant: Photoneo s.r.o., Bratislava (SK)

(72) Inventors: Tomas Kovacovsky, Bratislava (SK); Jan Zizka, Bratislava (SK); Michal Maly, Lutila (SK)

(73) Assignee: Photoneo s.r.o., Bratislava (SK)

( * ) Notice: Subject to any disclaimer, the term of this patent is extended or adjusted under 35 U.S.C. 154(b) by 0 days.

(21) Appl. No.: 15/449,099

(22) Filed: Mar. 3, 2017

(65) Prior Publication Data

US 2017/0180703 A1   Jun. 22, 2017

Related U.S. Application Data

(63) Continuation-in-part of application No. PCT/IB2016/057572, filed on Dec. 13, 2016.
(Continued)

(51) Int. Cl.
*H04N 13/218* (2018.01)
*H04N 13/254* (2018.01)
(Continued)

(52) U.S. Cl.
CPC .......... *H04N 13/218* (2018.05); *G01S 7/493* (2013.01); *G01S 17/46* (2013.01); *G01S 17/89* (2013.01);
(Continued)

(58) Field of Classification Search
CPC .... H04N 13/218; H04N 5/3535; H04N 5/357; H04N 5/378; H04N 5/374;
(Continued)

(56) References Cited

U.S. PATENT DOCUMENTS 6,268,918 B1 * 7/2001 Tanabe .................. G01B 11/25
    348/E5.029
6,847,070 B2 * 1/2005 Fox ...................... H04N 5/3745
    250/208.1
(Continued)

FOREIGN PATENT DOCUMENTS

EP     1742462 A1   1/2007
WO   2015132726 A1   9/2015

OTHER PUBLICATIONS

Geng, J., Structured-light 3D surface imaging: a tutorial; published in Advances in Optics and Photonics, vol. 3, Issue 2, pp. 128-160, (2011), doi: 10.1364/AOP.3.000128.
(Continued)

*Primary Examiner* — Michael E Teitelbaum
*Assistant Examiner* — Sean N. Haiem
(74) *Attorney, Agent, or Firm* — Stephen R. Otis

(57) ABSTRACT

An imaging system with a light source controls the sensitivity of pixels to light, by performing both superpixel modulation and curtain modulation. The superpixel modulation may facilitate rapid data acquisition. The curtain modulation may suppress the effect of ambient light. In superpixel modulation, each pixel set may be modulated by a separate superpixel modulation signal that causes sensitivity of the pixel set to light to vary over time, and each superpixel may include a pixel from each pixel set. The curtain modulation may cause pixels in only a small region of the photodetector to be sensitive to light. The curtain modulation may cause the small region to move to track the dot of light, by changing which pixels are in the region. This invention may be used for 3D scanning.

20 Claims, 37 Drawing Sheets

Related U.S. Application Data

(60) Provisional application No. 62/266,653, filed on Dec. 13, 2015.

(51) Int. Cl.
| | |
|---|---|
| *H04N 5/353* | (2011.01) |
| *H04N 5/357* | (2011.01) |
| *G01S 17/89* | (2006.01) |
| *G01S 17/46* | (2006.01) |
| *G01S 7/493* | (2006.01) |
| *H04N 5/378* | (2011.01) |
| *H04N 5/374* | (2011.01) |
| *H04N 5/3745* | (2011.01) |
| *H04N 5/376* | (2011.01) |

(52) U.S. Cl.
CPC .......... *H04N 5/357* (2013.01); *H04N 5/3535* (2013.01); *H04N 5/374* (2013.01); *H04N 5/376* (2013.01); *H04N 5/378* (2013.01); *H04N 5/37452* (2013.01); *H04N 13/254* (2018.05)

(58) Field of Classification Search
CPC .. H04N 5/37452; H04N 5/376; H04N 13/254; G01S 17/46; G01S 17/89; G01S 7/493
USPC .......... 348/138, 46, 302, 308; 356/602, 634, 356/612; 382/103; 257/59
See application file for complete search history.

(56) References Cited

U.S. PATENT DOCUMENTS

| | | | | |
|---|---|---|---|---|
| 8,063,964 B2* | 11/2011 | Kozlowski | ......... | H04N 5/23245 250/208.1 |
| 2003/0227018 A1* | 12/2003 | Fox | ..................... | H04N 5/3594 257/59 |
| 2009/0128677 A1* | 5/2009 | Kozlowski | ......... | H04N 5/23245 348/308 |
| 2010/0073462 A1* | 3/2010 | Lee | ..................... | H04N 5/347 348/46 |
| 2012/0187275 A1* | 7/2012 | Shirai | .................... | G01B 11/24 250/201.4 |
| 2012/0262726 A1* | 10/2012 | Nemoto | ................. | G01B 11/03 356/612 |
| 2012/0263347 A1* | 10/2012 | Ichimaru | ................ | G01B 11/25 382/103 |
| 2012/0274744 A1* | 11/2012 | Wan | .................... | H04N 5/37452 348/46 |
| 2012/0287242 A1* | 11/2012 | Gilboa | .................... | G01S 17/89 348/46 |
| 2012/0314111 A1* | 12/2012 | Kyogoku | ............... | H04N 5/335 348/302 |
| 2013/0088726 A1* | 4/2013 | Goyal | .................. | G01S 7/4866 356/634 |

OTHER PUBLICATIONS

Kimachi, A., et al., Real-Time Phase-Stamp Range Finder Using Correlation Image Sensor; published in IEEE Sensors Journal, vol. 9, Issue 12, pp. 1784-1792 , Dec. 2009.

Wan, G., et al., CMOS Image Sensors With Multi-Bucket Pixels for Computational Photography; published in IEEE Journal of Solid-State Circuits, vol. 47, Issue 4, pp. 1031-1042, Feb. 2012.

Yoon, H. et al., A CMOS Image Sensor With In-Pixel Two-Stage Charge Transfer for Fluorescence Lifetime Imaging, published in IEEE Transactions on Electron Devices, vol. 56, Issue 2, pp. 214-221, Feb. 2009.

Goddyn, L., et al., Binary gray codes with long bit runs; published in The Electronic Journal of Combinatorics, vol. 10 (2003), Research Paper #R27.

Silva, J., et al., Pattern codification strategies in structured light systems; published in Pattern Recognition 37 (2004) pp. 827-849.

* cited by examiner

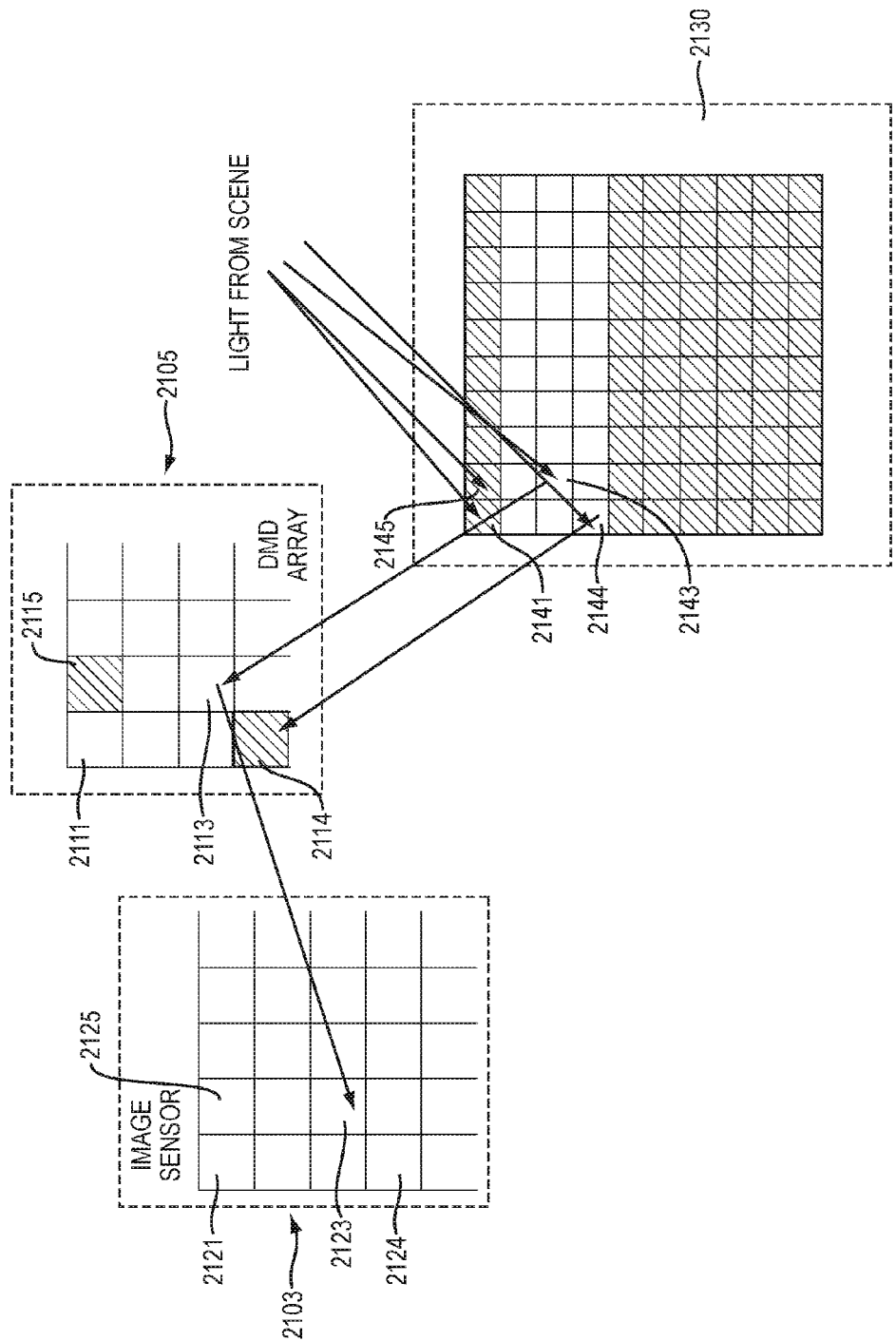

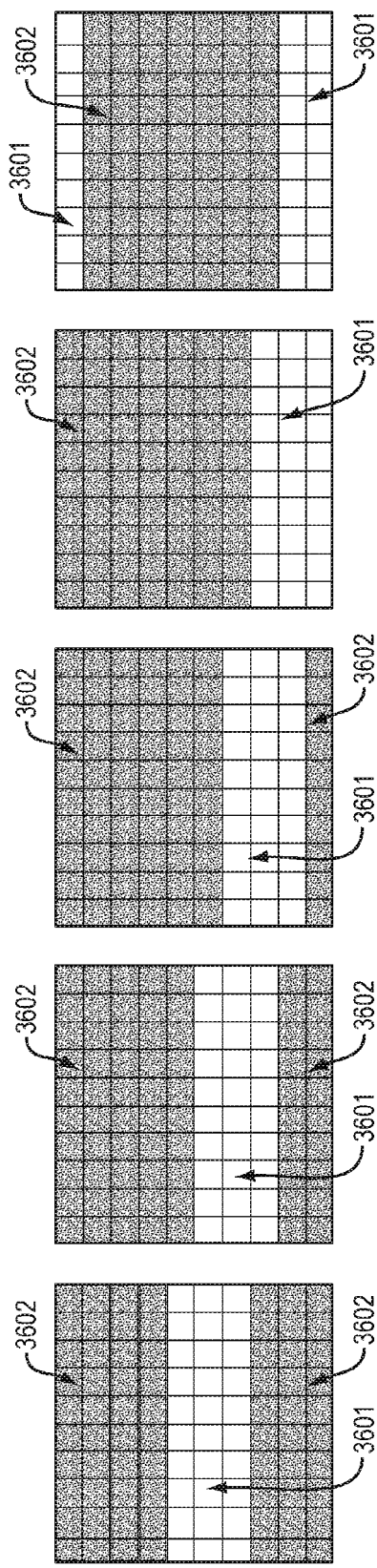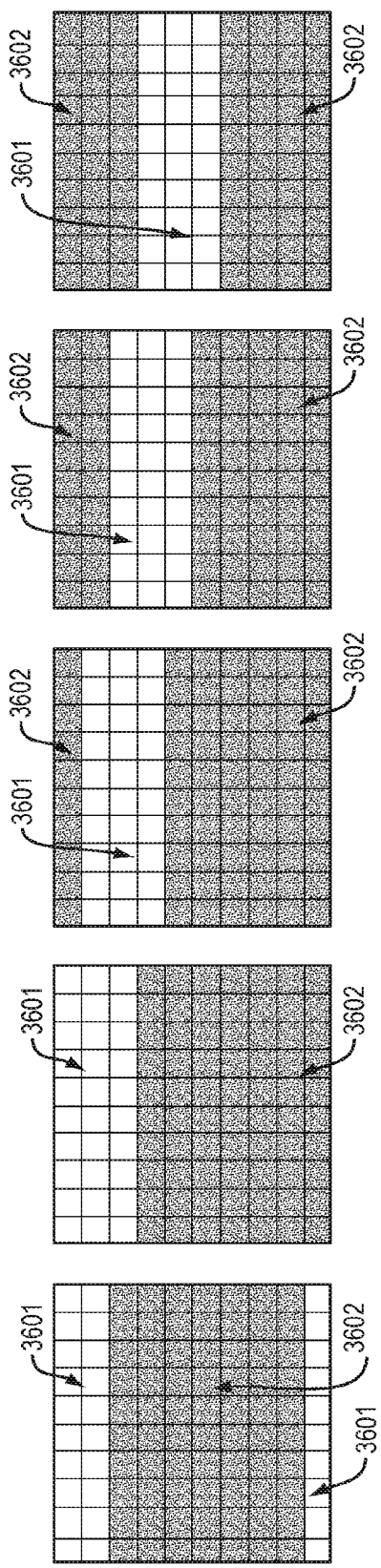
FIG. 38E
FIG. 38D
FIG. 38C
FIG. 38B
FIG. 38A
FIG. 38J
FIG. 38I
FIG. 38H
FIG. 38G
FIG. 38F

METHODS AND APPARATUS FOR SUPERPIXEL MODULATION WITH AMBIENT LIGHT SUPPRESSION

RELATED APPLICATIONS

This application is a continuation-in-part of International Application No. PCT/IB2016/057572 filed Dec. 13, 2016 (the "PCT Application"), which claims the priority of the filing date of U.S. Provisional Patent Application No. 62/266,653 filed Dec. 13, 2015 (the "Provisional Application"). The entire disclosure of the PCT Application and the Provisional Application are herein incorporated by reference.

FIELD OF THE TECHNOLOGY

The present invention relates generally to ambient light suppression and superpixel modulation.

SUMMARY

In illustrative implementations of this invention, a system includes a light source that illuminates a scene with collimated light, and a photodetector that measures light reflecting from the scene. In illustrative implementations, the sensitivity of the photodetector pixels to light may be modulated by two types of modulation, specifically: (a) what is sometimes called "curtain modulation" herein; and (b) what is sometimes called "superpixel modulation" herein. Signals that control curtain modulation are sometimes called "curtain modulation signals" herein. Signals that control superpixel modulation are sometimes called "superpixel modulation signals" herein.

In illustrative implementations of this invention, the photodetector includes multiple pixels (e.g., hundreds, thousands or millions of pixels). For example, the photodetector may comprise a CCD sensor or CMOS sensor in a camera.

In illustrative implementations, the curtain modulation may suppress or reduce the effect of ambient light. The curtain modulation may achieve this by modulating the sensitivity of photodetector pixels to light, while a moving dot of light is projected onto a scene.

In illustrative implementations, during curtain modulation, the light source may illuminate the scene with a beam of collimated light. The beam of collimated light may change orientation relative to the scene, such that the beam projects a moving dot of light unto the scene. This moving dot of light (which is illuminated by collimated light from the light source) may traverse a path through a scene during each frame of the photodetector. For example, the path (e.g., a zig-zag path) may include repeated movements along trajectories that are parallel to each other, but that are displaced from each other by a small displacement in a direction perpendicular to the parallel trajectories. For example, the path may include the dot of light making repeated vertical movements from bottom to top of the scene, with slight horizontal displacements between each vertical movement.

In illustrative implementations, a signal generator generates curtain modulation signals. While the moving dot of light is being projected onto the scene, the curtain modulation signals may cause a first region of the photodetector to include pixels that are sensitive to light and a second region of the photodetector to include only pixels that are not sensitive to light. The first region of the photodetector (which includes pixels that are sensitive to light) is sometimes called herein the "active region". The second region of the photodetector (which is not sensitive to light) is sometimes referred to herein as the "inactive region". In illustrative implementations, the inactive region is the remainder of the pixels in the photodetector; that is, pixels in the inactive region consist of all of the photodetector pixels that are not in the active region. In illustrative implementations, at any given time: (a) the active region includes pixels that are measuring light, and the inactive region does not include pixels that are measuring light.

The curtain modulation signals may modulate the sensitivity of pixels to light in such a way the active region is much smaller than the inactive region, and thus the number of pixels in the active region is much less than the number of pixels in the inactive region. For example, the curtain modulation signals may cause the active region to consist of a single row (or column) of pixels, in a photodetector with hundreds of rows (or columns) of pixels. Or, for example, the curtain modulation signals may cause the active region to consist of a less than twenty-one rows (or columns) of pixels, in a photodetector with hundreds of rows (or columns) of pixels.

The curtain modulation signals: (a) may cause the inactive region to comprise all pixels in the photodetector that are not included in the active region; and (b) may cause all of the pixels in the inactive region to not be sensitive to light.

In illustrative implementations, the curtain modulation signals may cause the active region and inactive region to move, relative to the photodetector, by changing which pixels are included in the active and inactive regions, respectively. This movement of the active and inactive regions may occur by modulating the sensitivity of pixels to light. In illustrative implementations, all pixels that are then sensitive to light are located in the active region, and no pixels that are then sensitive to light are located in the inactive region. As the active region and inactive regions move relative to the photodetector, this movement may cause different pixels to become, or to cease to be, sensitive to light. In many implementations: (a) the entire time that a pixel is located in the inactive region, the pixel is not sensitive to light; and (b) during multiple times while a pixel is located in the active region, the pixel is sensitive to light.

The curtain modulation signals may cause the active region to move relative to the photodetector such that the active region tracks the movement of the dot of light in the scene.

In some cases, the curtain modulation signals may cause the active region to move (relative to the photodetector) such that, while the dot of light moves (relative to the scene), a first percent is greater than a second percent, the first percent being the average percent contribution of the light source to the active region, and the second percent being the average percent contribution of the light source to the inactive region.

As used herein, "percent contribution of the light source" to a pixel means X percent, where X is 100 times the ratio of (i) irradiation at the pixel due to the light source and (iii) total irradiation at the pixel. As used herein, the "average percent contribution of the light source" to a given region means the average percent contribution of the light source to the pixels in the given region.

The curtain modulation signals: (a) may cause incident light to be measured only in the active region and not in the inactive region; and (b) thus may cause incident light to be measured where the average percent contribution of the light source is relatively high, and to not be measured where such contribution is relatively low.

In some cases: (a) the photodetector is a part of a camera; and (b) the curtain modulation signals cause the active region to move to different positions (relative to the photodetector) at different times such that, while the active region is in each of these positions, respectively, the active region overlaps an area of the photodetector which is receiving light that has traveled directly from the light source to the scene, reflected only once and, after reflecting, traveled directly from the scene to the camera. For example, a lens of the camera may focus this light (which came from the active light source via a single reflection from the scene) onto the area that is receiving the light.

In some cases: (a) a camera includes a light source and a photodetector; and (b) the curtain modulation signals cause the active region to move to different positions (relative to the photodetector) at different times such that, while the active region is in each of these positions, respectively, the active region overlaps a region of the photodetector that is receiving single-bounce light. To say that light travels in a "single-bounce path"—or to say that the light is "single-bounce light"—means that the light reflects only once during a path from a light source of a camera to a scene point and then from the scene point to the camera. Thus, single-bounce light travels directly from a light source of a camera to a scene point, and then reflects directly from the scene point to the camera. Note that any reflections that occur inside a camera are not counted for purposes of the definition of single-bounce light (because reflections inside a camera do not occur in the path from the camera to the scene and then from the scene to the camera). For example: (a) any reflections that occur inside a light source of a camera are not counted for purposes of the definition of single-bounce light; and (b) any reflections that occur inside a camera before reaching a photodetector of the camera are not counted for purposes of the definition of single-bounce light.

In some cases, the curtain modulation signals cause the active region to move to different positions (relative to the photodetector) at different times such that, while the active region is in each of these positions, respectively, a first irradiance is greater than a second irradiance, the first irradiance being the average per pixel irradiance due to the light source incident on the active region, and the second irradiance being the average per pixel irradiance due to the light source incident on the inactive region. The curtain modulation signals: (a) may cause incident light to be measured only in the active region and not in the inactive region; and (b) thus may cause incident light to be measured only where the average per pixel irradiation due to the light source is relatively high, and to not be measured where such contribution is relatively low.

Without being limited by theory: (a) light from the light source (which is collimated light while traveling to the scene) may reflect directly from the scene to the photodetector; (b) the radiant intensity of light (from the light source) that reflects from the surface may have an anistropic distribution—i.e., have a greater radiant intensity in some directions than in other directions; (c) this anistropic distribution may cause different regions of the photodetector to have different levels of irradiance of incident light contributed by the light source; and (d) the curtain modulation signals may cause the active region to track the moving dot of light, such that the active region is located in a relatively high irradiance region—specifically, such that, while the dot of light moves, the average per pixel irradiance (due to the light source) incident in the active region is greater than the average per pixel irradiance (due to the light source) incident in the inactive region.

In illustrative implementations, the curtain modulation may improve the signal-to-noise ratio. As used herein, "signal-to-noise ratio" or "SNR" means the ratio of a first quantity to a second quantity, where (i) the first quantity is average per-pixel irradiance due to light from the light source, and (ii) the second quantity is average per-pixel total irradiance minus the first quantity.

In some cases, the curtain modulation signals: (a) cause the active region to move to different positions (relative to the photodetector) at different times such that, while the active region is in each of these positions, respectively, the SNR of the active region is higher than the SNR of the inactive region; (b) cause the active region to include pixels that are then sensitive to light and cause the inactive region to consist only of pixels that are not then sensitive light; (c) thus cause light to be measured only in the active region (which has a higher SNR) and to not be measured in the inactive region (which has a lower SNR), and (d) thus improve (increase) the SNR.

In some cases, the curtain modulation signals cause the active region to move to different positions (relative to the photodetector) at different times such that, while the active region is in each of these positions, respectively, the active region overlaps one or more Hero Regions. As used herein, "Hero Region" means (in a context in which a light source emits collimated light that illuminates a scene and a photodetector detects light reflecting from the scene) a set of pixels of the photodetector such that—if collimated light were to travel directly from the light source to a specular planar surface located at a particular depth from the photodetector, which planar surface was parallel to a photodetector plane, and were to specularly reflect in accordance with the Law of Reflection directly from the planar surface to the photodetector—this set of pixels would receive such specularly reflected light. To say that the active region overlaps a Hero Region does not imply that such specular planar surface actually exists or that such specular reflection actually occurs. Instead, the phrase "Hero Region" defines a set of pixels in terms of where such reflected light would be received, if a posited specular reflection were to occur.

Note that "Hero Region" is defined herein such that there may be multiple Hero Regions at a given time, because: (a) each "Hero Region" is defined in terms of a specular reflection posited to occur at a particular scene depth; and (b) changes in scene depth at which the specular reflection posited in the definition of Hero Region were to occur would cause light to reflect to different positions in the photodetector.

As used herein, "Law of Reflection" means the law that applies to specular reflection and that states for each incident ray the angle of incidence equals the angle of reflection, and the incident, normal, and reflected directions are coplanar.

Without being limited by theory, the following observation may give the reader an intuitive understanding of a Hero Region. In typical use scenarios for this invention, many scene points are neither ideal specular reflectors nor ideal Lambertian reflectors, but instead are partially specular reflectors. Thus, in typical use scenarios, when collimated light from the light source strikes the scene: (a) a significant portion of the light may reflect in a direction that follows the specular Law of Reflection; (b) a relatively intense reflection of light from the scene may actually occur in the same direction as a purely specular reflection would occur, (c) a relatively intense illumination of the photodetector may actually occur in a region where purely specularly reflected light would strike the photodetector; and (d) where this actual intense illumination strikes the photodetector may depend in part on the scene depth at which reflection occurs. Thus, there may be multiple regions where this intense illumination of the photodetector could occur, depending in part on the scene depth at which the reflection occurred. These multiple regions may correspond to the multiple Hero Regions.

In illustrative implementations of this invention, at any given time, a significant portion of the collimated light striking the scene may be reflecting directly from the scene in accordance with the specular Law of Reflection. In some cases: (a) such reflected light may strike the scene anywhere in an elongated so-called "target area" of the photodetector; and (b) where, in this elongated target area, such light actually strikes the photodetector may depend in part on the actual depth at which the reflection occurs. The curtain modulation signals may cause the active region to be elongated and to move so that it overlaps the elongated target area mentioned in the preceding sentence. Hero Regions may be located in the elongated target area and thus may overlap the elongated active region.

In illustrative implementations, the location of Hero Regions (relative to the photodetector) may depend in part on the orientation (relative to the scene and the photodetector) of the beam of collimated light being emitted from the light source. Thus, as the beam of collimated light from the light source changes orientation relative to the scene and photodetector (and the dot of light projected onto the scene moves), the position of Hero Regions (relative to the photodetector) may change.

In some implementations of this invention, the curtain modulation signals and superpixel modulation signals cause the responsiveness to light of pixels in a photodetector to vary over time. In some implementations, curtain modulation signals cause average per-pixel responsiveness of pixels in the active region to be greater than in the inactive region, at least while the collimated beam of light is changing orientation relative to the scene.

As mentioned above, the curtain modulation signals may cause the active region to move relative to the photodetector, such that the active region tracks the movement of the dot of light that is being projected onto the scene by the light source. For example: (a) the active region may be a narrow horizontal region that comprises a single row (or a small number of rows) of pixels; (b) the dot of light may move vertically up in the scene; and (c) and the active region may move vertically up to track this vertical movement of the dot of light. Or, for example: (a) the active region may be a narrow vertical region that comprises a single column (or a small number of columns) of pixels; (b) the dot of light may move horizontally (to the left or right) in the scene; and (c) and the active region may move horizontally (to the left or right) to track this horizontal movement of the dot of light.

As mentioned above, the curtain modulation may cause the active and inactive regions to move relative to the photodetector, by changing which pixels are included in the active and inactive regions, respectively. However, in illustrative implementations, the photodetector and the pixels that comprise it may themselves be stationary while the active region and inactive region move.

Here is a non-limiting example of curtain modulation. In this non-limiting example: (a) a light source emits a collimated beam of light that projects a dot of light onto a scene; (b) the collimated beam of light changes orientation relative to the scene, such that the dot of light moves in a zig-zag pattern over the entire scene during a single frame of the photodetector; (b) in this zig-zag pattern, the dot of light moves up, then diagonally down and to the left, then up, then diagonally down and to the left, and so on; (c) the collimated beam of light (and dot of light that it projects) are "on" during the up movements, and "off" during the diagonal movements down and to the left; (d) while the dot of light is moving, an active region of the photodetector includes pixels that are then sensitive to light and an inactive region of the photodetectors includes only pixels that are not then sensitive to light; (e) the active region is a narrow, horizontal region of the photodetector (e.g., less than twenty-one horizontal rows of pixels) and the inactive region is all of the other pixels of the photodetector; (f) during each upward movement of the dot of light, the active region tracks the moving dot of light, such that the active region moves upward (relative to the photodetector) in synchrony with the upward movement of the dot of light (relative to the scene). In this non-limiting example, the curtain modulation signals may cause the active region to move upward (relative to the photodetector) while the dot of light moves upward (relative to the scene), such that any one or more of the following is true: (a) the SNR for the active region is greater than the SNR for the inactive region; (b) the active region overlaps one or more Hero Regions; (c) a first percent is greater than a second percent, the first percent being the average percent contribution of the light source to the active region, and the second percent being the average percent contribution of the light source to the inactive region; and (d) a first irradiance is greater than a second irradiance, the first irradiance being the average per pixel irradiance (due to light from the light source) that is incident on the active region, and the second irradiance being the average per pixel irradiance (due to light from the light source) that is incident on the inactive region.

In some implementations, the effect of ambient light may be suppressed by curtain modulation. For example, the effect of ambient light may be suppressed as follows: In some implementations, the curtain modulation signals may cause: (a) the average percent contribution of the light source to be greater in the active region than in the inactive region; and (b) the inactive region to not be sensitive to light. This, in turn, may cause the photodetector to measure relatively less ambient light, and to measure relatively more light from the light source, than would otherwise occur in the absence of the curtain modulation signals. Thus, in illustrative implementations, the curtain modulation signals may suppress the effect of ambient light.

As noted above, in illustrative implementations, both curtain modulation and superpixel modulation may control the sensitivity of pixels to light.

In illustrative implementations, the superpixel modulation involves modulating the sensitivity (to light) of different pixels in each superpixel of the photodetector by separate superpixel modulation signals, as described in more detail below. The superpixel modulation may cause the photodetector to capture (albeit at a lower spatial resolution), in a single frame, information that would otherwise require many frames to acquire with conventional structured illumination.

For example, rapid data acquisition achieved by superpixel modulation may facilitate 3D scanning of a moving object. Conventional structured illumination requires many frames of data in order to determine depth, and thus suffers from distorted readings when attempting to 3D scan a moving object, because the object moves from frame to frame. In contrast, superpixel modulation may facilitate the determination of depth from a single frame, and thus may mitigate these distortions.

In illustrative implementations, a signal generator may generate superpixel modulation signals. A photodetector may include superpixels. Each superpixel may comprise multiple pixels, such that each pixel in the superpixel is a horizontal, vertical or diagonal neighbor of at least one other pixel in the superpixel. The pixels of the photodetector may also include pixel sets. Each pixel set may comprise multiple pixels to which a single superpixel modulation signal is applied. Each superpixel modulation signal may control the sensitivity of a pixel set to light. Each of the pixel sets may be modulated by a separate superpixel modulation signal. The signal generator may generate the superpixel modulation signals simultaneously (a separate superpixel modulation signal for each pixel set). Each superpixel may include at least one pixel from each of the pixel sets. Thus, in superpixel modulation, the sensitivity (to light) of different pixels in each superpixel may be separately and simultaneously modulated.

Here is a first example of superpixel modulation: In this first example of superpixel modulation: (a) a photodetector includes n pixel sets; (b) each superpixel in the photodetector has n pixels, such that each pixel in the superpixel is an element of a different pixel set; and (c) a signal generator may generate n separate modulation signals that are simultaneously applied to the pixels in the photodetector, one separate modulation signal per pixel set. In this example, for each superpixel, n separate modulation signals are simultaneously applied to the n pixels of the superpixel, one modulation signal per pixel.

In this first example of superpixel modulation, the n separate modulations signals may together comprise an n-bit binary code, such as an n-bit binary gray code. Each of the modulation signals may correspond to a bit of the code. Each of the n pixel sets may be modulated by a different modulation signal, and thus, at any give time, the state of each of the n pixel sets may correspond to a bit of the n-bit code. Likewise—since each of the n pixels in a superpixel may be from a different pixel set—at any given time, the state of each of the n pixels in a superpixel may correspond to a bit of the n-bit code. All $2^n$ permutations of the n-bit code may be applied at different times during each camera frame. Thus, each camera frame may be divided into $2^n$ time intervals (timeslots). Each permutation of the code may correspond to a unique timeslot during a single camera frame.

For example, at any given timeslot (out of the $2^n$ timeslots during a single camera frame), a unique permutation of states of the n separate modulation signals may occur. Thus, at any given timeslot (out of the $2^n$ timeslots during a single camera frame), a unique permutation of states of the n pixels of each superpixel may occur. The states of each pixel may be binary: either sensitive to light or not sensitive to light.

Here is another example of superpixel modulation: (1) each superpixel has n pixels; (2) a signal generator may generate n separate modulation signals that are simultaneously applied to the n pixels, one modulation signal per pixel; (3) together the n modulations signals may comprise an 9-bit binary gray code; and (4) each of the n modulation signals may correspond to a bit of the code.

Thus, in illustrative implementations, superpixel modulation may comprise a set of separate modulation signals simultaneously modulating a plurality of pixels in a superpixel, such that each pixel in the superpixel is modulated by a modulation signal that causes sensitivity (to light) of the pixel to vary over time.

In some implementations of this invention, superpixel modulation is used for 3D scanning, i.e., for detection of the 3D position of points in a scene.

In some cases, the 3D scanning with superpixel modulation may be implemented as follows: Rotating mirrors may cause a dot of laser light to move in a path across a scene during each camera frame. Because the mirrors rotate, the angle of the laser beam may vary as a function of time during each camera frame. The mirrors may be at particular angles when the dot of laser light hits the point in the scene from which light directly reflects to that pixel. At these particular angles of the laser beam, the incident light intensity for that pixel may reach a maximum for that frame. The superpixel modulation may affect the pixel's response to incident light, and may thereby uniquely identify (i) the timeslot during which the maximum intensity of incident light strikes the pixel and (ii) the orientation of the laser beam during this timeslot. A computer may use the timeslot to access a lookup table to determine the 3D position of the scene point. The lookup table may be computed for each pixel by triangulation, during earlier calibration. Specifically, in some cases, the photodetector, rotational axis of the rotating mirror, and pixel ray for the superpixel may be fixed relative to each other. The pixel ray is the half-line along which light travels in order to reach the center of the superpixel. A computer may calculate the direction of the laser beam for a given superpixel, based on the timeslot at which incident light for the given superpixel reaches a maximum. The 3D scene point that reflects light to the given superpixel may be positioned at the intersection of (i) the pixel ray for the given superpixel and (ii) a vertical plane that is parallel to, and that intersects, the laser beam. A computer may calculate the 3D coordinates of this intersection (of the pixel ray and the vertical plane) by triangulation, based on the known position of the superpixel, pixel ray for the superpixel, and light source and based on the computed orientation of the laser beam.

As noted above, in illustrative implementations of this invention, both curtain modulation and superpixel modulation may involve modulating the sensitivity of pixels in a photodetector to light. The sensitivity of the pixels to light may be modulated either: (a) by controlling the storage of electric charge in the photodetector; or (b) by selectively attenuating transmitted or reflected light, before the light reaches the photodetector.

In some implementations, the sensitivity of a pixel to incident light is modulated by controlling the storage of electric charge in a photodetector. Modulation of electric charge storage may be achieved by using either a single storage device per pixel, or by using multiple storage devices per pixel.

In single storage cases, each pixel may transfer charge to only one storage device during the exposure time of a single camera frame. The storage device may receive charge only from that pixel, and not from any other pixels, during the exposure time of a single camera frame. Modulation signals (curtain modulation, superpixel modulation, or both) may cause a photodiode in each pixel to transfer charge to the single storage device at multiple times during a single camera frame, and to drain charge, without saving it for later readout, at multiple other times during the same camera frame.

In multiple storage cases, each pixel may transfer charge to multiple storage devices during the exposure time of a single camera frame. These multiple storage devices may receive charge only from that pixel, and not from any other pixels, during the exposure time of a single camera frame.

Modulation signals (curtain modulation, superpixel modulation, or both) may cause a photodiode in each pixel to transfer charge to different storage devices, out of the multiple storage devices, at multiple times during the exposure time of a single camera frame, or to drain charge, without saving it for later readout, at multiple other times during the same camera frame.

In some implementations, the sensitivity of a pixel to light may be modulated by selectively attenuating transmitted or reflected light, before the light reaches the photodetector. A transmissive or reflective SLM (spatial light modulator) may selectively attenuate light from a scene, and thereby selectively controls the intensity of light incident on a pixel. For example, in some cases, a reflective SLM selectively reflects light from the scene, causing different pixels to receive reflected light from the scene at different times during a single camera exposure. Likewise, in other cases, a transmissive SLM selectively transmits light from the scene, causing different pixels to receive reflected light from the scene at different times during a single camera exposure. For example: (a) the reflective SLM may comprise a DMD (digital micromirror device) or a reflective LCOS (liquid crystal on silicon) device; and (b) the transmissive SLM may comprise an LCD (liquid crystal device) or ferromagnetic shutters.

These two methods of controlling sensitivity of a pixel to light may be employed for either curtain modulation or superpixel modulation. Thus, in illustrative implementations: (a) curtain modulation may be implemented by controlling storage of electric charge in the photodetector ("storage control") or by controlling attenuation of transmitted or reflected light ("attenuation control"); and (b) superpixel modulation may be achieved by storage control or attenuation control.

Which approach—storage control or attenuation control—is employed for superpixel modulation and curtain modulation, respectively, may vary, depending on the particular implementation of this invention. For example: (a) in some cases, both superpixel modulation and curtain modulation are achieved by controlling storage of electric charge in the photodetector; (b) in some cases, both superpixel modulation and curtain modulation are achieved by a single reflective SLM selectively reflecting light to the photodetector; (c) in some cases, both superpixel modulation and curtain modulation are achieved by a single transmissive SLM selectively transmitting light to the photodetector; (d) in some cases, superpixel modulation is achieved by controlling storage of electric charge in the photodetector and curtain modulation is achieved by an SLM selectively attenuating light before it reaches the photodetector (e.g., by selectively reflecting or transmitting light); (e) in some cases, curtain modulation is achieved by controlling storage of electric charge in the photodetector and superpixel modulation is achieved by an SLM selectively attenuating light before it reaches the photodetector (e.g., by selectively reflecting or transmitting light); (f) in some cases, superpixel modulation is achieved by a first reflective SLM selectively reflecting light and curtain modulation is achieved by a second reflective SLM selectively reflecting light, such that incoming light is selectively attenuated before reaching the photodetector; and (g) in some cases, superpixel modulation is achieved by a first transmissive SLM selectively transmitting light and curtain modulation is achieved by a second transmissive SLM selectively transmitting light, such that incoming light is selectively attenuated before reaching the photodetector.

In illustrative implementations of this invention, the curtain modulation may suppress the effect of ambient light and may thus improve SNR and the accuracy of data that is acquired by superpixel modulation in a single camera frame. This, in turn, may yield more accurate 3D scanning of an object, even when the object is moving.

In illustrative implementations, the photodetector may comprise any sensor that measures incident light. For example, the photodetector may comprise: (a) a CMOS (complementary metal oxide semiconductor) sensor, CCD (charge-coupled device) sensor, active pixel sensor, NMOS (N-type metal-oxide-semiconductor) light sensor, photodiode light sensor, phototransistor light sensor, reverse-biased LED light sensor, semiconductor light sensor or other solid state light sensor; or (b) an array of any of the sensors mentioned in part (a) of this sentence. For example, the photodetector may comprise part of a camera.

The description of the present invention in the Summary and Abstract sections hereof is just a summary. It is intended only to give a general introduction to some illustrative implementations of this invention. It does not describe all of the details of this invention. It describes non-limiting examples of this invention. This invention may be implemented in many other ways. Likewise, the description of this invention in the Field of the Technology section is not limiting; instead it identifies, in a general, non-exclusive manner, a field of technology to which some implementations of this invention generally relate.

BRIEF DESCRIPTION OF THE DRAWINGS

In FIG. 11A, the same transfer gates are employed for superpixel modulation and curtain modulation. In FIGS. 11B and 11C, different transfer gates are employed for superpixel modulation and for curtain modulation.

FIG. 21C shows light from a scene traveling to a DMD array that performs curtain modulation, then to a DMD that performs superpixel modulation, and then to a photodetector.

In FIG. 24A, light from a scene travels through an imaging lens, then through a transmissive SLM, and then to a photodetector.

In FIG. 24B, light from a scene travels through a transmissive SLM, then through an imaging lens, and then to a photodetector.

In FIG. 24C, light from a scene travels through an imaging lens, then through a transmissive SLM, then through a relay lens, and then to a photodetector.

In FIG. 24D, light from a scene travels through an imaging lens, then through a transmissive SLM that performs curtain modulation, then through a transmissive SLM that performs superpixel modulation, and then to a photodetector.

In FIG. 24E, light from a scene travels through an imaging lens, then through a transmissive SLM that performs superpixel modulation, then through a transmissive SLM that performs curtain modulation, and then to a photodetector.

In FIG. 24F, light from a scene travels through a transmissive SLM that performs curtain modulation, then through a transmissive SLM that performs superpixel modulation, then through an imaging lens, and then to a photodetector.

In FIG. 24G, light from a scene travels through a transmissive SLM that performs superpixel modulation, then through a transmissive SLM that performs curtain modulation, then through an imaging lens, and then to a photodetector.

In FIG. 24H, the optical system also includes a relay lens. FIG. 24H shows positions in which transmissive SLM(s) may be located in the optical system.

FIG. 26 illustrates a moving dot of light produced by controlled movement of a light source.

FIG. 27A shows a mirror that reflects a moving beam of light.

FIG. 27B shows a projector that projects a moving beam of light.

FIG. 27C shows an array of directional light sources that, taken together, emit a moving beam of light.

FIGS. 38A, 38B, 38C, 38D, 38E, 38F, 38G, 38H, 38I, and 38J show an example of curtain modulation, in which an active region 3801 of pixels moves down a photodetector, wraps around to the top of the photodetector, and moves down the photodetector again.

FIG. 39A shows a view along the axis of the cylinder. FIG. 39B shows a side view of the cylinder.

FIG. 39C shows a view that is perpendicular to an optical axis of the camera. FIG. 39D shows a side view of the flexible SLM.

Figure 1:
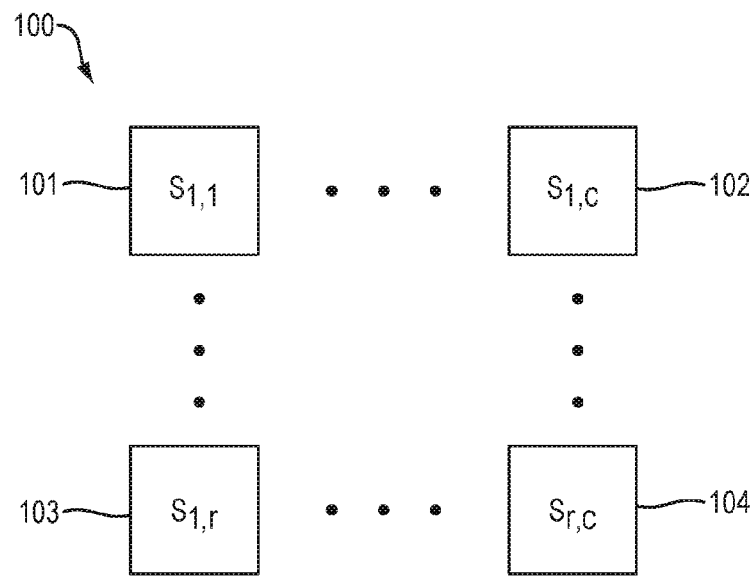
FIG. 1 is a diagram that shows a matrix of superpixels.

The above Figures (except FIG. 25) show some illustrative implementations of this invention, or provide information that relates to those implementations. The examples shown in the above Figures do not limit this invention. This invention may be implemented in many other ways.

DETAILED DESCRIPTION

In illustrative implementations of this invention, both curtain modulation and superpixel modulation are performed. The curtain modulation may suppress the effect of ambient light and thus may improve SNR and the accuracy of data that is acquired by the camera. The superpixel modulation may allow data to be acquired (albeit at a lower spatial resolution) in a single camera frame, that would otherwise require multiple camera frames using conventional structured illumination. This, in turn, may yield more accurate 3D scanning of an object, even when the object is moving. Thus, the curtain modulation may improve the accuracy of data acquired by superpixel modulation.

Curtain Modulation

In illustrative implementations, in curtain modulation, a light source emits a beam of light (e.g., a beam of laser light or a beam of collimated LED light). The beam of light may be scanned through the entire scene in a rapid motion during each single frame. In some implementations, the scan pattern is a "Z"-pattern. For example, in some cases, the scan pattern during a single frame may be as follows: The light beam may start at the bottom of the scene at the beginning of the frame, rise vertically to the top of the scene, then turn off while the scan moves diagonally down and to the left, and then turn on again. This movement (i.e., vertical rise, followed by diagonal shift down and to the left) may be repeated numerous times, until the left-top corner of the scene is reached at the end of the frame. In this movement, each vertical rise (after the initial rise) may be horizontally displaced to the left from the preceding vertical rise. Thus, in the above example, the Z-shaped scan pattern may move from right to left, with the light beam "on" during vertical rise and "off" during diagonal movement that involves horizontal displacement. Other scan patterns may be used, including scans in which: (a) the light beam is "on" during vertical motion and the vertical motion is downward; (b) the light beam is "on" during vertical motion and the Z-shaped pattern moves from left to right; or (c) the Z pattern is rotated by 90 degrees clockwise or counterclockwise, such that the light beam is "on" during horizontal motion and is off during diagonal movement that includes vertical displacement.

In other implementations, the beam of laser light is moved in a different pattern. For example, the dot may move in a bottom-up, bottom-up line motion multiple times, and only then it is turned off and shifts horizontally to another column. In some cases, the beam of laser light rises to the top of the scene, then moves a very short distance horizontally, then descends to the bottom of the scene, then moves a very short distance horizontally, and repeats this pattern (up-sideways-down-sideways) until the beam traverses the entire scene.

In yet other implementations: (a) the pattern of movement of the dot of light (relative to the scene) is rotated by 90 degrees, such that dot of light is "on" while it moves horizontally; and (b) the pattern of movement of the active region (relative to the photosensor) is rotated by 90 degrees, so that the active region moves horizontally.

The curtain modulation may cause the changes in sensitivity of the pixels of the photodetector to be synchronized with the scan of the light beam. As the light beam sweeps along a line of the scene, the active region of pixels (which includes pixels that are sensitive to light) may sweep across the photodetector. At any given time, the active region of pixels may comprise a set of one or more lines of pixels in the photodetector. In many cases, each of these lines extend over the entire width (if the lines are rows) or entire height (if the lines are columns) of the photodetector. While the light beam is moving, the one or more lines of pixels in the active region may be oriented perpendicular to the direction of motion of the active region. As the light beam moves, the active region of the photodetector may move in the same direction as the light beam.

To illustrate: In a first example: (a) the light beam is "on" during vertical rise, and the lines of pixels in the active region of the photodetector are rows that are oriented horizontally; (b) as the light beam rises, this horizontally-oriented active region of the photodetector also rises; and (c) at any given time during the rise of the light beam, the vertical position (relative to the scene) of the dot of light illuminated by the light beam corresponds to the vertical position (relative to the photodetector) of this horizontally-oriented active region.

In a second example: (a) the light beam is "on" during horizontal movement to the right, and the lines of pixels in the active region of the photodetector are columns that are oriented vertically; (b) as the light beam moves horizontally to the right, this vertically-oriented active region of the photodetector also moves to the right; and (c) at any given time during the horizontal movement of the light beam, the horizontal position (relative to the scene) of the dot of light illuminated by the light beam corresponds to the horizontal position (relative to the photodetector) of this vertically-oriented active region.

In many implementations, in curtain modulation: (a) the photodetector does not move; and (b) the rise (or other movement) of the active region of the sensor occurs as different pixels in the sensor become sensitive.

In curtain modulation, movement of the active region of the photodetector may be synchronized with movement of a collimated light beam (e.g., across a scene) during a single frame. The light beam may be emitted by the light source. The movement of the light beam may cause the light beam to change orientation relative to the scene. The curtain modulation signals may cause the active region of the photodetector to track the movement of the light beam. Here are six non-limiting examples. First example: In some cases, (a) a camera includes a light source and a photodetector; and (b) at substantially all times while the light source is illuminating the scene, the active region overlaps a region of the photodetector at which light is incident, which light has traveled directly from the light source to the scene, reflected only once and, after reflecting, traveled directly from the scene to the camera. Second example: In some cases, (a) a camera includes a light source and a photodetector; and (b) at substantially all times while the light source is illuminating the scene, the active region overlaps a region of the photodetector that is receiving single-bounce light. Third example: In some cases, at substantially all times while the light source is illuminating the scene, the SNR for the active region is greater than the SNR for the inactive region. Fourth example: In some cases, at substantially all times while the light source is illuminating the scene, the active region overlaps one or more Hero Regions. Fifth example: In some cases, at substantially all times while the light source is illuminating the scene, a first percent is greater than a second percent, the first percent being the average percent contribution of the light source to the active region, and the second percent being the average percent contribution of the light source to the inactive region. Sixth example: In some cases, at substantially all times while the light source is illuminating the scene, a first irradiance is greater than a second irradiance, the first irradiance being the average per pixel irradiance (due to light from the light source) that is incident on the active region, and the second irradiance being the average per pixel irradiance (due to light from the light source) that is incident on the inactive region.

In illustrative implementations, the effect of the curtain modulation may be that, over the course of the scan during a single frame, the sensor captures relatively more reflected light from the light beam and relatively less ambient light, than the sensor would capture if the entire sensor were sensitive to light during the entire scan.

Figure 35:
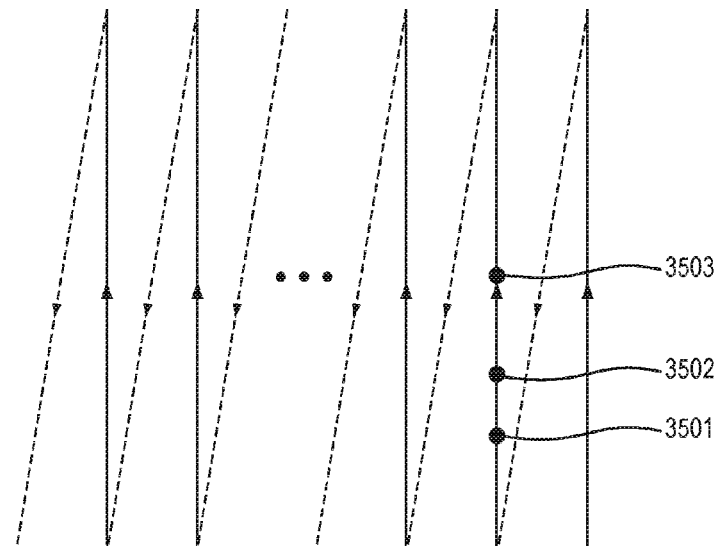
FIG. 35 is a diagram of a Z-shaped trajectory of a dot of light in a scene, produced by a light beam moving through the scene during a single frame.

FIG. 35 is a diagram of a sawtooth-shaped trajectory of a dot of light during curtain modulation, in an illustrative implementation of this invention. This sawtooth trajectory is produced by a collimated light beam sweeping through the scene during a single frame. As the beam sweeps through the scene, the angle of the beam relative to the scene changes over time. Each "Z" in the sawtooth trajectory includes a vertical movement up and a diagonal movement down and to the left. For example, one of the vertical movements passes through points 3501, 3502 and 3503 of the scene.

Figure 36A:
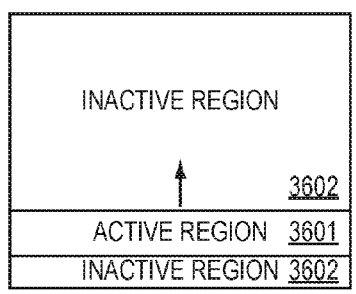
FIG. 36A, FIG. 36B, and FIG. 36C show the vertical position of an active region of the photodetector at different times during a vertical rise of a light beam.
Figure 36B:
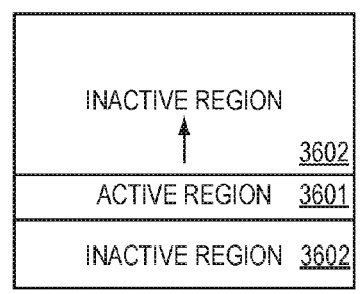
Figure 36C:
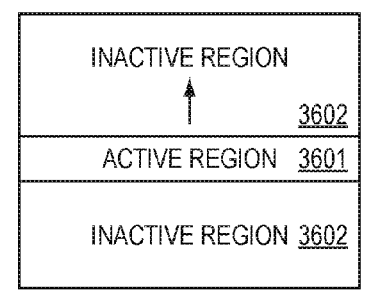

FIG. 36A, FIG. 36B, and FIG. 36C show the vertical position (relative to the photodetector) of a horizontally-oriented active region at different times during a vertical rise (relative to the scene) of a light beam, in an illustrative implementation of this invention. This vertical rise occurs during curtain modulation. As the dot of light rises (relative to the scene), the horizontally-oriented active region 3601 of the photodetector rises (relative to the photodetector. When the dot of light is at point 3501 in the scene (as shown in FIG. 35), the active region 3601 is in the position shown in FIG. 36A. When the dot of light is at point 3502 in the scene (as shown in FIG. 35), the active region 3601 is in the position in the photodetector shown in FIG. 36B. When the dot of light is at point 3503 in the scene (as shown in FIG. 35), the active region 3601 is in the position in the photodetector shown in FIG. 36C. The active region 3601 and inactive region 3602 move, relative to the photodetector, by changing which pixels are included in the active and inactive regions, respectively.

In some cases, in curtain modulation, the active region of the photodetector, loosely speaking, "wraps around" the edges of the photodetector. For example, the active region may rise vertically, such that as the active region rises above the upper edge of the photodetector, the active region reappears at the bottom of the photodetector and rises from the bottom of the photodetector.

Figure 37:
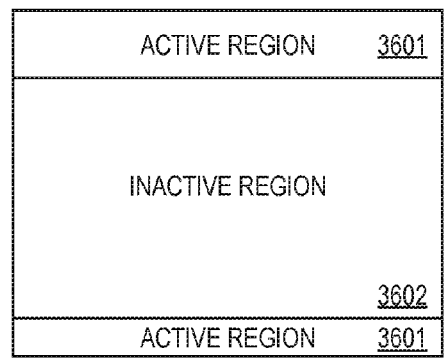
FIG. 37 shows a horizontally-oriented active region 601 that is "wrapped" around the top and bottom of the photodetector.

FIG. 37 shows an example of an active region of pixels in curtain modulation, in an illustrative implementation of this invention. FIG. 37 shows a time at which the active region 3601 has risen so far that the active region is, loosely speaking, "wrapped around" the bottom and top edges of the photodetector. Specifically, at the time shown in FIG. 37: (a) the active region 3601 of the photodetector comprises one or more horizontal rows of pixels that are at the top of the photodetector and one or more horizontal rows of pixels that are at the bottom of the photodetector; and (b) the inactive region 3602 comprises rows of pixels that are vertically between the upper and lower portions of the active region 3601.

FIGS. 38A-38J show an example of curtain modulation, in which an active region 3601 of pixels moves down a photodetector, and then wraps around to the top of the photodetector, and moves down the photodetector again, in an illustrative implementation of this invention. FIGS. 38A-38J are in temporal order, with FIG. 38A occurring before FIG. 38B, and so on. The active region 3601 is in a different vertical position (relative to the photodetector) in each of FIGS. 38A-38J.

Figure 38K:
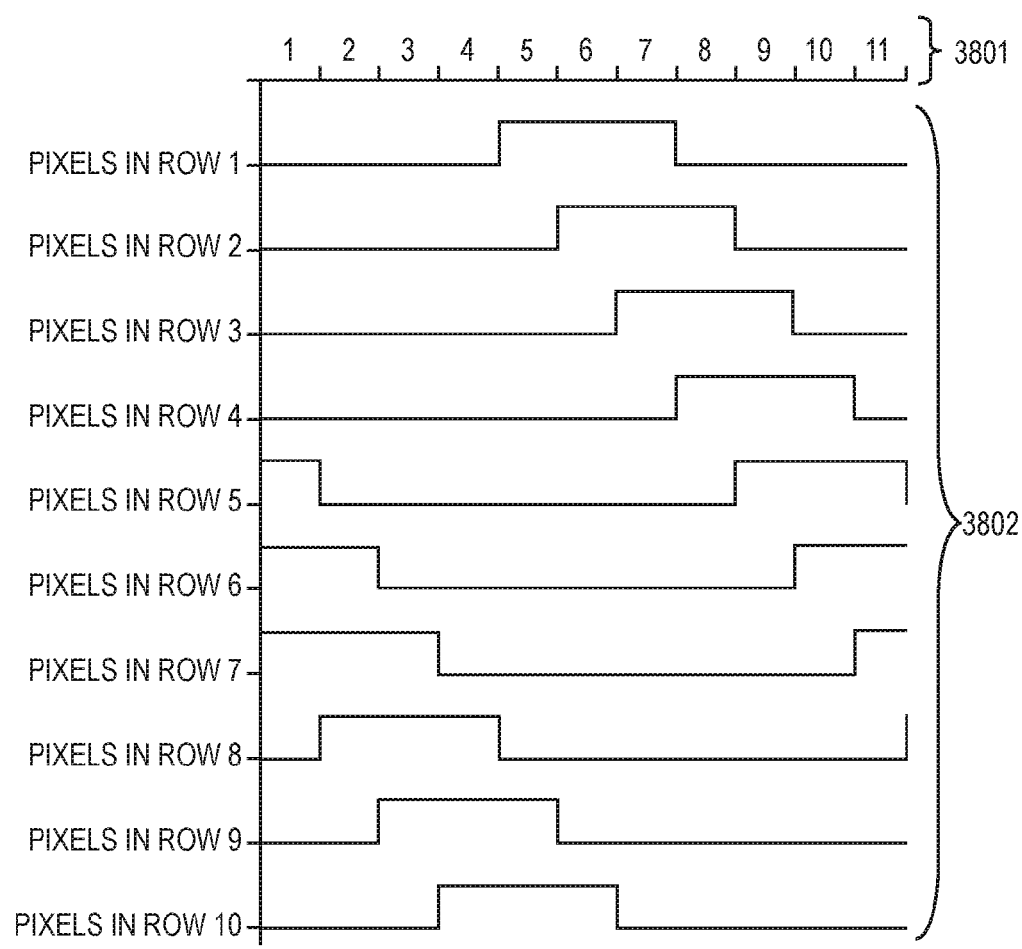
FIG. 38K shows a set of signals for controlling the curtain modulation shown in FIGS. 38A-38J.

FIG. 38K shows a set of curtain modulation signals 3802 for controlling the curtain modulation shown in FIGS. 38A-38J, in an illustrative implementation of this invention. For ease of illustration, in the example shown in FIGS. 38A-38K, the photodetector comprises ten rows and ten columns of pixels (in actual practice, however, the number of rows and columns of pixels may be much larger than ten). FIG. 38K shows ten time steps 3801 of the signals. In the example shown in FIG. 38K, a pixel in a photodetector is sensitive to light when both the curtain modulation signal and the superpixel modulation signal for that pixel is high. In the example shown in FIG. 38K, a pixel in row 1 (i.e., the top row) would be sensitive to light when both (a) the superpixel modulation signal for that pixel is high and (b) simultaneously the curtain modulation signal for row 1 is high. In the example shown if FIG. 38K, the curtain modulation signal is high during time periods 5, 6, 7.

In the examples shown in FIGS. 36A-36C and FIGS. 38A-38J, curtain modulation signals cause movement of the active region to be synchronized with change in orientation of the collimated light beam (and thus synchronized with movement of the dot of light). In the examples shown in FIGS. 36A-36C and FIGS. 38A-38J, this movement of the active region may be such that any one or more of the following is true: (a) the SNR of the active region is greater than the SNR of the inactive region; (b) the active region overlaps one or more Hero Regions; (c) a first percent is greater than a second percent, the first percent being the average percent contribution of the light source to the active region, and the second percent being the average percent contribution of the light source to the inactive region; (d) a first irradiance is greater than a second irradiance, the first irradiance being the average per pixel irradiance (due to light from the light source) that is incident on the active region, and the second irradiance being the average per pixel irradiance (due to light from the light source) that is incident on the inactive region; (e) the active region overlaps a region of the photodetector which is then receiving light that has traveled directly from the light source to a scene, reflected only once and, after reflecting, traveled directly from the scene to the camera; or (f) the active region overlaps an area of the photodetector that is then receiving single-bounce light.

In some cases, a rotating, transmissive SLM is employed for curtain modulation. For example, the rotating, transmissive SLM may comprise: (a) a rotating cylinder that surrounds a light source or camera of the imaging system; or (b) a flexible transmissive SLM that forms a physical, rotating loop which surrounds a light source or camera of the imaging system.

Figure 39A:
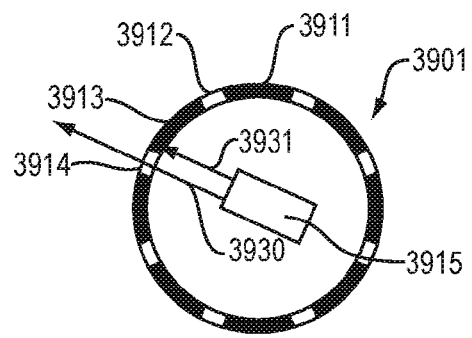
FIG. 39A and FIG. 39B show a rotating, transmissive SLM that performs curtain modulation and is in the general shape of a right circular cylinder.
Figure 39B:
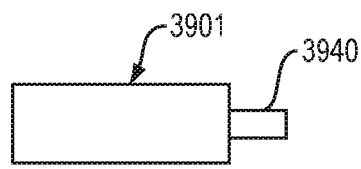

FIG. 39A and FIG. 39B show an SLM 3901 that performs curtain modulation, in an illustrative implementation of this invention. This SLM 3901 is in the general shape of a right circular cylinder. This cylindrical SLM 3901 includes opaque regions (e.g., 3911, 3913) and transparent regions (e.g., 3912, 3914), and thus selectively transmits light. This cylindrical SLM 3901 rotates. A light source 3915 (e.g., a laser) is positioned inside the cylinder. At the time shown in FIG. 39A: (a) light ray 3931 from the light source is blocked by an opaque region 3913 of the cylinder; and (b) light ray 3930 from the light source passes through a transparent region 3914 of the cylinder and travels to the scene being imaged. FIG. 39A shows a view along the axis of the cylinder. FIG. 39B shows a side view of the cylindrical SLM 3901 and of an actuator 3940 (e.g., electric motor). The actuator actuates the rotational motion of the cylindrical SLM 3901.

Figure 39C:
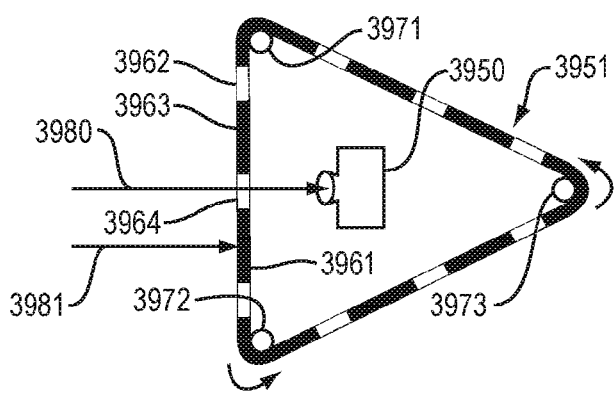
FIG. 39C and FIG. 39D show a moving, flexible, transmissive SLM that performs curtain modulation and surrounds a camera.
Figure 39D:
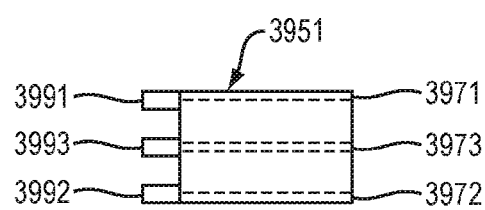

FIG. 39C and FIG. 39D show a moving, flexible, transmissive SLM that performs curtain modulation, in an illustrative implementation of this invention. The flexible, transmissive SLM 3951 may comprise, for example, a bendable sheet of material. This flexible SLM 3951 may include opaque regions (e.g., 3961, 3963) and transparent regions (e.g., 3962, 3964), and thus may selectively transmit light. This flexible SLM 3951 may move in a loop around three rollers 3971, 3972, 3973. Actuators (e.g., electric motors) 3991, 3992 and 3993 may rotate rollers 3971, 3972 and 3973, respectively, and thereby actuate motion of the transmissive SLM 3951. A camera 3950 may be positioned inside the flexible SLM 3951. At the time shown in FIG. 39C: (a) light ray 3981 from the scene is blocked by an opaque region 3961 of the flexible SLM 3951, before reaching the camera; and (b) light ray 3980 from the scene passes through a transparent region 3964 of the flexible SLM 3951 and travels to the camera. FIG. 39C shows a view of the flexible SLM that is perpendicular to an optical axis of the camera 3950. FIG. 39D shows a side view of the flexible SLM.

In some cases, the moving light projection and curtain modulation (for ambient light suppression) may be controlled as follows: According to user settings and parameters (such as scene type and noise level, and calibration data), the parameters of light projection and of the moving active region in photodetector may be calculated. These include the width of the active region and speed of movement of the active region. At each time step, the position of the laser dot may be evaluated. If necessary, the laser dot may be moved by executing commands to the projection unit, such as changing the angle of the mirror(s). Also, at each time step, if necessary, commands may be sent to the photodetector to move the active region. Thus, the active region may be repositioned.

Figure 43:
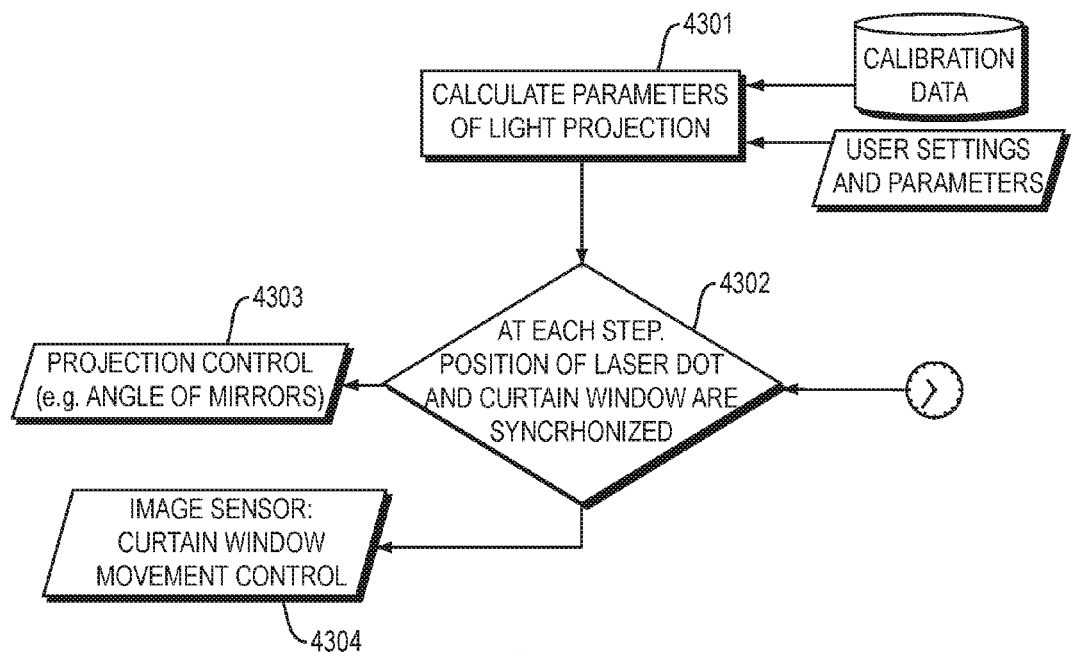
FIG. 43 is a flowchart that shows a method for controlling curtain modulation.

FIG. 43 is a flowchart of a method for controlling curtain modulation, in an illustrative implementation of this invention. In FIG. 43, the active region of the photodetector is called the "rolling curtain window" or "curtain window". In the example shown in FIG. 43, the method for controlling curtain modulation includes the following steps: Calculate parameters of light projection and curtain window, including width of rolling curtain window and speed of the curtain window's movement. When doing so, take into account calibration data and user settings and parameters (Step 4301). At each time step, the position of the laser dot is evaluated and the positions of the laser dot and curtain window are synchronized (Step 4302). The angle at which the laser beam is projected is controlled, such as by controlling the angle of mirrors (Step 4303). The movement of the rolling curtain window is controlled, such as by triggering a window shift (Step 4304).

In illustrative implementations, the moving dot of illumination may be produced in many different ways. For example, any of the following types of light sources may produce a moving dot of light for curtain modulation: (a) mirror galvanometer; (b) micromirror or an array of micromirrors; (c) oscillating mirror (e.g., which is kept at harmonic oscillations); (d) projector; and (e) multiple sources of light that are arranged at different angles and turned off and on.

One of these types of light sources may be used for actuating the light beam in the x direction, and the same or a different type of light source may be used for actuating the light in they direction. For example, in one embodiment, an oscillating mirror is used to provide movement along the y-axis, and a galvo mirror is used to actuate in the x-axis.

In many cases, one mirror is arranged to have its axis of rotation perpendicular to the other mirror's axis of rotation.

This invention is not limited to laser light. Alternatively, a different source of light may be used. For example, collimated light may be used. Collimated LED light, which is not coherent, may be advantageous because incoherent light does not create speckle patterns. Speckle patterns, in the context of intensity measurements, are often considered problematic because the irregular variation in intensity of light influences the value readings.

In curtain modulation, an input/output device may accept input from a human that selects the direction of the movement of the scan of the light beam and of the active region of the sensor. Alternatively, an external computer may generate a control signal that selects this direction of movement.

In curtain modulation, a dot of light may traverse the scanning pattern for the entire scene in a single camera frame. Alternatively, in some cases, the dot of light may traverse only a portion of the scene (e.g., a sweep along a single column or row) during a single camera frame.

In some cases, in curtain modulation, when the edge of the active region touches a given pixel so that given pixel leaves the active region, the charge accumulating in photodiode is stopped from transfer to storage(s) and the pixel becomes inactive. In other cases, a pixel is flushed all the time when it is not in active region (not only when it enters the active region).

In some cases, the movement of the start-row and end-row indexes occurs in discrete steps, where each discrete step moves multiple rows. The size of step may be defined as a constant, or may be provided externally. Alternatively, in some cases, the light beam moves in a horizontal direction when the light beam is on, and the index pointers are to a start-column-index and stop-column index.

In illustrative implementations, the orientation of the camera relative to the light source may be calibrated. In some cases, epipolar lines are parallel to the photodetector bottom and top edge, and thus parallel with the photodetector rows. However, if an imperfect alignment and/or synchronization occur, the epipolar line may not be parallel, and may cross several rows on the sensor.

In curtain modulation, the active region may be a single row (or column) of pixels or superpixels. Alternatively, in curtain modulation, the size of the active region may be two or three rows (or columns) of pixels or superpixels so as to accommodate possible misalignment and variations in synchronization. In some cases, the size of the active region is more than three rows (or columns) of pixels or superpixels. For example, this may be desirable to permit sufficient time to accomplish transfer of charge from a photodiode to storage (or to flush). The size of the active region is configurable within limits.

In some implementations, in curtain modulation, a triggering synchronization signal (that controls when the active region moves) may be provided externally. This may enable a user to control the speed of scan. In some cases, a triggering synchronization signal (that controls when the active region moves) may be generated within the photodetector. This may simplify the communication interface with the photodetector.

In some cases, the active region comprises a set of rows of pixels of the photodetector, such that each row in the active region is adjacent to another row in active region, except that if the region "wraps around" edges of the photodetector, one or two rows in the active region may be isolated from the other rows in the active region. In some cases, the active region comprises a set of columns of the photodetector, such that each column in the active region is adjacent to another column in the active region, except that if the region "wraps around" edges of the photodetector, one or two columns in the active region may be isolated from the other columns in the active region. In some cases, the active region sweeps repeatedly over the photodetector (e.g., repeatedly during each camera frame), such that (i) at least a portion of each row of pixels of the photodetector is included in the active region during a portion of each sweep, or (ii) at least a portion of each column of pixels of the photodetector is included in the active region during a portion of each sweep.

Figure 44:
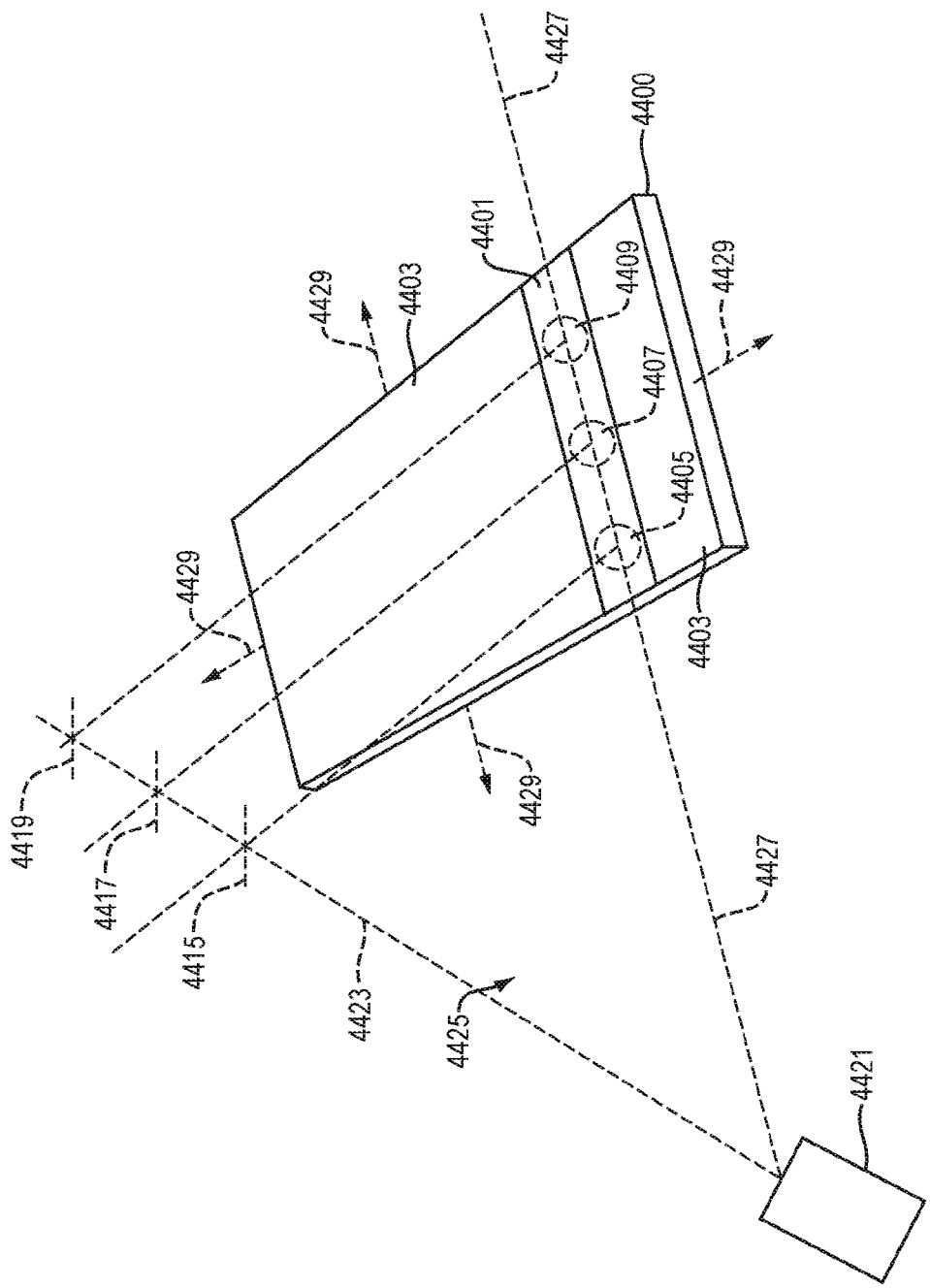
FIG. 44 shows an example of single-bounce light and Hero Regions.

FIG. 44 illustrates an example of single-bounce light and a Hero Region, in an illustrative implementation of this invention.

As mentioned in the Summary: a Hero Region is a set of pixels of the photodetector such that—if collimated light were to travel directly from the light source to a specular planar surface located at a particular depth from the photodetector, which planar surface was parallel to a photodetector plane, and were to specularly reflect in accordance with the Law of Reflection directly from the planar surface to the photodetector—this set of pixels would receive such specularly reflected light.

As mentioned in the Summary: "Hero Region" is defined so that there may be multiple Hero Regions at a given time, because: (a) each "Hero Region" is defined in terms of a specular reflection posited to occur at a particular scene depth; and (b) changes in scene depth at which the specular reflection posited in the definition of Hero Region were to occur would cause light to reflect to different positions in the photodetector.

At the instant of time shown in FIG. 44: (a) a photodetector 4400 comprises an active region 4401 and an inactive region 4403; (b) the active region 4401 overlaps multiple Hero Regions, including Hero Regions 4405, 4407, 4409; and (c) Hero Regions 4405, 4407, 4409 do not overlap each other at all.

At the instant of time shown in FIG. 44: (a) if the specular reflection posited in the definition of "Hero Region" were to occur at the scene depth of position 4415, then the specular reflection would reflect single-bounce light to Hero Region 4405; (b) if the specular reflection posited in the definition of "Hero Region" were to occur at the scene depth of position 4417, then the specular reflection would reflect single-bounce light to Hero Region 4407; and (c) if the specular reflection posited in the definition of "Hero Region" were to occur at the scene depth of position 4419, then the specular reflection would reflect single-bounce light to Hero Region 4409. This illustrates that there may be multiple Hero Regions (as defined herein) at the same instant of time, because specular reflection at different depths may be posited.

In the example shown in FIG. 44: (a) collimated light from light source 4421 may travel along a straight line 4423; (b) a geometric plane 4425 may intersect multiple points in the straight line 4423 and may be perpendicular to a photodetector plane 4429; (c) the geometric plane 4425 and the photodetector plane 4429 may intersect along a line of intersection 4427; (d) the active region 4401 of the photodetector may include all pixels of the photodetector that lie in the line of intersection 4427; and (e) the inactive region 4403 of the photodetector does not include any pixels of the photodetector that lie in the line of intersection 4427. In FIG. 44, the planar top surface of the photodetector 4400 lies entirely in the photodetector plane 4429.

For clarity of illustration in FIG. 44, lens or other optical elements of the camera are omitted from FIG. 44. However, in some cases: (a) one or more lenses 2820, mirrors or other optical elements (e.g., 2822) of the camera may refract, focus, reflect, or steer single-bounce light as light travels through the camera before reaching the photodetector; and (b) thus, while the photodetector receives light, the position of the photodetector 4400 and Hero Regions (e.g., 4405, 4407, 4409) relative to the light source 4421 may be different (e.g., rotated or translated) than that shown in FIG. 44 and may be different that described in the preceding paragraph. In FIG. 44, regions 4405, 4407, 4409 may each comprise a region which receives light that has traveled directly from light source 4421 to the scene, reflected only once and, after reflecting, traveled directly from the scene to the camera. For example, a lens 2820 of the camera may focus this light (which came from the active light source via a single reflection from the scene) onto region 4405, 4407, or 4409. In FIG. 44, regions 4405, 4407, 4409 of the photodetector may also each receive single-bounce light.

In some implementations, the curtain modulation signals cause the active region to move such that, at multiple times while the dot of light is moving, the active region overlaps an epipolar line in a photodetector plane, which epipolar line corresponds to a straight line along which the collimated light is then being emitted. Likewise, in some cases, the curtain modulation signals cause the active region to move such that, at substantially all times while the light source is illuminating the scene, the active region overlaps an epipolar line in a photodetector plane, which epipolar line corresponds to a straight line along which the collimated light is then being emitted. In the example shown in FIG. 44: (a) line 4423 is a straight line along which along light is then being emitted by the light source 4421; and (b) line 4427 is an epipolar line that corresponds to line 4423. In some cases, the photodetector and light source are aligned such that the epipolar line in the photodetector plane is aligned with a single horizontal row of pixels. In some cases: (a) the photodetector and light source are aligned such that the epipolar line in the photodetector plane intersects only one row of photodetector pixels; and (b) the active region comprises this one row of pixels. In some cases: (a) the photodetector and light source are aligned such that the epipolar line in the photodetector plane intersects multiple rows of photodetector pixels; and (b) the active region comprises these multiple rows of pixels.

In some implementations, the curtain modulation signals cause the active region to move such that, at multiple times while the dot of light is moving, the active region overlaps a first line segment in a photodetector plane, where: (a) the first line segment is the "optical projection" (as defined herein), onto the photodetector, of a second line segment; and (b) the second line segment is a straight line segment along which light is then being emitted by a light source. Likewise, in some implementations, the curtain modulation signals cause the active region to move such that, at substantially all times while the light source is illuminating the scene, the active region overlaps a first line segment in a photodetector plane, where: (a) the first line segment is the optical projection, onto the photodetector, of a second line segment; and (b) the second line segment is a straight line segment along which light is then being emitted by a light source. The first line segment (which is the optical projection onto the photodetector of the second line segment) may be straight or curved. For example, lens distortions may cause the first line segment to be curved. In the example shown in FIG. 44: (a) line 4423 is a straight line along which along light is then being emitted by the light source 4421; and (b) the segment of line 4427 that lies in the photodetector is the optical projection (onto the photodetector) of a corresponding segment of line 4423. As used herein, to say that a first region (e.g., line segment) is the "optical projection" onto a photodetector of a second region (e.g., line segment) means that an image of the second region optically forms at the first region.

As noted above, in some cases, the curtain modulation signals cause the active region to move to different positions (relative to the photodetector) at different times. For example, the multiple positions to which the active region moves may comprise: (a) more than 1, more than 2, more than 3, more than 4, more than 5, more than 6, more than 7, more than 8, more than 9, more than 10, more than 20, more than 30, more than 40, more than 50, or more than 100 positions; (b) more than 2 and less than 11 positions; (c) more than 11 positions and less than 10,000 positions, (d) more than 1 position and less than or equal to a given number of positions, which given number is equal to the number of rows of pixels in the photodetector; or (e) more than 1 position and less than or equal to a specific number of positions, which specific number is equal to the number of columns of pixels in the photodetector.

Superpixel Modulation: Superpixels and Pixel Sets

In illustrative implementations of this invention, superpixel modulation may involve simultaneously applying separate superpixel modulation signals to different pixels in each superpixel of a photodetector.

In illustrative implementations, a photodetector may include superpixels and pixel sets. Each superpixel may include at least one pixel from each of the pixel sets. In superpixel modulation, a separate modulation signal may be applied to each of the different pixel sets.

In many cases: (a) each pixel in a superpixel is from a different pixel set, and (b) thus, in superpixel modulation, a separate modulation signal is applied to each pixel in a superpixel. For example, if there are n pixel sets and each superpixel consists of n pixels (each from a different pixel set), then, for each given superpixel, the superpixel modulation may comprise simultaneously applying n separate modulation signals to the given superpixel, each to a different pixel in the given superpixel.

FIG. 1 is a diagram that shows a matrix of superpixels, in an illustrative implementation of this invention. In the example shown in FIG. 1, a photodetector comprises matrix 100 of superpixels, such as superpixels 101, 102, 103, 104. The matrix 100 has r rows and c columns. The total number of superpixels in the matrix is r*c=k.

Figure 2:
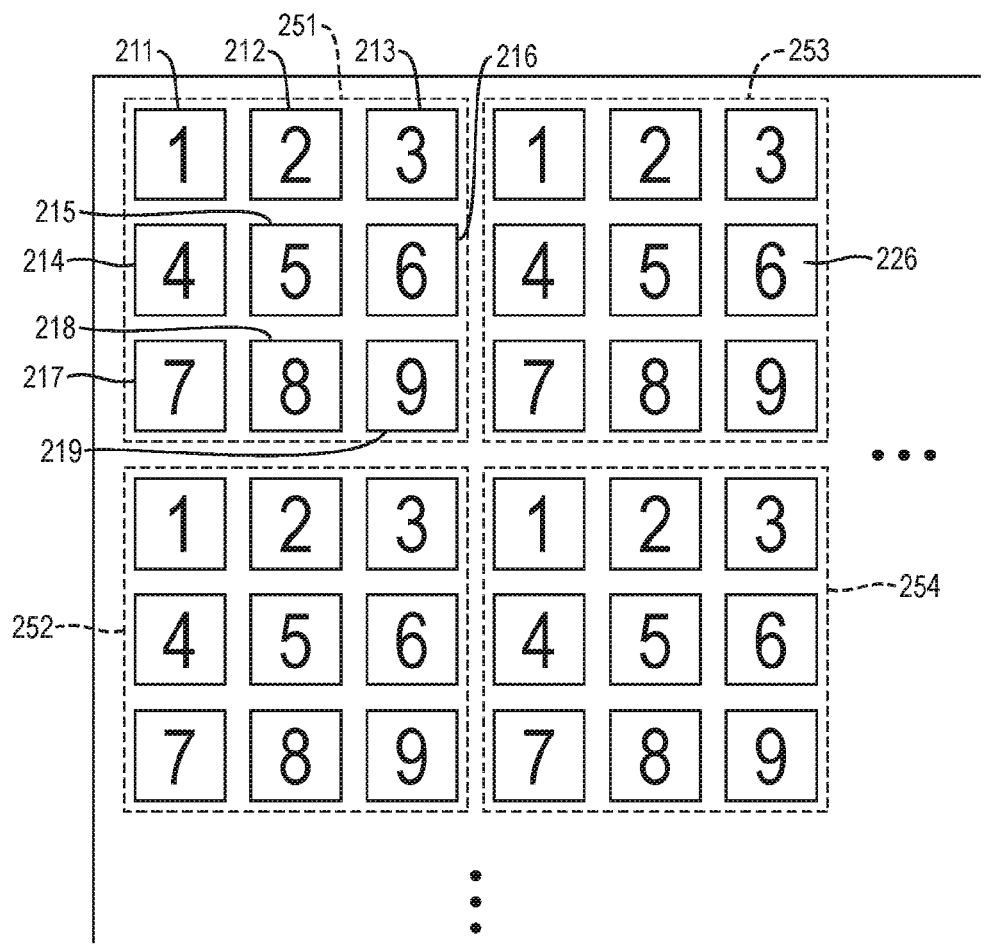
FIG. 2 is a diagram that shows individual pixels within superpixels.

FIG. 2 is a diagram that shows individual pixels within superpixels, in an illustrative implementation of this invention. FIG. 2 shows four superpixels 251, 252, 253, 254 in the upper left corner of a matrix of superpixels. Each of the four superpixels comprises 9 pixels. For example, superpixel 251 comprises pixels 211, 212, 213, 214, 215, 216, 217, 218, 219.

In the example shown in FIG. 2, there are nine pixel sets. The pixels in the first pixel set are labeled "1". Likewise, the pixels in the second, third, fourth, fifth, sixth, seventh, eighth and ninth pixel sets are labeled "2", "3", "4", "5", "6", "7", "8", and "9", respectively. (These numerical labels are used in FIG. 2 to facilitate explanation; but in actual practice, the pixels are not labeled in this manner.)

In FIG. 2, each superpixel includes one pixel from each set.

In FIG. 2, each pixel in a particular superpixel is a horizontal, vertical or diagonal neighbor of at least one other pixel in the particular superpixel. For example, superpixel 251 includes nine pixels, including, among others, pixels 211, 212, 214 and 215. Pixel 211 is a horizontal neighbor of pixel 212, and is a vertical neighbor of pixel 214, and is a diagonal neighbor of pixel 215.

In illustrative implementations, the pixels in each superpixel may be sufficiently small and sufficiently close together that light incident on the photodiodes of the pixels in the superpixel is locally homogeneous—that is, within a single superpixel, spatial variation in intensity of incident light is not substantial.

(However, in some cases: (a) the photodetector itself includes spatial light modulators—such as an LCD—for selectively modulating the intensity of incoming light; and (b) the light incident on the photodiodes of the superpixel is locally homogeneous if the effect of the spatial light modulators is subtracted, but is not locally homogeneous if the effect of the spatial light modulators is taken into account.)

Depending on the particular implementation, the spatial distribution of pixel sets within a photodetector may vary. In many cases, it is preferable for the pixel sets to be spatially distributed in a repeating pattern. For example, in some cases, 9 pixel sets are used in a photodetector, and each superpixel is a 3×3 pixel square, which is an easily repeatable pattern. For example, in FIG. 2, the following spatial pattern of 9 pixel sets occurs in superpixel 251: pixels from pixel sets 1, 2, 3 are in the top row of the superpixel, pixels for pixel sets 4, 5, 6 are in the middle row of the superpixel, and pixels for pixel sets 7, 8, 9 are in the bottom row of the superpixel. This spatial pattern repeats in superpixels 252, 253, 254. Or, for example, in some cases, a 3-pixel superpixel in an "L" shape is used: stacking an upright "L" and a bottom-up "L" gives a rectangle and thus produces a repeatable pattern.

Depending on the particular implementation, any shape of superpixels may be used. For example, in some cases, triangular or hexagonal superpixels are used. In some cases, the superpixels has a linear shape, such as horizontal (e.g., [12345][12345][12345]), and vertical (e.g., $[12345]^T$ $[12345]^T[12345]^T$) However, in some cases, using a line-shaped superpixel has a disadvantage: if all "1"s are in one column; this tends in some cases to at least slightly increase the decoding error rate.

In some cases, the position of pixels from different pixel sets (within each superpixel) is rearranged from superpixel to superpixel (e.g. using a few fixed patterns, completely randomizing the order, or using a mathematical permutation).

For example, in some implementations, the spatial distribution of pixels from different sets of pixel sets within each superpixel is randomized in design time, then the random distribution is hardwired. For example, in some cases, randomization produces, for three line-shaped superpixels, a spatial arrangement of pixels from different pixel sets of [13452][35214][41253], rather than [12345][12345] [12345]. Likewise, randomization of position of pixels from different pixel sets is applicable to any shape of superpixel, including square, rectangular, L-shaped, triangular or hexagonal.

In some cases, a multiplexer rearranges the shape or size of superpixels, such that superpixels with different sizes or shapes used at different times (e.g., for different applications, different frames, or at different times within a single frame) or at different regions within a single photodetector. For example, in some cases, a multiplexer reconfigures different superpixel shapes, e.g., 3×3, 4×3, or another shape. For example, in some implementations with CMOS pixels, a multiplexer is placed outside the pixel matrix area and directs separate TX/PD RST control signals to the pixels. Likewise, in some cases, a multiplexer rearranges the position of pixels from different pixel sets within one or more of the superpixels.

As noted above, in some cases, the spatial distribution of different sets of pixels changes from frame to frame. Alternatively, in some cases, the spatial distribution is fixed because of wiring of the pixel circuit.

In many implementations, the different sets of pixels in the photodetector are disjoint (i.e., no pixel belongs to more than one of the sets of pixels). Alternatively, different sets of pixels are overlapping. In some cases, a single pixel that is an element of two pixel sets A and B is subjected to a pixel modulation signal that comprises a superposition of the modulation signals for pixel sets A and B.

The size of the superpixel depends on the application. If, for example, a 9 pixel superpixel is not enough for a specific application and a 16 pixel superpixel is too much, a 12 pixel superpixel (4×3 or 3×4) may be used for that specific application. More pixel sets in a superpixel allows for more complicated coding strategies or code sharing. For example, a modulation signal comprising 18-bit gray code may be applied to the pixels of a 6×3 pixel superpixel.

In some use scenarios, spatial compression may be achieved by treating each large superpixel as if it comprises smaller superpixels, and then applying superpixel modulation signals as follows: Superpixel modulation signals corresponding to lower bits of a code may be applied to only one pixel per large superpixel, but superpixel modulation signals corresponding to higher bits of the code may be applied to one pixel per smaller superpixel. For example, in some use scenarios, a 6×3 pixel superpixel is treated as if comprising two 3×3 pixel superpixels. In these use scenarios, four superpixel modulation signals corresponding to the 4 lower bits of an 11-bit gray code, respectively, may each be applied to one pixel in the 6×3 superpixel, while 7 superpixel modulation signals corresponding to the 7 higher bits of the 11-bit gray code, respectively, may each be applied to one pixel in each of the 3×3 superpixels. The superpixel modulation signals for the higher bits may have a higher frequency than the superpixel modulation signals for the lower bits. Spatial compression (by applying lower bits and higher bits in this manner) has many practical advantages. For example, in some 3D depth sensing applications, this spatial compression allows for using multiple higher bit modulation signals to determine, for each large superpixel for each frame, the 3D coordinates for multiple points in a scene. For example, in some implementations that use this spatial compression, a computer calculates 3D coordinates of four scene points, for each frame for each 6×3 superpixel.

In some cases, the actual spatial distribution of pixel sets is hardwired in a fixed pattern. However, even then, in some cases, software is used to effectively vary the spatial distribution of pixel sets from frame to frame, by changing, from frame to frame, which bits of a modulation code are applied to which pixel set.

For example, in some cases of superpixel modulation: (a) in a first frame, software causes the x-th bit of a superpixel modulation signal to be applied to pixel set x; and (b) in a second frame, software causes the x-th bit of a superpixel modulation signal to modulate pixel set y. For example, in some use scenarios: (a) in a first frame, the superpixel modulation signal for the first bit of a code is applied to a first pixel set, the superpixel modulation signal for the second bit of the code is applied to the second pixel set, and so on, and (b) in a second frame, the superpixel modulation signal for the first bit of a code is applied to the second pixel set, the superpixel modulation signal for the second bit of the code is applied to the third pixel set, and so on. Thus, in some cases, the permutation of assignments (from code bits to pixel sets) varies from frame to frame. In some cases, the same permutation of assignments (of code bits to pixel sets) is used in all frames. In other cases, different permutations of assignments (of code bits to pixel sets) are applied in different frames in a fixed order. In yet other cases, a different random permutation of assignments (of code bits to pixel sets) is used in each frame.

Here is a non-limiting example of varying the permutation of assignments (of code bits to pixel sets), in superpixel modulation. For a 5-bit code, there are 5! (factorial) different permutations of assignments of code bits to pixel sets. Different permutations are used in different frames. For example, (a) in a first frame, a first permutation is used, which maps bit 1 to pixel set 1, bit 2 to pixel set 2, bit 3 to pixel set 3, bit 4 to pixel set 4, and bit 5 to pixel set 5; and (b) in a second frame, a second permutation is used, which maps bit 1 to pixel set 4, bit 2 to pixel set 2, bit 3 to pixel set 5, bit 4 to pixel set 3, and bit 5 to pixel set 1.

In illustrative implementations, each superpixel may comprise multiple pixels. Each pixel in the superpixel may be a horizontal, vertical or diagonal neighbor of at least one other pixel in the superpixel. In the example shown in FIG. 2, pixel 215 has only two vertical neighbors (pixels 212, 217), only two horizontal neighbors (pixels 214, 216), and only four diagonal neighbors (pixels 211, 213, 217, 219).

In many cases, the pixels of a given pixel set are not horizontal, vertical or diagonal neighbors of each other. For example, in FIG. 2, pixels 216 and 226 are each members of the sixth pixel set. None of the neighboring pixels (i.e. horizontal, vertical or diagonal neighbors) of pixel 216 is a member of the sixth pixel set. Likewise, none of the neighboring pixels (i.e. horizontal, vertical or diagonal neighbors) of pixel 226 is a member of the sixth pixel set.

Superpixel Modulation: Signals

Figure 3:
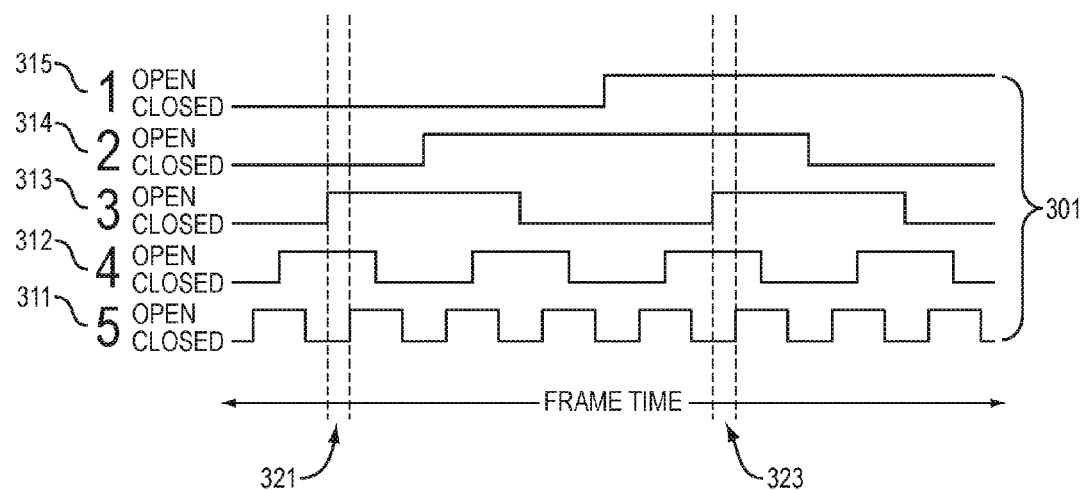
FIG. 3 is a diagram that shows five different superpixel modulation signals that are simultaneously applied to five different pixel sets.

In some cases, a 5-bit binary gray code is employed for superpixel modulation. For example, FIG. 3 is a diagram that shows five different superpixel modulation signals that are simultaneously applied to five different pixel sets during a single frame. In the example shown in FIG. 3, the five superpixel modulation signals 311, 312, 313, 314, 315 together comprise a binary 5-bit gray code. The code is binary because each component of the code has only two allowed values. In FIG. 3, the two allowed values are called "open" and "closed". However, the two allowed values may be called by any name, such as on and off, high and low, or 0 and 1.

In FIG. 3, each of the five superpixel modulation signals 311, 312, 313, 314, 315 corresponds to a bit of a 5-bit gray code. The 5-bit gray code has $2^5$ (i.e., 32) permutations of open and closed states of the 5 component signals.

In FIG. 3, all $2^5$ (i.e., 32) permutations of open and closed states of the 5 superpixel modulation signals are applied to the pixel sets, during a single frame of the camera. For a 5-bit code (such as that shown in FIG. 3), a single frame of the camera has $2^5$ (i.e., 32) subintervals, which are sometimes called "timeslots". Each timeslot corresponds to a single permutation of the code. For example, during timeslot 321 in FIG. 3, the permutation is signal 315 closed, signal 314 closed, signal 313 open, signal 312 open and signal 311 closed. In contrast, during timeslot 323 in FIG. 3, the permutation is signal 315 open, signal 314 open, signal 313 open, signal 312 open and signal 311 closed.

In FIG. 3, a unique permutation (of binary states of the 5 component signals of the 5-bit gray code) exists for each of the 32 timeslots. Thus, each permutation (of states of the 5 component signals of the 5-bit gray code) is effectively a "timestamp" that uniquely identifies a timeslot within a frame.

In some implementations of this invention, a 9-bit binary gray code is employed for superpixel modulation. The nine bits of this code are represented by 9 superpixel modulation signals. The 9-bit code has $2^9$ (i.e., 512) permutations of open and closed states of the 9 modulation signals. All 512 permutations are applied to pixels in each frame of the camera. Thus, for this 9-bit code, each frame has 512 subintervals, sometimes called timeslots. A unique permutation of the 9-bit code (and thus of the open and closed states of the 9 superpixel modulation signals) exists for each of the 512 timeslots. In some cases in which a 9-bit code is used: (a) there are nine pixel sets; (b) the 9 superpixel modulation signals are applied to the 9 pixel sets, one signal per pixel set; and (c) each superpixel has 9 pixels, one pixel per pixel sets. Thus, the 9 superpixel modulation signals are applied to the 9 pixels in a superpixel, one signal per pixel.

Gray codes are robust against noise, which is advantageous.

In some implementations, the superpixel modulation signals are non-periodic. An example of such an aperiodic signal is 00110010101101000011010, which does not have one specific frequency or phase. In other cases, the superpixel modulation signals are periodic. Or, in some cases, a periodic superpixel modulation signal such as 01010101010101 is applied to a first pixel set, and a second periodic or aperiodic superpixel modulation signal (e.g., periodic signal 10000100001000) is applied to a second pixel set.

In some cases, the frequency, phase, or amplitude of the superpixel modulation signal for a pixel set changes over the duration of one frame. In other cases, the frequency, phase, or amplitude of the superpixel modulation signal for a pixel set is constant within each single frame, but changes from frame to frame.

In some implementations, each superpixel modulation signal is applied to only one pixel in each superpixel. Alternatively, a single superpixel modulation signal may be applied to multiple pixels within a single superpixel.

In some implementations: (a) all pixels which belong to the same pixel set have the same modulation signal; and (b) different pixel sets receive different modulation signals.

In superpixel modulation, each pixel set may receive its own, separate modulation signal.

In many use scenarios, the amplitude of each superpixel modulation signal varies as a function of time during a single frame. However, in other use scenarios: (a) the amplitude or phase of a superpixel modulation signal is constant over time within a single frame, where the constant is different for different pixel sets, or (b) the amplitude or phase of a superpixel modulation signal is the same constant for different pixel sets. In other words, this invention is not limited to superpixel modulation signals that change over time or that are different among different pixel sets.

In some cases, the superpixel modulation signals for pixel sets changes frame to frame.

Depending on the particular implementation, the manner in which the superpixel modulation signals are physically implemented may vary. For example, in some cases, the pixels are CMOS pixels, an electrical superpixel modulation signal causes a charge transfer (TX) transistor to transfer charge from a photodiode to a storage device (e.g., floating diffusion). In some cases: (a) each pixel has only one photodiode and more than more than one TX transistor; (b) more than one storage device (e.g., floating diffusion) is dedicated to only that pixel; and (c) each of the TX transistors in that pixel controls transfer to a different storage device.

In some other cases, an electrical superpixel modulation signal causes electrodes to vary the position of mirrors in a DMD (digital micromirror device) by elecrostatic attraction, thereby causing the DMD to selectively reflect light towards some pixels in the photodetector, and to reflect light away from some other pixels in the photodetector.

In some other cases, an electrical superpixel modulation signal causes the properties of an SLM (spatial light modulator) to vary, such that the SLM selectively attenuates light before it reaches the photodetector.

Physical implementation of superpixel modulation signals is discussed in more detail below.

Effect of Superpixel Modulation

In some implementations, superpixel modulation and curtain modulation together control the response of a pixel to incident light.

Figure 4:
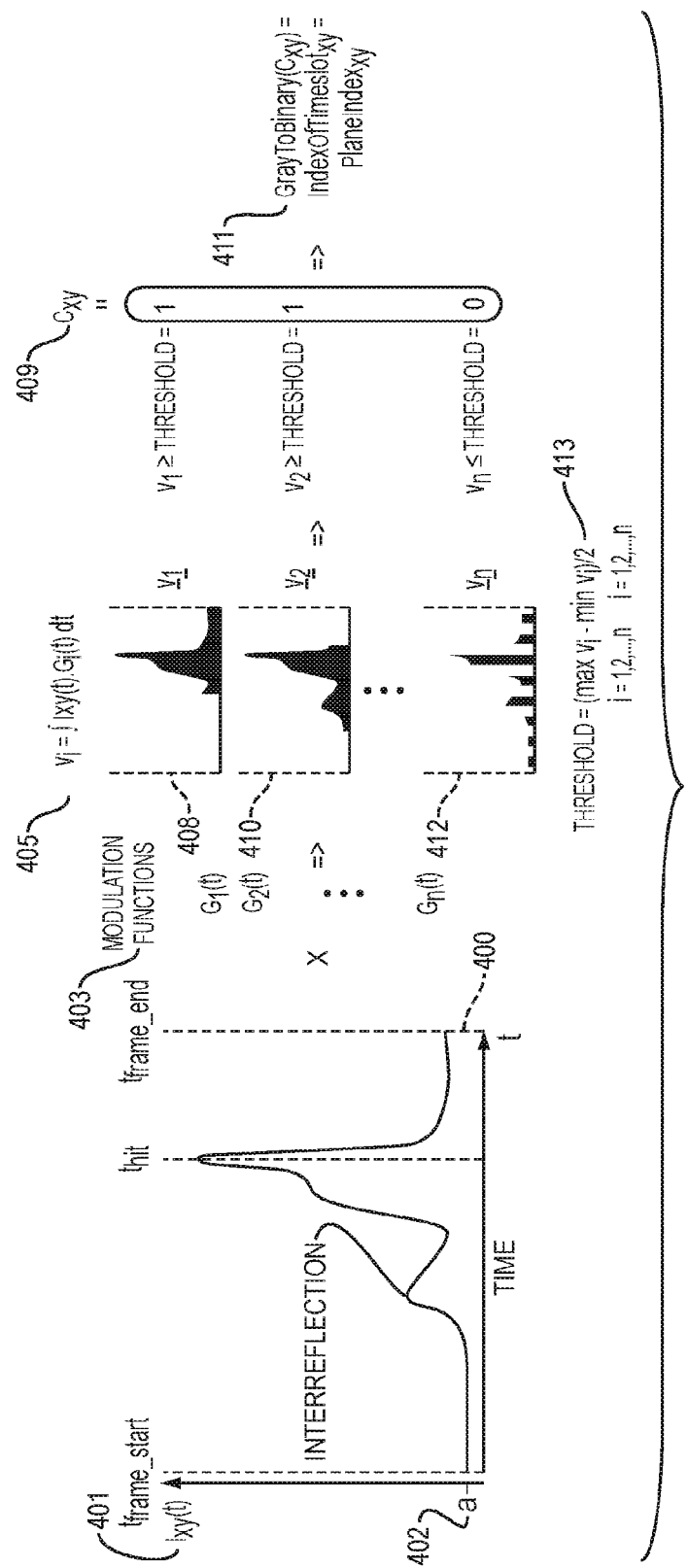
FIG. 4 is a conceptual diagram, illustrating how superpixel modulation signals control the response of pixels to incident light.

FIG. 4 is a conceptual diagram, illustrating how signals for superpixel modulation may affect the response of pixels to incident light.

FIG. 4 shows an example of the effect of superpixel modulation. For ease of illustration (to show how superpixel modulation works), FIG. 4 does not show the combined effect of both superpixel modulation and curtain modulation.

In the example shown in FIG. 4, plot 400 is a plot of $I_{x,y}(t)$ 401 versus time. $I_{x,y}(t)$ is the intensity of light incident on the x, $y^{th}$ superpixel (i.e., the superpixel which has coordinates x, y on the sensor plane) as a function of time. The time interval shown in plot 400 is a complete camera frame, from the start of the frame to the end of the frame. (i.e., $t_{frame\_start}$ to $t_{frame\_end}$). The intensity of incident light due to ambient background illumination has a constant amplitude of $\alpha$ (402). A small peak of intensity occurs at time 404 due to interreflections from the scene. The highest peak of intensity 406 occurs at time $t_{hit}$. For example, in some cases: (a) a line of laser light sweeps across the scene during each frame, and (b) the sweeping line of laser light reaches a point in the scene and reflects, such that the reflected light reaches the photodetector at time $t_{hit}$.

In FIG. 4, superpixel modulation signals $G_1(t)$ to $G_n(t)$ 403 are applied to the n pixel sets in the superpixel, one modulation function per pixel set. In the example shown in FIG. 4: (a) n=5; (b) a 5-bit gray code is employed; (c) $G_1(t)$ to $G_n(t)$ are the five signals that comprise the 5-bit gray code, one signal per bit of the code, as illustrated in FIG. 3.

In FIG. 4, $v_i(t)$ is a value for the $i^{th}$ pixel set in the superpixel. Specifically, $v_i(t)$ is equal to the integral of the product of $I_{x,y}(t)$ and $G_i(t)$ (the $i^{th}$ superpixel modulation signal). This integral $v_i(t)$ is equal to the area of dark region under the curve in plots 408, 410, 412. In plots 408, 410, 412, the curve that defines the top of the dark region is equal to the product of the product of $I_{x,y}(t)$ and $G_i(t)$.

In plot 408, superpixel modulation signal $G_1$ (0 is signal 315 shown in FIG. 3. During the first half of the frame (shown in the left side of plot 408), signal 315 is closed (i.e., equal to 0), and thus the product of $I_{x,y}(t)$ and $G_1(t)$ is equal to zero, and there is no dark region under the curve. During the second half of the frame (shown in the right side of plot 408), signal 315 is open (i.e., equal to 1), and the product of $I_{x,y}(t)$ and $G_1(t)$ is equal to $I_{x,y}(t)$, and there is a dark region under the curve.

In plot 410, superpixel modulation signal $G_2(t)$ is signal 314 shown in FIG. 3. During the first and fourth quarters of the frame, signal 314 is closed (i.e., equal to 0), and thus the product of $I_{x,y}(t)$ and $G_2(t)$ is equal to zero, and there is no dark region under the curve. During the second and third quarters of the frame, signal 314 is open (i.e., equal to 1), and the product of $I_{x,y}(t)$ and $G_2(t)$ is equal to of $I_{x,y}(t)$, and there is a dark region under the curve.

In plot 412, superpixel modulation signal $G_n(t)$ is $G_5(t)$, which is signal 311 shown in FIG. 3. The frame is divided into 32 timeslots. During timeslots in which signal 311 is closed (i.e., equal to 0), the product of $I_{x,y}(t)$ and $G_5(t)$ is equal to zero, and there is no dark region under the curve. During timeslots in which signal 311 is open (i.e., equal to 1), and the product of $I_{x,y}(t)$ and $G_5(t)$ is equal to of $I_{x,y}(t)$, and there is a dark region under the curve.

In FIG. 4, the incident light function is identical for each of the pixel sets of the superpixel (that is, $I_{x,y}(t)$ is the same for all of the pixels in a superpixel, due to their close proximity). However separate superpixel modulation signals $G_1(t)$ to $G_n(t)$ are applied to the n pixel sets in the superpixel. Thus, each of the pixel sets in the superpixel receives a separate superpixel modulation signal.

In the example shown in FIG. 4, a computer calculates $v_i(t)$ (the integral of the product of $I_{x,y}(t)$ and $G_i(t)$) for each pixel set in the superpixel 405. For example, a computer calculates $v_i(t)$ for the first pixel set which received superpixel modulation signal $G_1(t)$, and calculates $v_2(t)$ for the second pixel set which received superpixel modulation signal $G_2(t)$, et cetera.

In the example shown in FIG. 4, a computer also calculates a threshold 413. In some cases, the threshold 413 is equal to (max $v_i$−min $v_i$)/2, where i=1, 2, . . . , n, and max $v_i$ is the maximum $v_i(t)$ for all the pixels in the superpixel, and min $v_i$ is the minumum $v_i(t)$ for all the pixels in the superpixel.

In the example shown in FIG. 4, a computer then calculates code $C_{x,y}$ 409 for the x,y$^{th}$ superpixel (i.e., the superpixel which has coordinates x, y on the sensor plane). Code $C_{x,y}$ has the same number of bits as the number of pixel sets in the superpixel. A computer sets the i$^{th}$ bit of code $C_{x,y}$ to 1 if the $v_i(t)$ is greater than the threshold; otherwise the computer sets the i$^{th}$ bit of code $C_{x,y}$ to 0. In the example shown in FIG. 4, the computer: (a) sets the first bit of code $C_{x,y}$ to 1 because $v_1(t)$ is greater than the threshold; (b) sets the n$^{th}$ (in this example, the 5th) bit of code $C_{x,y}$ to 0 because $v_n(t)$ is less than the threshold.

In the example shown in FIG. 4, each permutation of code $C_{x,y}$ corresponds to a unique timeslot (time interval) within a single frame. This unique timeslot is the timeslot within which time $t_{hit}$ occurred. Thus, each permutation of code $C_{x,y}$ is effectively a timestamp that uniquely identifies a timeslot (time interval) within a single camera frame, such that incident light striking the pixel reached its maximum peak during this timeslot.

In some 3D depth-sensing implementations of this invention, a galvanometer mirror rotates, causing a plane of laser light to sweep across a scene during each camera frame. The angle of the mirror (and thus the angle of the plane of laser light) may be a function of time within the frame. Thus, each permutation of code $C_{x,y}$ may correspond to a unique timeslot (time interval) within a single camera frame, which in turn may correspond to a unique angle of the plane of laser light. 411. A computer may use this angle, and other factors determined during calibration, to compute the 3D position of the scene point that reflected the laser light to the superpixel. The computer may store, for each superpixel and each angle, the 3D position of the corresponding scene point. During subsequent operation of a depth sensor, a computer may calculate a permutation of code $C_{x,y}$ for each superpixel, as described above, and then use the lookup table to compute the 3D position of the scene point that corresponds to that scene point.

In some implementations, each pixel stores charge to only one storage device, which storage device is dedicated to that pixel and does not store charge for any other pixels. When a pixel has only one storage device, less than all of the incident illumination may be measured.

In the example shown in FIG. 4, each pixel stores charge to only one storage device, which storage device is dedicated to that pixel and does not store charge for any other pixels. Thus, FIG. 4 illustrates a single storage device implementation.

The above description of FIG. 4 describes a non-limiting example of this invention; this invention may be implemented in other ways.

In single storage device implementations, for each camera frame, the total photodiode charge measured by each pixel in the i$^{th}$ pixel set in a superpixel may be equal to the value of $v_i(t)$ at the end of the frame (i.e., is equal to $v_i(t_{frame\_end})$. This value, in turn, may depend on the superpixel modulation function $G_n(t)$ that is applied to the i$^{th}$ pixel set. Thus, the superpixel modulation function $G_i(t)$ may determine the response of the pixels in the i$^{th}$ pixel set to incident light. (In many cases, each superpixel includes only one pixel from each pixel set. In those cases, the i$^{th}$ pixel set is simply the i$^{th}$ pixel.)

Recall that, for ease of illustration, FIG. 4 shows only superpixel modulation, and does not show curtain modulation. However, in many implementations of this invention, the value of $v_i(t)$ at the end of the frame depends on both the superpixel modulation signal and the curtain modulation signal.

Curtain Modulation and Superpixel Modulation, Applied Together

In illustrative implementations, both current modulation and superpixel modulation may be simultaneously applied to each pixel of the photodetector.

In some implementations, whether a particular pixel is sensitive to light at any given time is controlled by the logical AND of the curtain and superpixel modulation signals that are applied to the particular pixel. Thus, in these implementations, a pixel is sensitive to light at a given time if, at the given time, both (a) the curtain modulation signal for that pixel is high and (b) the superpixel modulation signal for that pixel is high. In these implementations, the pixel is not sensitive to light when one or both of the curtain and modulation signals for that pixel is low. Furthermore, in these implementations: (a) the curtain modulation signal for a pixel is high when the pixel is in the active region, and not at other times; and thus (b) a pixel is sensitive to light when the pixel is in the active region of the photodetector and, simultaneously, the superpixel modulation signal for the pixel is high.

In illustrative implementations: (a) a curtain modulation signal for a given pixel may be applied to the entire row (or column) of pixels in which the given pixel is located; and (b) curtain modulation of the photodetector may be achieved by simultaneously applying multiple curtain modulation signals (e.g., one curtain modulation signal per pixel row or per pixel column). In illustrative implementations, multiple pixel rows (or pixel columns) may receive identical curtain modulation signals. For example, at a given time: (a) the curtain modulation signals for pixel rows (or columns) in the active region may all be high; and (b) the curtain modulation signals for pixel rows (or columns) in the inactive region may all be low.

In illustrative implementations: (a) a superpixel modulation signal for a given pixel may be applied to the entire pixel set of which the given pixel is a member; (b) the superpixel modulation signal for a given pixel set may be separate from the superpixel modulation signal for each other pixel set; and (c) the superpixel modulation signals for the pixel sets may be applied simultaneously.

In some implementations, the sensitivity of the pixel to light may approximate a binary state (sensitive/not sensitive) which is encoded by the logical AND of the curtain and superpixel modulation signals.

As used herein, unless the context clearly indicates otherwise, "high" and "low" (and "open" and "closed") values of a signal are Boolean logic values. For example, "high" and "low" Boolean logic values may be physically represented by particular voltage ranges. Which voltage range is assigned to which Boolean logic value is arbitrary. Thus, for example: (a) the Boolean logic value "high" may be represented by a first voltage range; (b) the Boolean logic value "low" may be represented by a second voltage range; and (c) voltages in the first voltage range may be greater than voltages in the second voltage range, or vice versa.

In illustrative implementations, curtain and superpixel modulation may be simultaneously applied to the photodetector as follows: In curtain modulation, an active region may repeatedly sweep across the photodetector during a single camera frame. Thus, the active region may repeatedly move through each superpixel during a single camera frame. Simultaneously, throughout each camera frame, superpixel modulation signals may be applied to each given superpixel in the photodetector, including: (a) during many short periods (in each camera frame) in which the given superpixel is in the active region of the photodetector; and (b) during many short periods (in each camera frame) in which the given superpixel is not in the active region of the photodetector. The moving active region may be narrow compared to the photodetector. Thus, a given superpixel may be in in the active region during only a small percentage of the total time of a camera frame.

In some implementations, when both superpixel and curtain modulations are performed simultaneously, all of the bits of the code encoded by superpixel modulation may be presented during each camera frame. More specifically, in some implementations: (a) the superpixel modulation signals that are applied to n different pixel sets may together comprise an n-bit binary code; (b) each bit of the code may correspond to a different time interval during a single frame of the camera; (c) the amount of time that it takes to present all n bits of the n bit code may equal the amount of time that elapses in single frame of the camera; and (d) all of the bits of the code may occur in a single frame of the camera.

In illustrative implementations, when both superpixel and curtain modulations are performed simultaneously, the dot of light for curtain modulation may traverse the same path in each camera frame. Thus, in each camera frame, the dot of light may start at the same starting point, traverse the same path, and end at the same ending point. As the laser light traverses this path during each camera frame, the laser light may illuminate different parts of the scene at different times during each frame, such that each part of the scene is illuminated at least once during each frame. For example: (a) the path that the dot of light travels during a single camera frame may comprise moving vertically up repeatedly, such that, during the single frame, the dot of light traverses an entire 2D spatial region by traveling up different vertical "columns" of the region; (b) the path may start at the bottom right corner of the 2D spatial region, repeatedly go up different vertical "columns" of the region, and end at the upper left corner of the region; and (c) during portions of the path, the dot of light may be "off" (and thus the path may have gaps that occur when the dot of light is off).

In illustrative implementations, the movement of the dot of light for curtain modulation may be achieved by rotating a galvo mirror. This rotation may cause a laser beam to deflect in different directions and to illuminate a scene with a moving dot of laser light. For example, the galvo mirror may cause a mirror to rotate by 40 degrees during each vertical upward move of the dot of light. As the dot of light moves from the top of one "column" to the bottom of the adjacent "column", the dot of light may be off.

In some cases, both curtain and superpixel modulation may be achieved by controlling storage of electric charge. In those cases, a particular pixel may be sensitive to light for a given time period only if the combined effect of the curtain and superpixel modulation signals is such that electric charge accumulated in the photodiode for that time period is transferred to storage (e.g., floating diffusion) and is not flushed.

In some cases, both curtain and superpixel modulation may be achieved by one or more SLMs (e.g., reflective or transmissive SLMs) selectively attenuating light. In these cases, a particular pixel may be sensitive to light for a given time period only if, during that time period, the combined effect of the curtain and superpixel modulation signals is such that light from the scene reaches the pixel and is not blocked (or deflected away) by one or more of the SLMs.

In illustrative implementations, the frequency of curtain modulation may be greater than the frequency of superpixel modulation. For example, during each period of a superpixel modulation signal, the dot of light for curtain modulation may move up many vertical "columns" of the scene.

In illustrative implementations, the frequency of each curtain modulation signal may be greater than the frequency of each superpixel modulation signal The following seventeen paragraphs describe a non-limiting example of this invention. In this example, the frequency of each curtain modulation signal is greater than the frequency of each superpixel modulation signal.

In this example, the photodetector comprises 1998×1500 pixels, that is 1998 columns of pixels and 1500 rows of pixels. There are nine pixel sets. Each superpixel comprises 9 pixels, arranged in a 3×3 matrix. Each superpixel contains one pixel from each of the pixel sets. The photodetector comprises 666×500 superpixels.

In this example, the dot of light goes up 1998 times during each camera frame (each vertical movement up may be considered as movement in a vertical "column").

In this example, the dot of light displaces horizontally from the right to the left, after each vertical movement up. There are 1998 up movements of the dot of light during each camera frame. The dot of light is off during each down movement, as the dot of light moves from the top of one column to the bottom of another column of the photodetector. Each up movement is shifted by 1/1998 of the horizontal range, relative to the previous up movement (the horizontal range being the range of horizontal movement of the dot of light during a single camera frame). In this example, the horizontal range is 50 degrees. Thus, each horizontal displacement of the dot of light, from one vertical column to the adjacent vertical column while the dot of light is off, is achieved by a galvo mirror rotating approximately 1.5 arcminutes. Each vertical movement up of the dot of light, while the dot of light is on, is achieved by a galvo mirror rotating approximately 40 degrees (i.e., 2,400 arcminutes). Thus, the mirror for vertical movement of the dot of light is rotating much faster than the mirror for the horizontal movement of the dot of light.

In this example, the superpixel modulation signals encode a 9-bit binary code. There are 9 separate superpixel modulation signals, one for each of the 9 pixel sets.

In this example, during a single frame of the camera: (a) the superpixel modulation signal for pixel set #1 goes high-and-low 1 time; (b) the superpixel modulation signal for pixel set #2 goes high-and-low 2 times; (c) The superpixel modulation signal for pixel set #3 goes high-and-low 4 times; (d) the superpixel modulation signal for pixel set #4 goes high-and-low 8 times; (e) the superpixel modulation signal for pixel set #5 goes high-and-low 16 times; (f) the superpixel modulation signal for pixel set #6 goes high-and-low 32 times; (g) the superpixel modulation signal for pixel set #7 goes high-and-low 64 times; (h) the superpixel modulation signal for pixel set #8 goes high-and-low 128 times; and (i) the superpixel modulation signal for pixel set #9 goes high-and-low 256 times. Each time that a superpixel modulation signal goes high and then low is a period of that signal. Thus, in this example: (a) the superpixel modulation signal for pixel set 1 has one period in each camera frame; (b) the superpixel modulation signal for pixel set 5 has 16 periods in each camera frame; and (c) the superpixel modulation signal for pixel set 9 has 256 periods in each camera frame.

In this example, each superpixel modulation signal is a square wave with a duty cycle of 50%. That is, in this example, the proportion of ON and OFF in each superpixel modulation signal is 50:50.

In this example, the curtain window width is 9 pixels (3 superpixels).

In this example, the curtain modulation signal for each row of pixels goes high-and-low 1998 times during one camera frame. During each period of the curtain modulation signal, the signal goes high and then low. For each row of pixels, the curtain modulation signal is high approximately 9/1998=0.45% of the total time of each camera frame. (The curtain modulation signal is high at different times for different rows of pixels.). For approximately 1989/1998=99.65% of each camera frame, the curtain modulation signal for a given row of pixels is low.

Thus, in this example, for a given row of pixels, the curtain modulation signal will be low most of the time, and will be high during 1998 very short peaks in each camera frame. These peaks are regularly spaced in time throughout the total duration of the camera frame.

In this example, for the pixel from pixel set #9 in a given superpixel, there will be approximately 7.8 peaks of curtain modulation during one period of superpixel modulation.

In this example, the TX gate of a given pixel is high approximately 0.45%*50%=0.225% of the time during a camera frame.

In this example, 1998 periods of the curtain modulation signal for a given pixel occur during a single camera frame. The framerate of the camera is 30 fps (frames per second). Each camera frame has a duration of approximately 33 ms.

Thus, in this example, the curtain modulation signal for a given pixel has a frequency of approximately 60 kHz. In this example, the curtain modulation signal is a pulse wave signal with proportion of 9:1989 ON:OFF. The length of one ON pulse will be approx. 75 nanoseconds.

In this example, the highest frequency superpixel modulation is the superpixel modulation for pixel set #9. The superpixel modulation signal for pixel set #9 has 256 periods during each camera frame—that is, 7680 periods per second. The superpixel modulation signal is a square wave with a 50% duty cycle (50:50 ON:OFF).

Thus, in this example, the fastest superpixel modulation signal has a frequency of approximately 7.6 kHz and the curtain modulation signal has a frequency of approximately 60 kHz. The latter signal has a higher frequency than the former.

In this example, each pixel will be sensitive to light only when both the curtain and superpixel modulation signals for that pixel are high. (This is because, in this example, whether a given pixel is sensitive to light is a binary state that is the logical AND of the curtain and modulation signals.).

In this example, the superpixel modulation signal is high during 50% of each camera frame and the curtain modulation signal is high during approximately 0.45% of each camera frame. In this example, a given pixel is sensitive to light in many small periods of time during each camera frame. In this example, these small periods of time in each camera frame are (taken together) equal to approximately (0.5×0.0045)%=0.00225% of the total time of each camera frame.

The example described in the preceding seventeen paragraphs is non-limiting. This invention may be implemented in many other ways.

In the above example, the number of vertical columns of movement of the dot of light during each frame is equal to the number of columns of pixels in the photodetector. However, the number of vertical columns of movement does not have to be equal to the number of columns of pixels in the photodetector. Alternatively, the number of vertical columns of movement may be lower (or higher) than the number of columns of pixels in the photodetector. In some cases, the number of columns of vertical movement is evenly divisible by the number of columns of pixels (or superpixels), or vice versa. In other cases, these numbers are not evenly divisible by each other, or are co-prime with each other.

Increasing the frequency of the curtain modulation signals—and thus increasing the number of vertical (or horizontal) movements of the dot of light—has both advantages and disadvantages. Increasing the frequency of curtain modulation signals may improve the SNR and the resolution of the scan, but may require a faster transistor switching speed and may make synchronization more difficult.

In many examples of this invention, each pixel in the active region is sensitive to light during portion(s) of each period of the superpixel modulation signal and is not sensitive to light during other portion(s) of each period of the superpixel modulation signal. In these examples, at many times during each camera frame, less than all of the pixels in each superpixel are sensitive to light—even in the active region of the photodetector.

Figure 40:
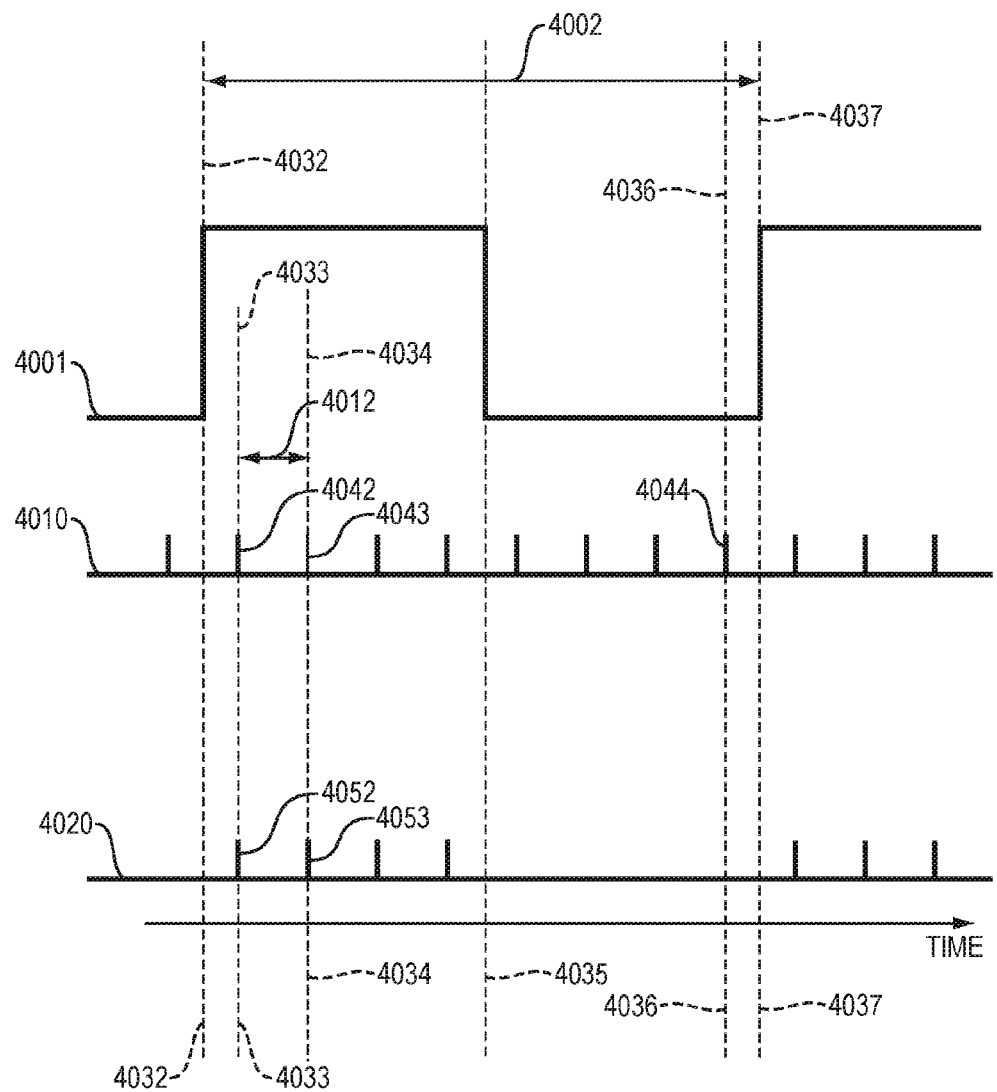
FIG. 40 shows an example of curtain and superpixel modulation signals that control a pixel's sensitivity to light.

FIG. 40 shows an example of curtain and superpixel modulation signals that control a pixel's sensitivity to light. FIG. 40 shows three signals for the pixel: a superpixel modulation signal 4001, a curtain modulation signal 4010, and a signal 4020 that controls the pixel's time-varying sensitivity to light (the "light sensitivity signal").

In the example shown in FIG. 40, the superpixel modulation signal 4001 for the pixel is a square wave with a 50% duty cycle. Each period of the superpixel modulation signal 4001 consists of the signal going high then low. For example, period 4002 of the superpixel modulation signal 4001 starts at time 4032 and ends at time 4037. The same superpixel modulation signal 4001 is applied to all pixels in the pixel set of which the pixel is a member.

In the example shown in FIG. 40, the curtain modulation signal for the pixel is a pulse wave with a 0.45% duty cycle (i.e., the signal is high 0.45% of each period and low 99.55% of each period). Each period of the curtain modulation signal 4010 consists of a short pulse (in which the signal goes high) followed by a much longer period in which the signal is low. For example, period 4012 of the curtain modulation signal 4010 starts at time 4033 and ends at time 4034. The same curtain modulation signal 4010 is applied to the entire row of pixels, of which the pixel is a member.

In the example shown in FIG. 40, a total of approximately 7.8 periods of the curtain modulation signal 4010 occur in each period of the superpixel modulation signal 4001.

In the example shown in FIG. 40, the light sensitivity signal 4020 (which controls the pixel's sensitivity to light) is the logical AND of the pulsed curtain modulation signal 4010 and the square-wave superpixel modulation signal 4001. Thus, the light sensitivity signal 4020 is high only when the curtain modulation signal 4010 and the superpixel modulation signal 4001 are both simultaneously high. For example, pulse 4052 of the light sensitivity signal 4020 occurs at time 4033, when pulse 4042 of the curtain modulation signal 4010 occurs and the superpixel modulation signal 4001 is high. Likewise, pulse 4053 of the light sensitivity signal 4020 occurs at time 4034, when pulse 4043 of the curtain modulation signal 4010 occurs and the superpixel modulation signal 4001 is high. A pulse of the light sensitivity signal 4020 does not occur at time 4036, because superpixel modulation signal 4001 is low then. In the example shown in FIG. 40: (a) the light sensitivity signal 4020 for the pixel is high (and pulse 4052 occurs) when the pixel is receiving light from the light source that is directly reflecting from the scene.

In many implementations, the rising and falling edges of the superpixel modulation signal 4001 are not synchronized with the pulses of the curtain modulation signal 4010. For example, in FIG. 40, the rising and falling edges of the superpixel modulation signal 4001 occur at different times (e.g., 4032, 4035, 4037) than do the pulses (e.g., 4042, 4043, 4044) of the curtain modulation signal 4010.

The above description of FIG. 40 describes a non-limiting example of this invention; this invention may be implemented in other ways.

Figure 41:
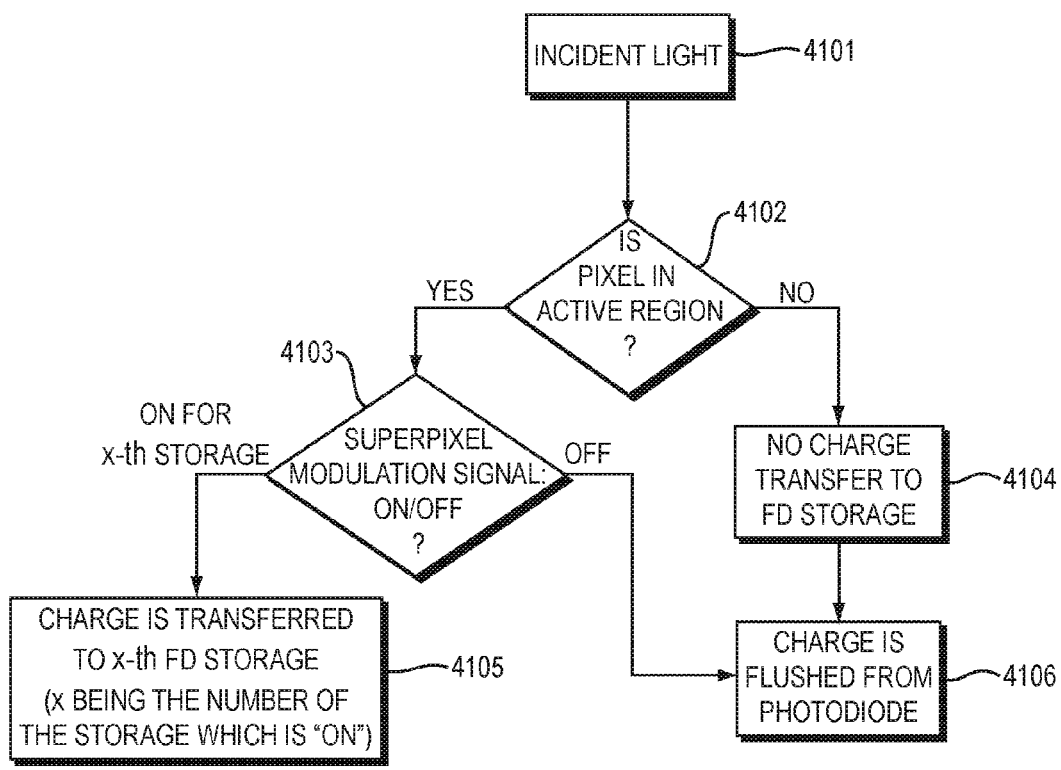
FIG. 41 is a flowchart that shows a method for curtain modulation and superpixel modulation.

FIG. 41 is a flowchart that shows a method for curtain modulation and superpixel modulation. In FIG. 41, both of the modulations are achieved by controlling the storage of electric charge that accumulates in the photodiode. In the example shown in FIG. 41, the method includes the following steps: Light from a scene in incident on the photodiode throughout the entire method (Step 4101). A curtain modulation signal is applied to the pixel. If the curtain modulation signal is high, then the pixel is in the active region of the photodetector. If the curtain modulation signal is low, then the pixel is not in the active region (Step 4102). If the pixel is not in the active region, then charge in the photodiode is not transferred to floating diffusion (FD) storage (Step 4104). A superpixel modulation signal is applied to the pixel, which superpixel modulation signal is either on or off (high or low) (Step 4103). If the pixel is in the active region and the superpixel modulation signal is high, then charge is transferred from the photodiode to FD storage (Step 4105). If the superpixel modulation signal is low, then charge is flushed from the photodiode and is not stored in FD storage (Step 4106).

Figure 42:
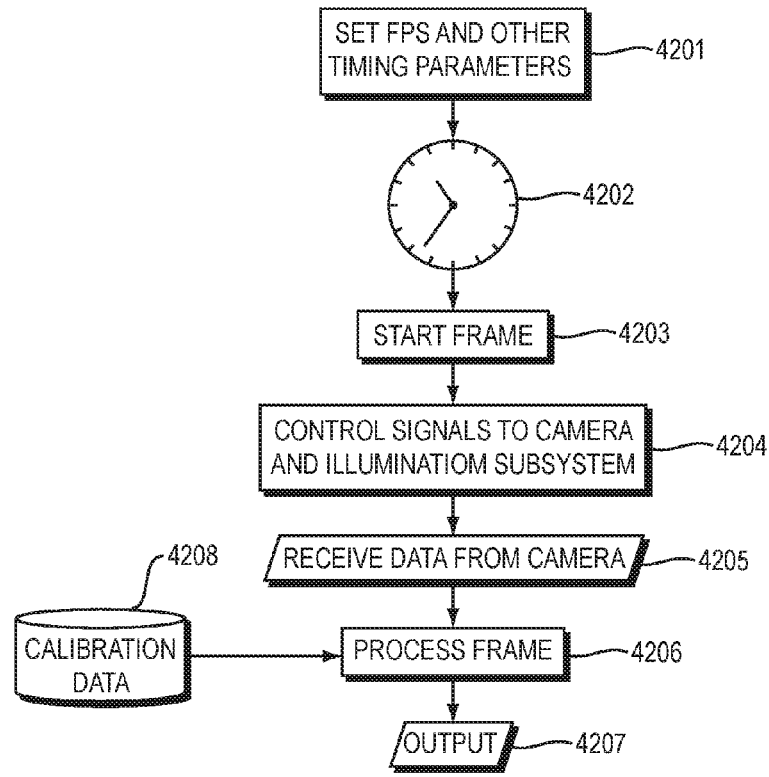
FIG. 42 is another flowchart that shows a method for curtain modulation and superpixel modulation.

FIG. 42 is another flowchart that shows a method for curtain modulation and superpixel modulation. In the example shown in FIG. 42, the method includes the following steps: Set FPS (frames per second) and other timing parameters (Step 4201). An electronic clock sends clock signals. For example, the electronic clock may include an electronic oscillator regulated by a quartz crystal (Step 4202). Start frame (Step 4203). Output control signals to control the camera subsystem and the illumination subsystem. In some implementations, the camera subsystem includes an SLM (such as a DMD or LCD) for selectively attenuating light before the light reaches the photodetector. The control signals that control the camera subsystem may include curtain modulation signals and superpixel modulation signals. The control signals that control the illumination system: (a) may include signals that turn a light source on and off (either by causing the light source to not emit light or by occluding light from the light source); and (b) may include signals that control galvos (i.e., galvanometers that move mirrors to different positions to vary the angle at which laser light is reflected from the mirrors.) (Step 4204). Receive data from camera (Step 4205). Process a camera frame (Step 4206), taking into account calibration data that was previously acquired (Step 4208). Output resulting data (Step 4207).

Modulation of Storage

In illustrative implementations, sensitivity of a CMOS pixel to light may be controlled—for superpixel modulation, or for curtain modulation, or for both—by controlling storage of charge in the CMOS pixel. Thus: (a) in some cases, superpixel modulation signals control the sensitivity of a CMOS pixel to light, by controlling storage of charge in the CMOS pixel; (b) in some cases, curtain modulation signals control the sensitivity of a CMOS pixel to light, by controlling storage of charge in the CMOS pixel; and (c) in some cases, both curtain modulation signals and superpixel modulation signals control the sensitivity of a CMOS pixel to light, by controlling storage of charge in the CMOS pixel.

In most implementations in which control of storage of charge in pixels is employed to modulate sensitivity of the pixels to light, the modulation signals (e.g., current modulation signals or superpixel modulation signals) do not directly control the storage of charge in a pixel. Instead, electronic circuitry in the photodetector, or in the camera circuitry, or in the control unit may convert each modulation signal (e.g., current modulation signal or superpixel modulation signal) to one or more intermediate signals, which directly or indirectly control the storage of charge in the pixels. These intermediate signals may control storage of charge by controlling timing within each pixel or pixel set, such as the timing of (i) photodiode reset, (ii) floating diffusion reset, (iii) readout, (iv) transfer of charge from photodiode to floating diffusion or to a capacitive bin; or (v) CCD shifts, in the case of a CCD. For example, in some implementations using CMOS pixels, the intermediate signals comprise high or low (binary values) of voltage applied to TX, TXi, TXi1, TXi2, TXi3, RST, RST1, RST2, RST3, TD ROW, PD RST, PD RST ROW or CURTAIN ROW (which are discussed below). In some cases, changes in an intermediate signal are triggered by the rising edge, falling edge or both of the modulation signal. In some cases, changes in an intermediate signal occur at a specified delay after the rising edge, falling edge or both of the modulation signal. In some cases, changes in an intermediate signal are the logical complement of the modulation signal (i.e., 0 if the modulation signal is 1, or 1 if the modulation signal is 0). In some cases, an intermediate signal that triggers transfer of charge from a photodiode to floating diffusion (i) becomes high when the modulation signal goes from high to low, stays there for a small amount of time necessary to transfer the charge, and goes low; and (ii) ignores the low-to-high transition of modulation signal.

FIGS. 5-10 and 12-18 show non-limiting examples of hardware and intermediate signals for controlling timing in pixels, in order to control storage of charge in pixels and thus to control sensitivity of the pixels to light. The modulation signals (current modulation signals or superpixel modulation signals) that directly or indirectly control the intermediate signals are not shown in FIGS. 5-10 and 12-18.

Figure 5:
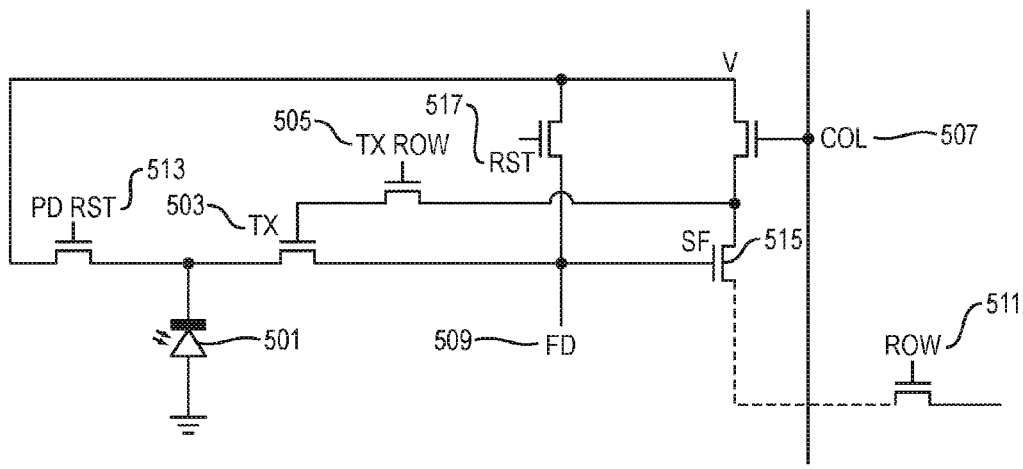
FIGS. 5, 7 and 9 are each a circuit schematic for a portion of a CMOS pixel, which pixel has one floating diffusion storage device.
Figure 7:
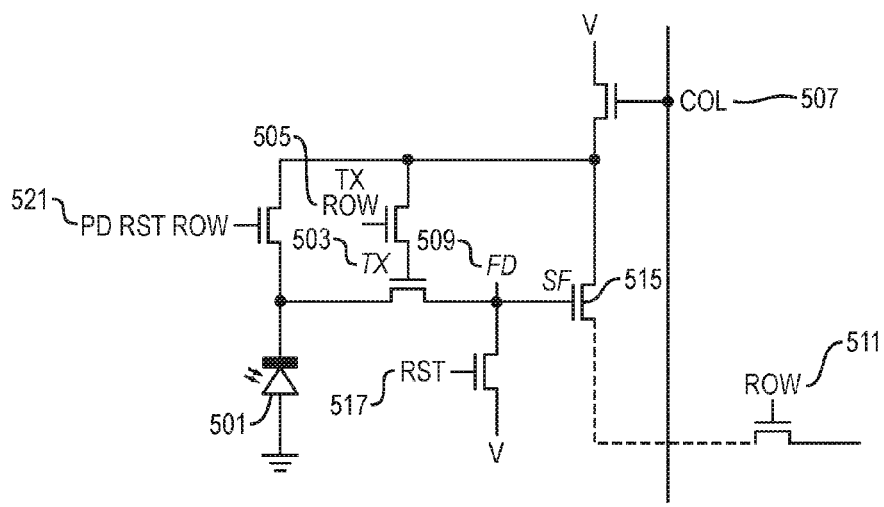
Figure 9:
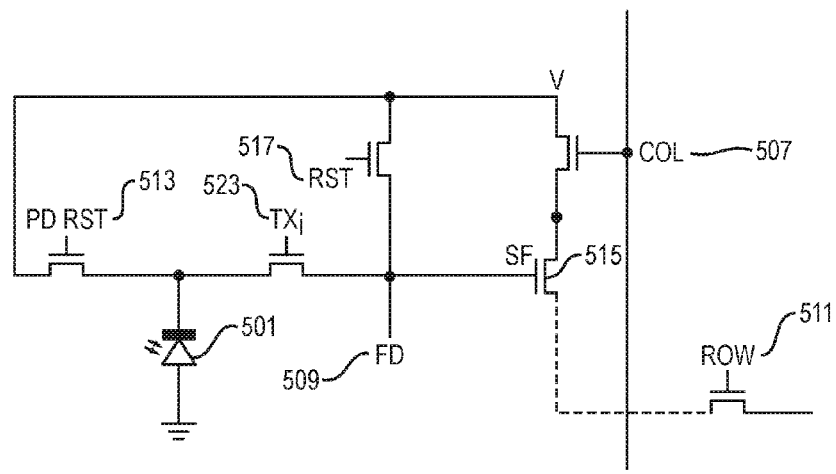

FIGS. 5, 7 and 9 show three examples of CMOS circuits, in illustrative implementations of this invention. FIGS. 5, 7 and 9 are each a circuit schematic for a portion of a CMOS pixel. The CMOS pixel has one floating diffusion storage device.

COL means column selector 507.

FD means floating diffusion 509. The floating diffusion stores electric charge.

PD RST means photodiode reset transistor 513.

ROW means row selector 511.

TX means gate transistor 503 in FIGS. 5 and 7.

TXi means gate transistor 523 in FIG. 9.

TX ROW means row selector 505 for charge transfer.

PD RST ROW means photodiode row selector 521.

RST means floating diffusion reset transistor 517. RST causes floating diffusion 509 to be reset (i.e., the charge in floating diffusion 509 to be drained) when RST is high.

SF means source follower 515. The source follower is used during the readout.

V means voltage source.

Figure 6:
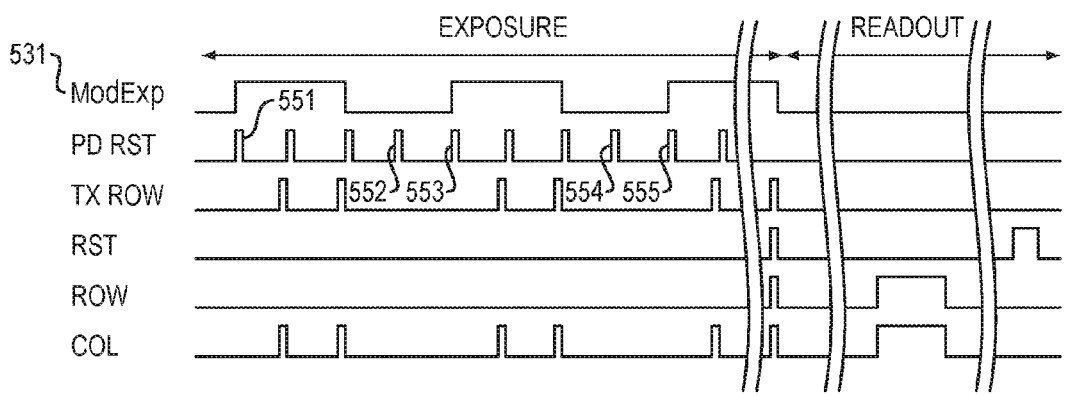
FIGS. 6, 8 and 10 are timing diagrams for FIGS. 5, 7 and 9, respectively.

In FIGS. 5 and 6, TX causes charge to be transferred from the photodiode 501 to floating diffusion 509 when voltages at COL and TX ROW are simultaneously high. In FIGS. 5 and 6, the TX ROW and COL signals that are applied to a pixel are simultaneously high when the both of the following occur at the same time (i) the pixel is in the active region of the photodetector and (ii) the superpixel modulation for the pixel is high. In FIGS. 5 and 6, the time period in which TX ROW and COL are simultaneously high is a short pulse before PD RST goes high. (Recall that, in illustrative implementations: (a) a superpixel modulation signal is applied to an entire pixel set; (b) when a superpixel modulation signal is applied to a pixel, it is applied to the entire pixel set of which the pixel is a member; and (c) each superpixel includes multiple pixels, each from a different pixel set. For example, in some cases: (a) there are nine pixel sets and nine separate superpixel modulation signals; (b) each superpixel includes 9 pixels, one pixel from each of the pixel sets; (c) a separate modulation signal is applied to each of the pixel sets; and (d) thus 9 separate superpixel modulation signals are applied to the pixels in each superpixel, one for each pixel.)

Figure 10:
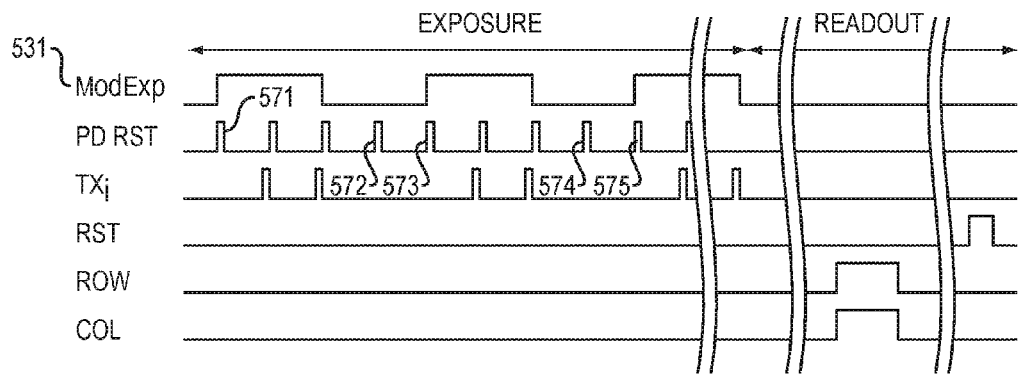

In FIGS. 9 and 10, TXi causes charge to be transferred from the photodiode 501 to the storage FD 509 when TXi is high. In FIGS. 9 and 10, the TXi signal for a pixel is high when the pixel is in the active region of the photodetector and simultaneously the superpixel modulation for the pixel is high.

Figure 8:
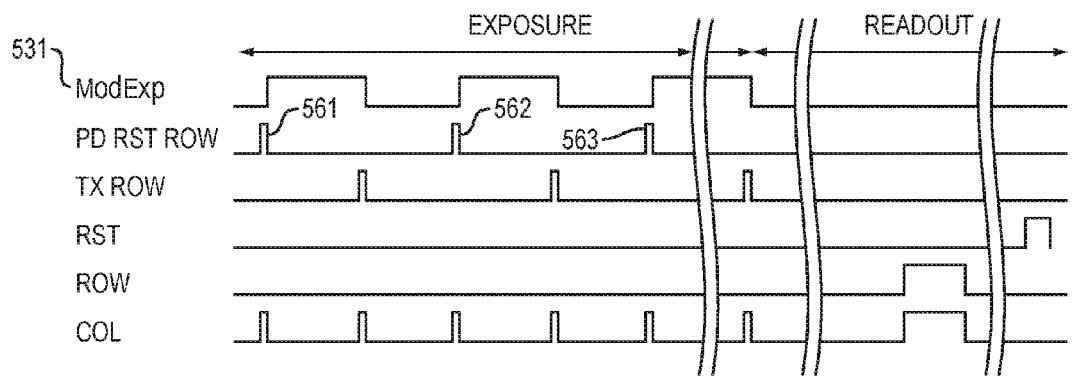

In FIGS. 7 and 8, PD RST causes photodiode 501 to be reset (that is, the charge in photodiode 501 to be drained) when COL and PD RST ROW are simultaneously high. In FIGS. 7 and 8, the COL and PD RST ROW signals that are applied to a pixel are simultaneously high at the following times (in addition to other times): (a) a short pulse when the pixel enters the active region of the photodetector; or (b) the entire time that the pixel is not in the active region of the photodetector.

In FIGS. 5, 6, 9 and 10, PD RST causes photodiode 501 to be reset (that is, the charge in photodiode 501 to be drained) when PD RST is high. In FIGS. 5, 6, 9 and 10, the PD RST signal that is applied to a pixel is high at the following times (in addition to other times): (a) at short pulse when the pixel enters the active region of the photodetector; or (b) the entire time that the pixel is not in the active region of the photodetector.

In FIGS. 5, 6, 7, 8, 9 and 10, readout occurs when voltages at COL and ROW are simultaneously high.

FIGS. 6, 8 and 10 are timing diagrams for FIGS. 5, 7 and 9, respectively. In FIGS. 6, 8 and 10, the entire exposure occurs during a single camera frame, and readout and floating diffusion reset occur after the frame. In FIGS. 6, 8 and 10, ModExp 531 is a modulation signal that is one of the components of the n-bit code. Certain other signals in these Figures are derived from ModExp, as discussed below.

At multiple times during the single camera frame, the then accumulated charge in photodiode 501 is transferred to floating diffusion 509 (i.e., each time that the voltages at COL and TX ROW are simultaneously high).

Also, at multiple other times during a single camera frame, the then accumulated charge in photodiode 501 is drained without being readout or measured (e.g., when PD RST is high during 551, 552, 553, 554, 555 in FIG. 6, when both PD RST ROW and COL are high during 561, 562, 563 in FIG. 8, and when PD RST is high during 571, 572, 573, 574, 575 in FIG. 10).

Figure 11A:
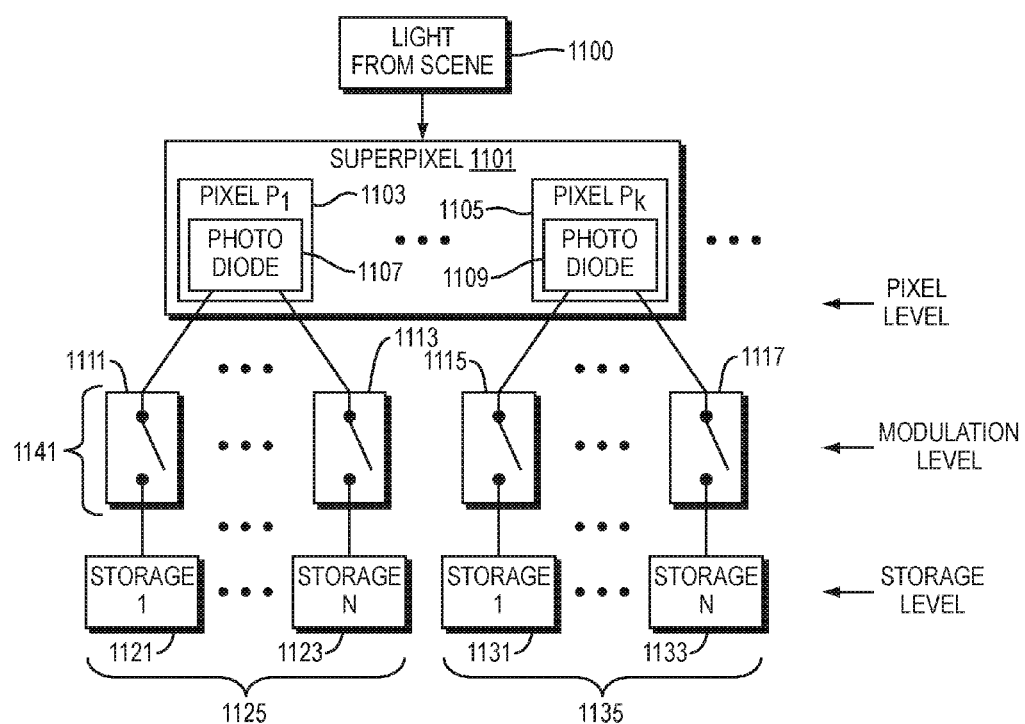
FIG. 11A, FIG. 11B and FIG. 11C are conceptual diagrams of a superpixel, in which each pixel has multiple storage devices.
Figure 11B:
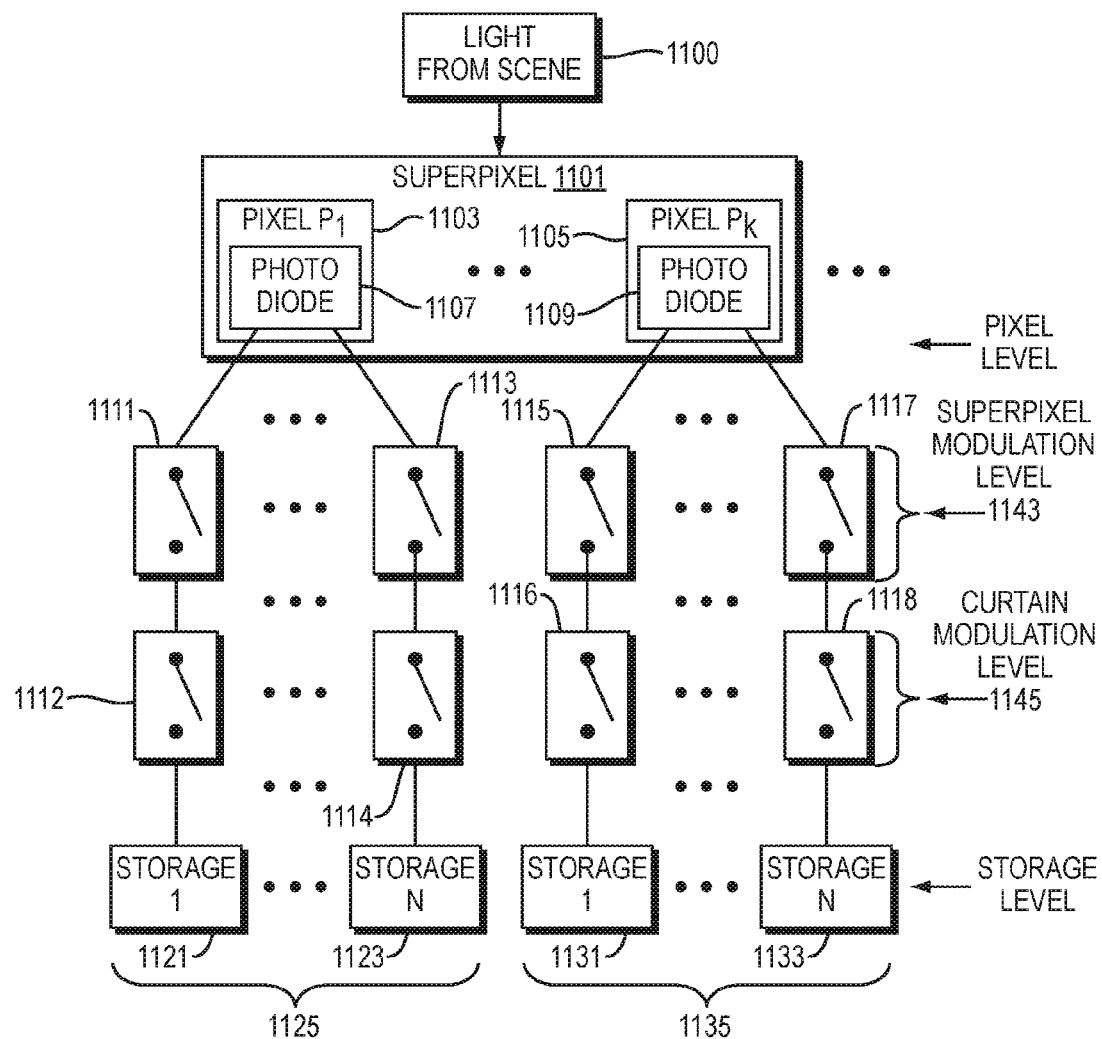
Figure 11C:
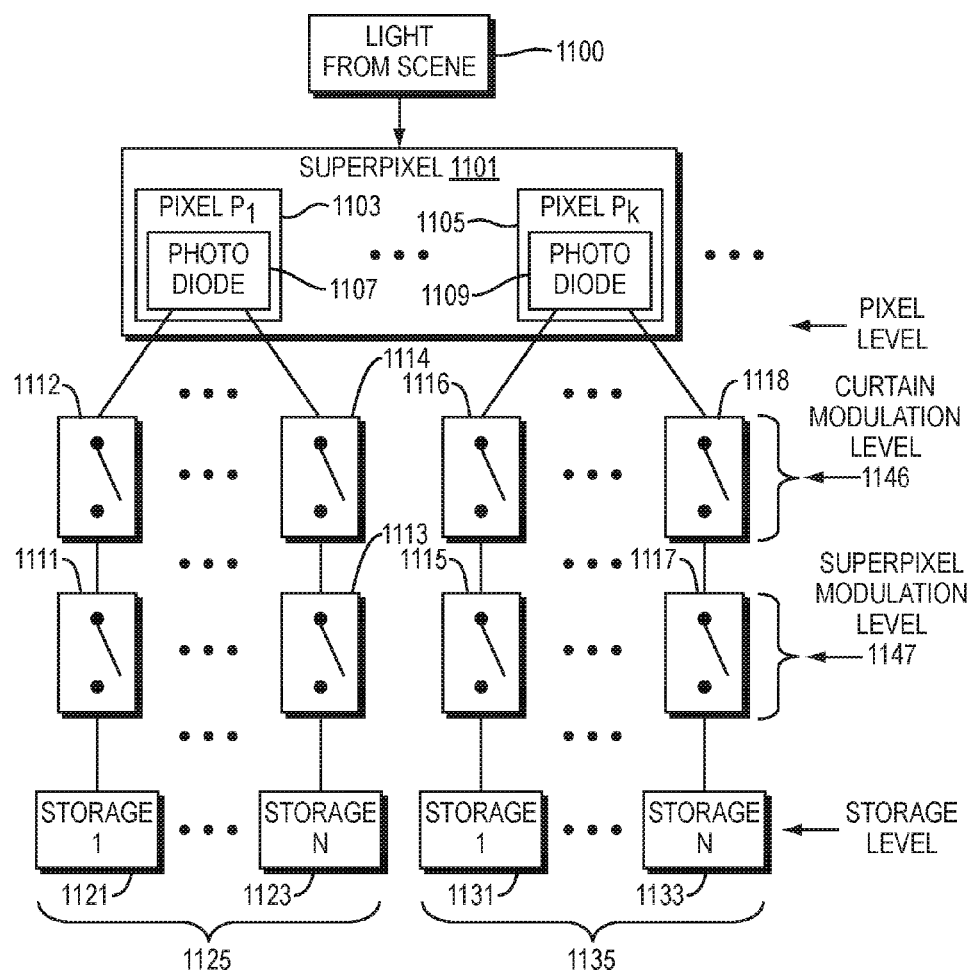

FIG. 11A, FIG. 11B and FIG. 11C are conceptual diagrams of a superpixel, in which each pixel has multiple storage devices. In FIG. 11A, the same transfer gates are employed for superpixel modulation and curtain modulation. In FIGS. 11B and 11C, different transfer gates are employed for superpixel modulation and for curtain modulation.

In FIGS. 11A-11C, each pixel stores charge to multiple storage devices. Each of these multiple storage devices is dedicated to only that pixel and does not store charge for any other pixel. For example, in FIGS. 11A-11C, pixel 1103 has a set of multiple storage devices 1125, and pixel 1105 has a non-overlapping set of multiple storage devices 1135.

In the example shown in FIG. 11A, light from a scene 1100 strikes the photodiode (e.g., 1107, 1109) of each pixel (e.g., 1103, 1105) in a superpixel 1101. For each pixel, modulation signals cause the then accumulated photodiode charge in the pixel to be transferred to one of the storage devices for that pixel. Which storage device receives a particular transfer of charge is determined based on the modulation signal. For example, for pixel 1103, a modulation signal causes transfer gate 1111 to transfer charge from photodiode 1107 to storage device 1121 at some times during a single camera frame, and causes transfer gate 1113 to transfer charge from photodiode 1107 to storage device 1123 at some other times during the camera frame. Likewise, for pixel 1105, a different modulation signal causes transfer gate 1115 to transfer charge from photodiode 1109 to storage device 1131 at some times during a single camera frame, and causes transfer gate 1117 to transfer charge from photodiode 1109 to storage device 1133 at some other times during the camera frame.

In the example shown in FIG. 11A, a single level of transfer gates 1141 includes transfer gates 1111, 1113, 1115, 1117). This single level of hardware 1141 is controlled by the logical AND of the signals for superpixel modulation and curtain modulation.

FIGS. 11B and 11C are the same as FIG. 11A, except that different hardware levels are employed for curtain modulation and superpixel modulation, respectively. In FIGS. 11B and 11C, curtain modulation occurs at levels 1145 and 1146, respectively. Levels 1145 and 1146 comprise transfer gates (including transfer gates 1112, 1114, 1116, 1118). In FIGS. 11B and 11C, superpixel modulation occurs at levels 1143 and 1147, respectively. Levels 1143 and 1147 comprise transfer gates (including transfer gates 1111, 1113, 1115, 1117). For example, in FIGS. 11B and 11C, charge is transferred from photodiode 1107 to storage 1121 if and only if transfer gate 1111 (for superpixel modulation) and transfer gate 1112 (for curtain modulation) are both high. Thus, in FIG. 11B, the effect of two hardware levels 1143, 1145, taken together is that storage of electric charge is controlled by the logical AND of the curtain modulation and superpixel modulation. Likewise, in FIG. 11C, the effect of two hardware levels 1146, 1147, taken together is that storage of electric charge is controlled by the logical AND of the curtain modulation and superpixel modulation. In FIGS. 11B and 11C, superpixel modulation and curtain modulation occur simultaneously. In FIG. 11B, superpixel modulation occurs spatially closer to the photodiode than does curtain modulation. In FIG. 11C, this spatial order is reversed: that is, curtain modulation occurs spatially closer to the photodiode than does superpixel modulation.

Figure 12:
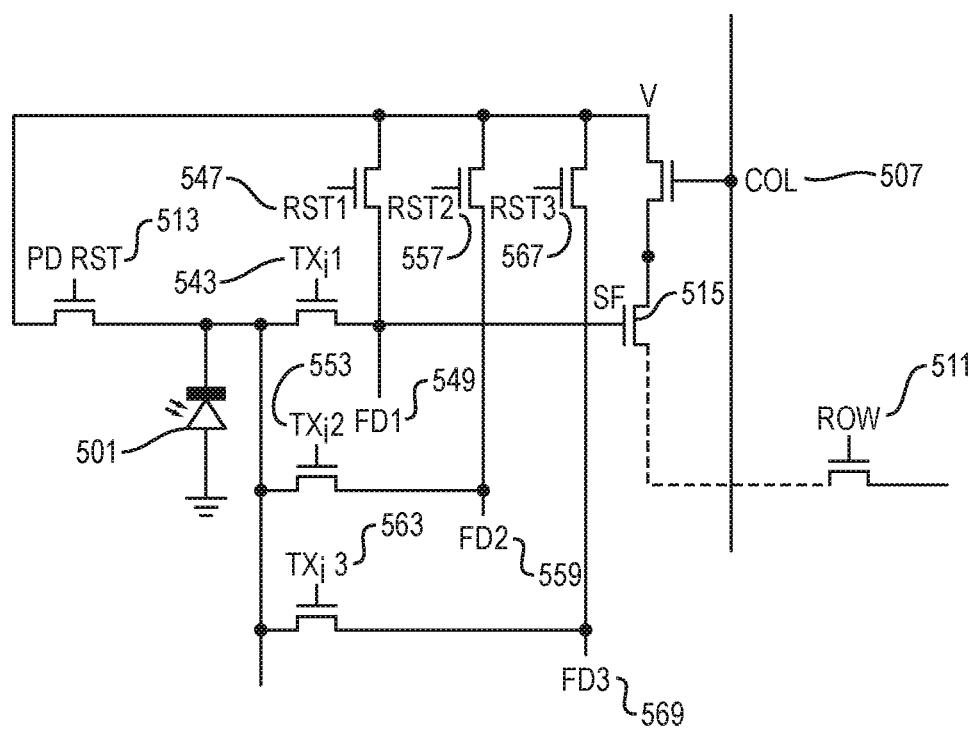
FIG. 12 a circuit schematic for a portion of a CMOS pixel that has three storage devices.

FIG. 12 is a circuit schematic for a portion of a CMOS pixel that has three floating diffusion storage devices.

COL means column selector 507.

FD1 is floating diffusion 549. FD2 is floating diffusion 559. FD3 is floating diffusion 569.

PD RST is photodiode reset transistor 513. In FIG. 12, PD RST causes photodiode 501 to be reset (that is, the charge in photodiode 501 to be drained) when PD RST is high. In FIG. 12, the PD RST signal that is applied to a pixel is high at the following times (in addition to other times): (a) a short pulse when the pixel enters the active region of the photodetector; or (b) the entire time that the pixel is not in the active region of the photodetector.

ROW is row selector 511.

In FIG. 12, RST1 is floating diffusion reset transistor 547. RST2 is floating diffusion reset transistor 557. RST3 is floating diffusion reset transistor 567. In FIG. 12: (a) RST1 causes floating diffusion 509 to be reset when RST1 is high; (b) RST2 causes floating diffusion 509 to be reset when RST2 is high; and (c) RST3 causes floating diffusion 509 to be reset when RST3 is high. The reset causes charge in floating diffusion 509 to be drained. SF is source follower 515. In illustrative implementations, RST1, RST2, RST3 are high only after readout, in order to reset FD1, FD2, FD3, respectively, to a "zero state" before the next frame begins.

In FIG. 12, TXi1 is transfer gate 543. TXi2 is transfer gate 553. TXi3 is transfer gate 563.

In FIG. 12: (a) TXi1 causes charge to be transferred from the photodiode 501 to the storage FD1 549 when TXi1 is high; (b) TXi2 causes charge to be transferred from the photodiode 501 to the storage FD2 559 when TXi2 is high; and (c) TXi3 causes charge to be transferred from the photodiode 501 to the storage FD3 569 when TXi3 is high.

In some implementations, signals control storage of charge for CCD pixels for superpixel modulation, or for curtain modulation, or for both.

In illustrative implementations, sensitivity of CCD pixels to light may be controlled—for superpixel modulation, or for curtain modulation, or for both—by controlling storage of charge in the CCD pixels. Thus: (a) in some cases, superpixel modulation signals control the sensitivity of CCD pixels to light, by controlling storage of charge in the CCD pixels; (b) in some cases, curtain modulation signals control the sensitivity of CCD pixels to light, by controlling storage of charge in the CCD pixels; and (c) in some cases, both curtain modulation signals and superpixel modulation signals control the sensitivity of CCD pixels to light, by controlling storage of charge in the CCD pixels.

Figure 13:
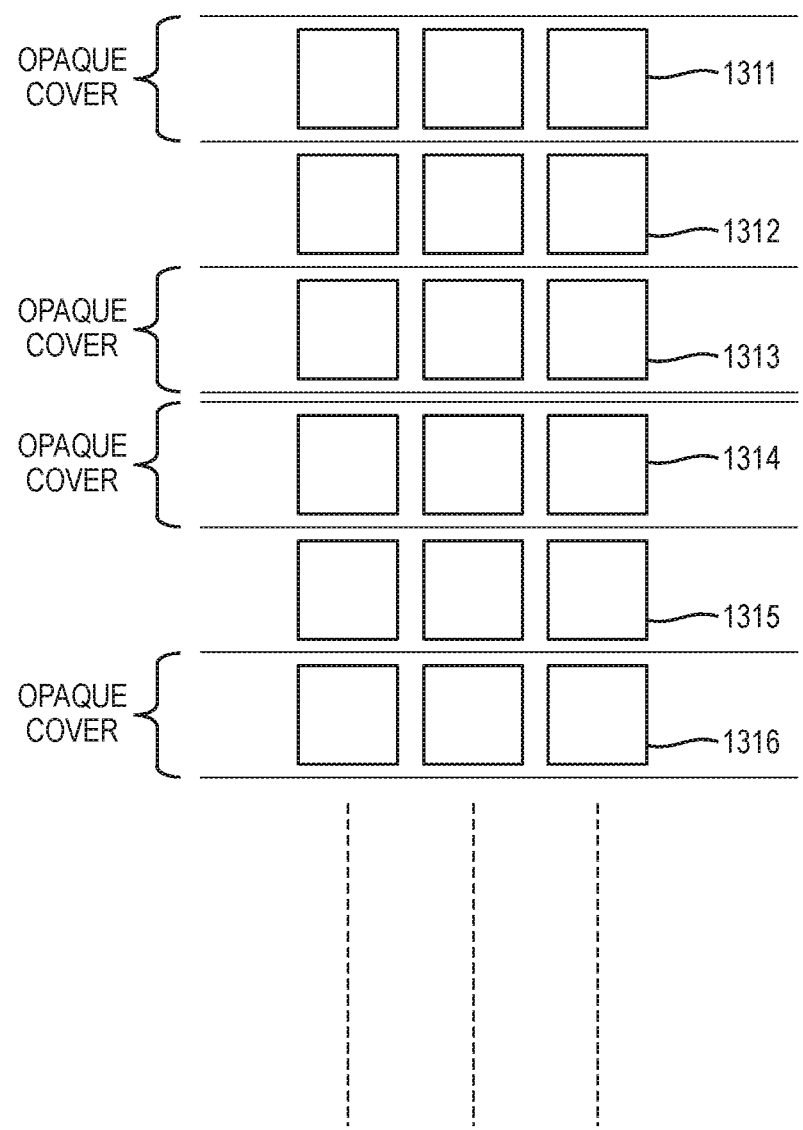
FIG. 13 is a conceptual diagram of CCD pixels, in which each pixel has two storage devices.

FIG. 13 is a conceptual diagram of CCD pixels, in which each pixel has two storage devices. During a single camera frame, for each pixel in the array, charge is transferred from the photodiode of the pixel at some times to one of the storage devices for the pixel, and at other times to the other storage device for the pixel. For example, during a single camera frame: (a) a modulation signal may cause the then accumulated photodiode charge in position 1312 to be transferred to a capacitive bin at position 1311 at some times, and to be transferred to a capacitive bin at position 1313 at some other times; and (b) a separate modulation signal may cause the then accumulated photodiode charge at position 1315 to be transferred to a capacitive bin at position 1314 at some times, and to be transferred to a capacitive bin at position 1316 at some other time.

In the example shown in FIG. 13, after the end of the frame, the charges may be shifted down each column of the array in a conventional CCD manner. For example, charge may be read out from the capacitive bin at position 1316 at the edge of the array, then the charge at position 1315 may be shifted to the capacitive bin at position 1316, then the charge in the capacitive bin at position 1314 may be shifted to position 1315, then the charge in the capacitive bin at position 1313 may be shifted to the capacitive bin at position 1314, then the charge at position 1312 may be shifted to the capacitive bin at position 1313, then the charge in the capacitive bin at position 1311 may be shifted to position 1312. Then charge may be read out again from the capacitive bin at position 1316 at the edge of the array, and the cycle may continue.

Figure 14:
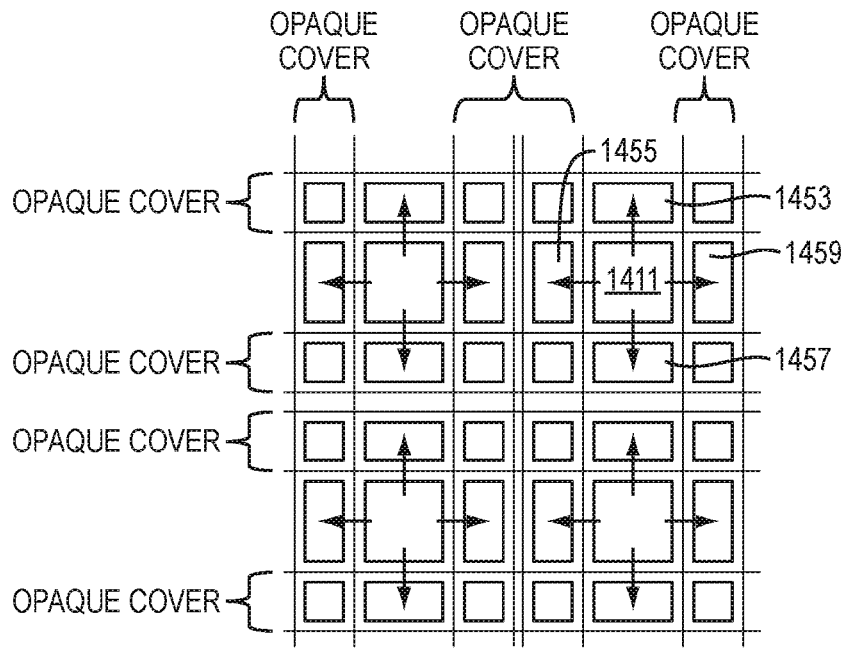
FIG. 14 is a conceptual diagram of CCD pixels, in which each pixel has four storage devices.

FIG. 14 shows an example of CCD pixels, in which each pixel has four storage devices. In FIG. 14, during a single camera frame, for each pixel in the array, charge is transferred from the photodiode of the pixel at some times to the first storage device for the pixel, at other times to the second storage device for the pixel, at yet other times to the third storage device for the pixel, and at yet other times to the fourth storage device for the pixel. For example, during a single camera frame, a superpixel modulation signal may cause the then accumulated photodiode charge in pixel 1411: (a) to be transferred to a capacitive bin at position 1453 at some times; (b) to be transferred to a capacitive bin at position 1455 at some other times; (c) to be transferred to a capacitive bin at position 1457 at some times; and (d) to be transferred to a capacitive bin at position 1459 at some other times. After the end of the frame, the charges may be shifted down each column of the array in a conventional CCD manner.

In a pixel with two storages, one storage is by convention considered to be the primary storage. The "on" state of modulation of such a pixel means that the charge is transferred to the primary storage. The "off" state of the modulation of such a pixel means that the charge is transferred to the secondary storage. The image recovered from the primary storages is the "positive" image, accumulated during the "on" phases. The image recovered from the secondary storages is the "negative" image, accumulated during the "off" phases. Summing these two together gives the total image, i.e. an image which would be captured by an ordinary (unmodulated) camera.

As used herein, a "multiple storage implementation" or "total charge implementation" means an implementation in which each pixel has multiple storage devices that receive charge only from that pixel during the exposure time of a frame. Such an implementation is sometimes called a "total charge implementation" to emphasize that charge is not, by design, drained at some times during the frame without being measured.

Multiple storage implementations are advantageous for at least two reasons.

First, in some multiple storage implementations, a computer calculates a dynamic threshold depending on the total illumination for a particular pixel. For example, in some cases, instead of having a fixed threshold for deciding whether a pixel's value represents a logical 0 or logical 1 in code $C_{x,y}$ (see discussion of FIG. 4), a computer compares the pixel's value to a threshold computed, for example, as 50% of the total value.

Second, in some multiple storage implementations, a computer calculates a total image for a single frame, by summing, for each pixel, the sum of the charges captured by the multiple storage devices for that pixel during that frame.

Delayed signals are desirable in some cases when it is known that different elements of the pixel circuit have different latencies, or require different times to transfer the charge.

In some implementations, constraints imposed by the hardware implementation require that the modulation signals satisfy one or more logical conditions. For example, in some multiple storage implementations, the following logical condition must be satisfied: at any one time, at most one modulation signal per pixel is in a state that triggers transfer of charge. This is because if more than one transfer gate is open, the charge from photodiode splits between the storages, which is undesirable. In some other implementations, a logical condition is that storage modulation signals add up to 1.

This invention is not limited to binary coding. As used herein, "n-ary code" means code in which the digits are expressed in base n, where n is an integer greater than 2. For example, 3-ary code is written in base 3, and is sometimes called ternary code.

In some embodiments of this invention, ternary code is used with pixels that each have two storage devices. In that case, three values of the ternary code ("A", "B", "C") signal may cause the charge to be transferred into storage "A", into storage "B", or trashed, respectively. In some cases: (a) each pixel has three storage devices; (b) ternary code is used; (c) instead of trashing the light in the "C" case, the charge is transferred into the third storage ("C"); and (d) A+B+C are summed to get the total amount of light.

In some implementations that employ n-ary code, each pixel has n−1 or n storages. In some implementations: (a) with n−1 storage devices per pixel, the n-ary code is recoverable; and (b) with n storage devices per pixel, the n-ary code and total amount of light are recoverable.

In some implementations that employ n-ary code and that use n storage devices per pixel, the values 0, 1, . . . , n−1 of the n-ary code may cause the charge to be transferred into the 1st, 2nd, . . . , nth storage, respectively. The total illumination image may be obtained by summing all values of the 1st, 2nd, . . . , nth storage.

In some implementations that employ n-ary code and that use n−1 storage devices per pixel, the value 0 may cause the photodiode charge to be drained without being saved for later readout. The values 1, . . . , n−1 of the n-ary code may cause the charge to be transferred into the 1st, 2nd, . . . , $(n-1)^{th}$ storage, respectively.

Figure 15:
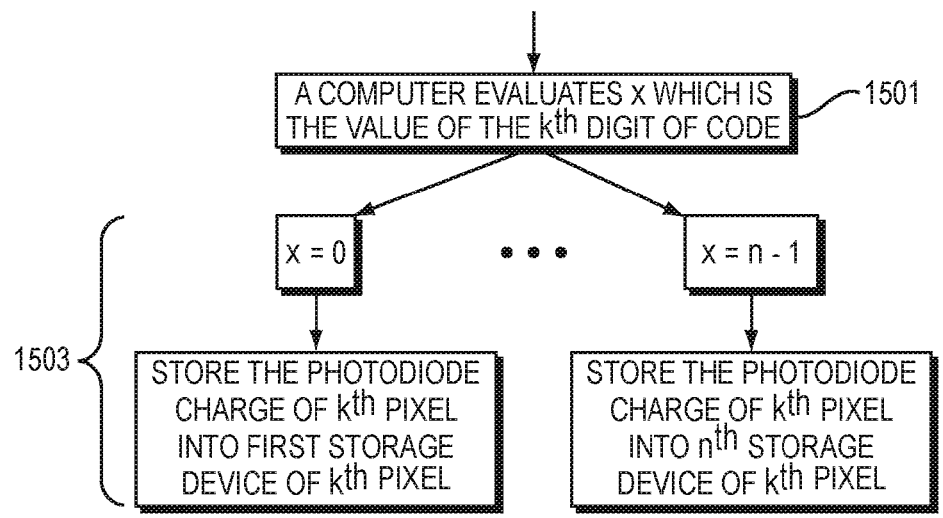
FIG. 15 is a flowchart for modulation of storage using an n-ary code, such that all of the photodiode charge is stored for later readout.

In some implementations, modulation of pixel storage is controlled by an n-ary code, such that all of the photodiode charge of each pixel is stored for later readout. FIG. 15 shows an example of this approach. In FIG. 15, each pixel has n storage devices, and storage modulation for the $k^{th}$ pixel in a superpixel includes the following steps: A computer evaluates x, which is the value of the $k^{th}$ digit of an n-ary code of length m (Step 1501), and causes the photodiode charge in the $k^{th}$ pixel to be transferred to the $(x+1)^{th}$ storage device for the $k^{th}$ pixel. (Step 1503). For example, if x equals 0, then the pixel's photodiode charge is transferred to the first storage device for the pixel. For example, if x equals n−1, then the pixel's photodiode charge is transferred to the $n^{th}$ storage device for the pixel. If a superpixel has more than one pixel that is a member of the $k^{th}$ pixel set and the method shown in FIG. 15 is used, then storage modulation for each of these pixels is done simultaneously, in the manner shown in FIG. 15.

Figure 16:
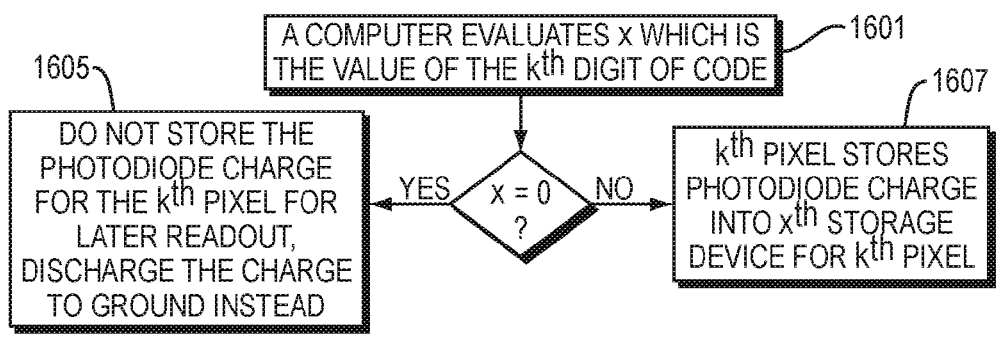
FIG. 16 is a flowchart for modulation of storage using an n-ary code, such that only a portion of the photodiode charge is stored for later readout.

In some implementations, modulation of pixel storage is controlled by an n-ary code, such that only a portion of the photodiode charge of each pixel is stored for later readout. FIG. 16 shows an example of this approach. In FIG. 16, each pixel has multiple (e.g., n−1) storage devices, and storage modulation for the $k^{th}$ pixel in a superpixel includes the following steps: A computer evaluates x, which is the value of the $k^{th}$ digit of a modulation code. (Step 1601) If x equals 0, then the photodiode charge in the $k^{th}$ pixel is drained, and is not saved for later readout. (Step 1603) If x is not equal to 0, then the photodiode charge in the $k^{th}$ pixel is transferred to the $(x+1)^{th}$ storage device for the $k^{th}$ pixel. (Step 1605).

If a superpixel has more than one pixel that is a member of the $k^{th}$ pixel set and the method shown in FIG. 16 is used, then storage modulation for each of these pixels may be done simultaneously, in the manner shown in FIG. 16.

Figure 17:
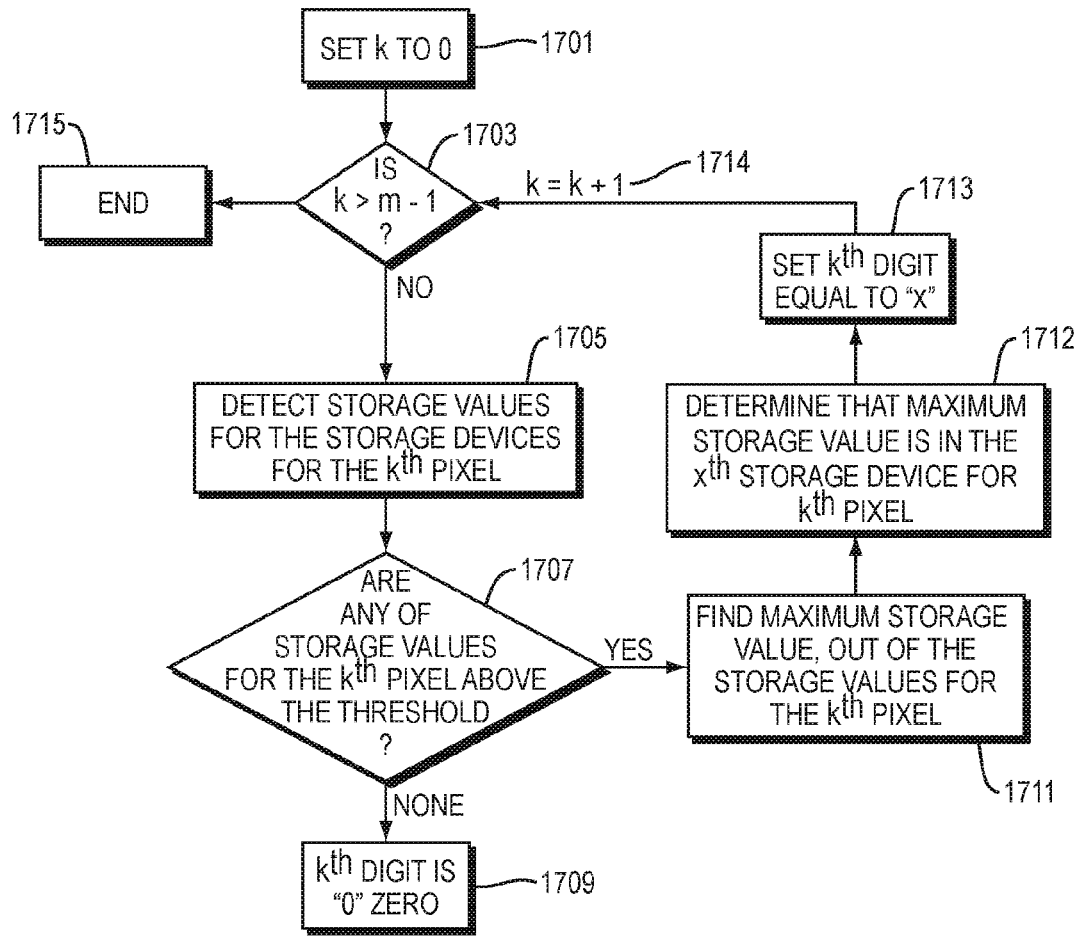
FIG. 17 is a flowchart for decoding an n-ary code, after storage modulation in which only a portion of the photodiode charge is stored for later readout.

FIG. 17 is a flowchart for decoding n-ary code, after storage modulation in which only a portion of the photodiode charge is stored for later readout. In FIG. 17, the code that is being decoded has m digits, and each pixel has multiple (e.g., n−1) storage devices. Decoding for each superpixel includes the following steps: A computer sets k equal to zero (Step 1701). A computer evaluates if k is greater than m−1. (Step 1703) If yes, then decoding stops for that superpixel, and the computer repeats the decoding for each of the superpixels, until all of the superpixels are decoded. (Step 1715) If no, then a computer detects the storage value (i.e., level of charge stored in a storage device) for each of the multiple storage devices of the $k^{th}$ pixel. (Step 1705) A computer determines if any of these storage values exceed a threshold. (Step 1707). If none of these storage values exceed the threshold, then a computer sets the $k^{th}$ digit of the code to zero. (Step 1709) If at least one of these storage values exceeds the threshold, then a computer: (a) determines the maximum storage value, out of these storage values (Step 1711), (b) determines that the maximum storage value is stored in the $x^{th}$ storage device for the $k^{th}$ pixel (Step 1712), (c) sets the $k^{th}$ digit of the code to x (Step 1713) and (d) sets k equal to k+1 (Step 1714)

If a superpixel has more than one pixel that is a member of the $k^{th}$ pixel set, then the method in FIG. 17 may be modified for that superpixel so that: (a) in Step 1705, a computer determines storage values for each of the storage devices for each of the pixels in the superpixel that are members of the $k^{th}$ pixel set; and (b) in Step 1707, a computer determines that the maximum storage value, out of these storage values, is stored in the $x^{th}$ storage device of one of these pixels.

Figure 18:
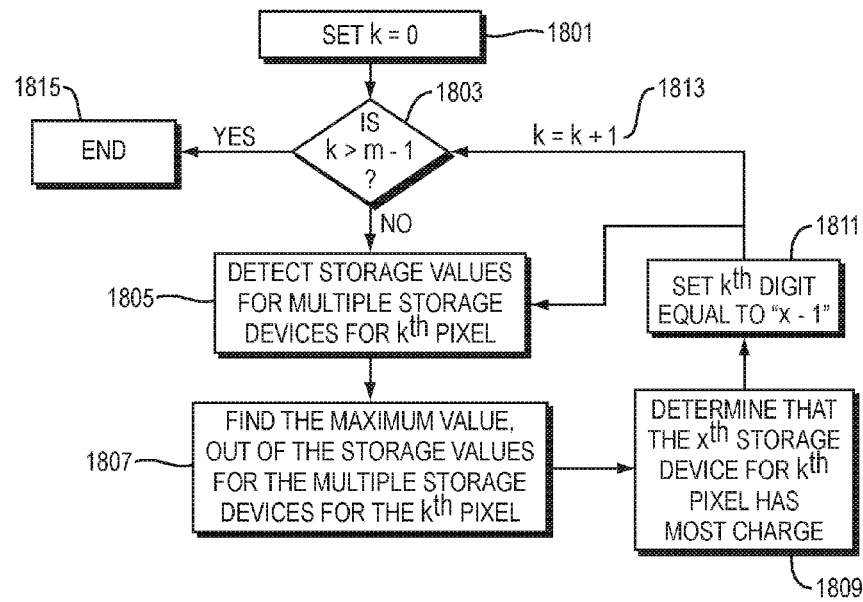
FIG. 18 is a flowchart for decoding an n-ary code, after storage modulation in which all of the photodiode charge is stored for later readout.

FIG. 18 is a flowchart for decoding n-ary code, after storage modulation in which all of the photodiode charge is stored for later readout. In FIG. 18, the code that is being decoded has m digits, and each pixel has n storage devices. In the example shown in FIG. 18, decoding for each superpixel includes the following steps: A computer sets k equal to zero (Step 1801). A computer evaluates if k is greater than m−1. (Step 1803) If yes, then decoding stops for that superpixel, and the computer repeats the decoding for each of the superpixels, until all of the superpixels are decoded. (Step 1815) If no, then a computer detects the storage value (i.e., level of charge stored in a storage device) for each of the multiple storage devices of the $k^{th}$ pixel. (Step 1805) A computer: (a) determines the maximum storage value, out of these storage values (Step 1807), (b) determines that the maximum storage value is stored in the $x^{th}$ storage device for the $k^{th}$ pixel (Step 1809), (c) sets the $k^{th}$ digit of the code to x−1 (Step 1811), and sets k equal to k+1 (Step 1813).

In some implementations in which each pixel stores charge to only one storage device: (a) a binary code is applied to the pixels; and (b) each pixel is turned "off" and "on" many times during the duration of a single camera frame.

In many implementations, a pixel is neither "on" during an entire frame, nor "off" during an entire frame. (Putting a pixel with only a single storage device to constant "off" during an entire frame would cause the pixel not to measure any light during the frame. Putting a pixel with only a single storage bin to constant "on" for the whole frame duration would cause the pixel to measure light normally during the entire frame.)

Analog, Discrete-Time, Digital Modulation

Depending on the particular implementation of this invention, the curtain modulation signals, superpixel modulation signals or both may be either (a) continuous time (analog), (b) discrete-time, or (c) digital (discrete in both amplitude and time).

For example, in many examples of this invention, digital modulation signals are used for superpixel modulation, curtain modulation or both. In these examples, the amplitude of the digital modulation signal is treated as being in one of two binary states (e.g., 0 or 1), and the signal changes only at discrete time intervals.

Alternatively, modulation signals for superpixel modulation, curtain modulation or both may be treated as continuous in amplitude. For example, in some cases, a computer normalizes the range of continuous values to an interval [0,1]. In that case, for example, a value of 0.241 may mean that 24.1% of electrons are moved to storage.

There is no limitation of when the signal change can occur in time. In some implementations, the signal changes continuously in time.

In some cases: (a) superpixel modulation signals, curtain modulation signals, or both comprise analog signals; and (b) the analog signals are treated as continuous in both amplitude and time.

Figure 19:
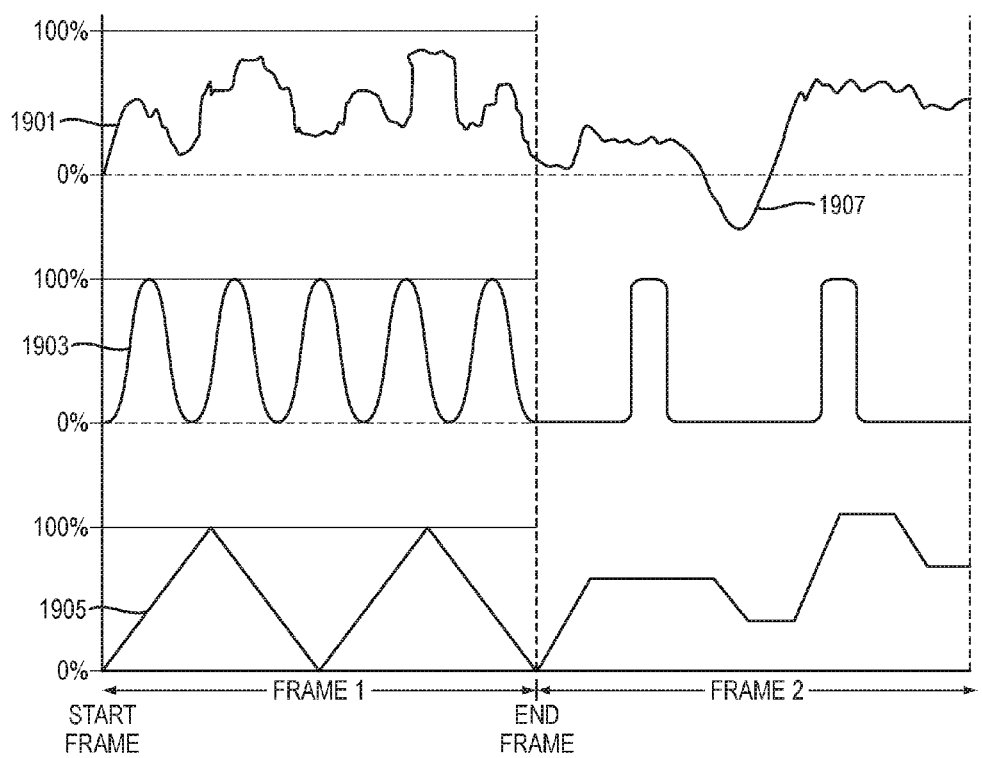
FIG. 19 is diagram that illustrates three examples of analog modulation signals.

In some cases, modulations signals (either digital or analog) undergo at least one change between camera frames. FIG. 19 is diagram that illustrates three examples of analog modulation signals that change from frame to frame. Signal 1901 is an aperiodic signal in both frame 1 and frame 2. Signal 1903 is a periodic signal that is sinusoidal in frame 1 and non-sinusoidal in frame 2. In frame 1, signal 1905 is a periodic triangle wave that is shifted upward so that the minimum value is zero. In frame 2, signal 1905 is aperiodic.

In some cases, an analog modulation signal is negative at times, such as signal 1901 at time 1907 in FIG. 19. In some cases, a "negative" value of a modulation signal is implemented as follows: the storage is pre-charged by a fixed amount of charge. For a negative portion of the modulation signal, a transfer gate is opened to release an amount of charge from the storage device proportional to the absolute value of the modulation signal. During the readout phase, a computer treats the pre-charged amount as the zero value, treats an amount of charge below this value as a negative readout; and treats an amount of charge larger than the pre-charge amount as a positive readout.

For analog modulation, the pixel's sensitivity to light is not a binary state; instead the pixel may have a continuous range of sensitivity from completely "off" to completely "on". This sensitivity may vary over time during each camera frame.

Light Modulation

In some implementations, modulation signals control the intensity of light incident on the photodiode of a pixel, for superpixel modulation, curtain modulation, or both. In these cases: (a) the amount of light that reaches the pixels is controlled by selective attenuation of reflected or transmitted light; and (b) thus, the sensitivity of pixels to light from the scene is controlled by controlling whether the light reaches the pixels.

Figure 20A:
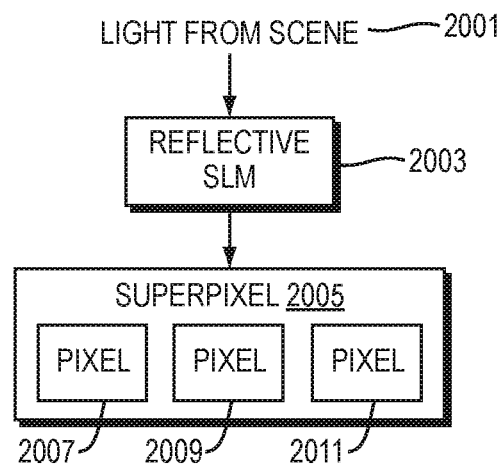
FIG. 20A shows a reflective SLM that selectively reflects light from a scene and that is controlled by the logical AND of the curtain modulation and superpixel modulation.

FIG. 20A shows a reflective SLM 2003 that is controlled by the logical AND of the curtain modulation and superpixel modulation. In FIG. 20A, the effect of this logical AND is that SLM 2003 reflects light from the scene such that, at any given time: (a) for each given pixel in the active region of the photodetector, light from the scene is reflected by SLM 2003 to the given pixel if both the superpixel modulation signal and the curtain modulation signal for the given pixel are high; and (b) light from the scene is not reflected by SLM 2003 to the inactive region of the photodetector.

Figure 20B:
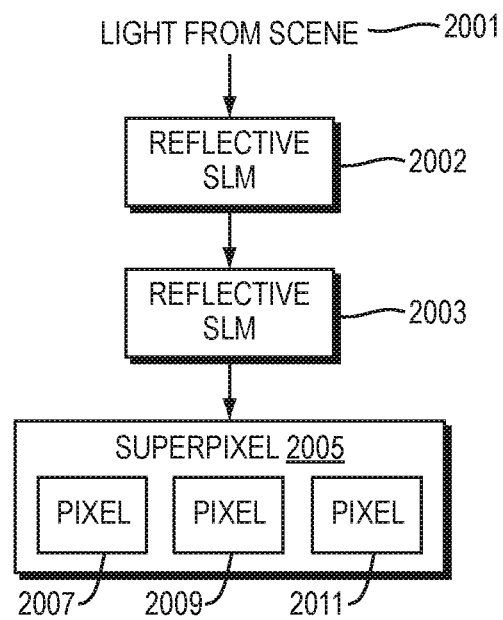
FIG. 20B shows a reflective SLM that performs curtain modulation and another reflective SLM that performs superpixel modulation.

FIG. 20B shows two reflective SLMs: the first SLM 2002 performs curtain modulation and the second SLM 2003 performs superpixel modulation (or vice versa). In FIG. 20B, in order for light from the scene to reach pixels (e.g., 2007, 2009, 2011), the light must reflect from both SLM 2002 and SLM 2003 before reaching the pixels. Thus, in FIG. 20B, the logical AND of the curtain and superpixel modulation signals is effectively taken. In FIG. 20B, the effect of this logical AND is that the two SLMs 2002, 2003, taken together, reflect light from the scene such that, at any given time: (a) for each given pixel in the active region of the photodetector, light from the scene is reflected by the SLMs to the given pixel if both the superpixel modulation signal and the curtain modulation signal for the given pixel are high; and (b) light from the scene is not reflected by the SLMs to the inactive region of the photodetector. However, in FIG. 20B (unlike FIG. 20A), the curtain modulation and superpixel modulation are performed by different SLMs: SLM 2002 performs curtain modulation and SLM 2003 performs superpixel modulation (or vice versa).

In the examples shown in FIGS. 20A and 20B, light from a scene 2001 strikes reflective SLM(s) and is selectively reflected. Thus, which pixels in a photodetector are illuminated by reflected light from the SLM(s) at any given time during a camera frame is controllable. For example, which pixels (out of pixels 2007, 2009, 2011 in superpixel 2005), are illuminated by reflected light from the SLM(s) varies during a single camera frame. For example, in some cases, during a single camera frame: (a) at some times pixel 2007 is illuminated by reflected light from the SLM(s) but pixels 2009 and 2011 are not; and (b) at other times pixels 2007 and 2009 are illuminated by reflected light from the SLM(s) but pixel 2011 is not. In some cases, each reflective SLM comprises a DMD (digital micromirror device) or a reflective LCOS (liquid crystal on silicon) device. In some cases, each reflective SLM comprises a planar reflective array, or a reflective array positioned on a curved surface (such as a surface of a cylinder or torus).

Figure 21A:
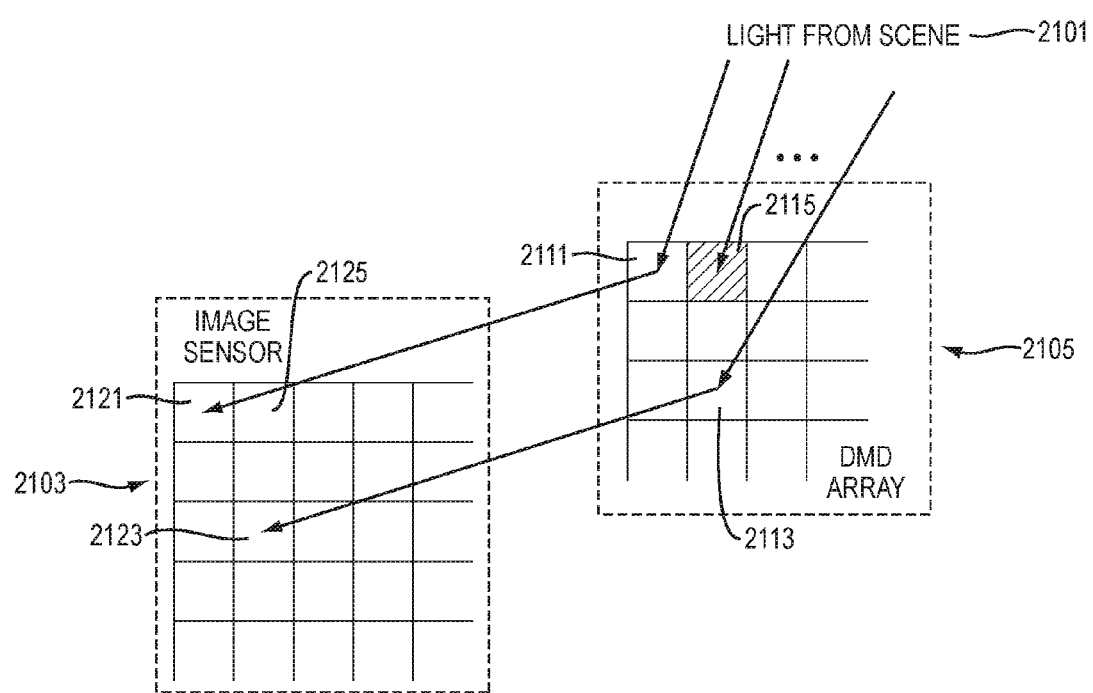
FIG. 21A shows a DMD that selectively reflects light from a scene and that is controlled by the logical AND of the curtain modulation and superpixel modulation.
Figure 21B:
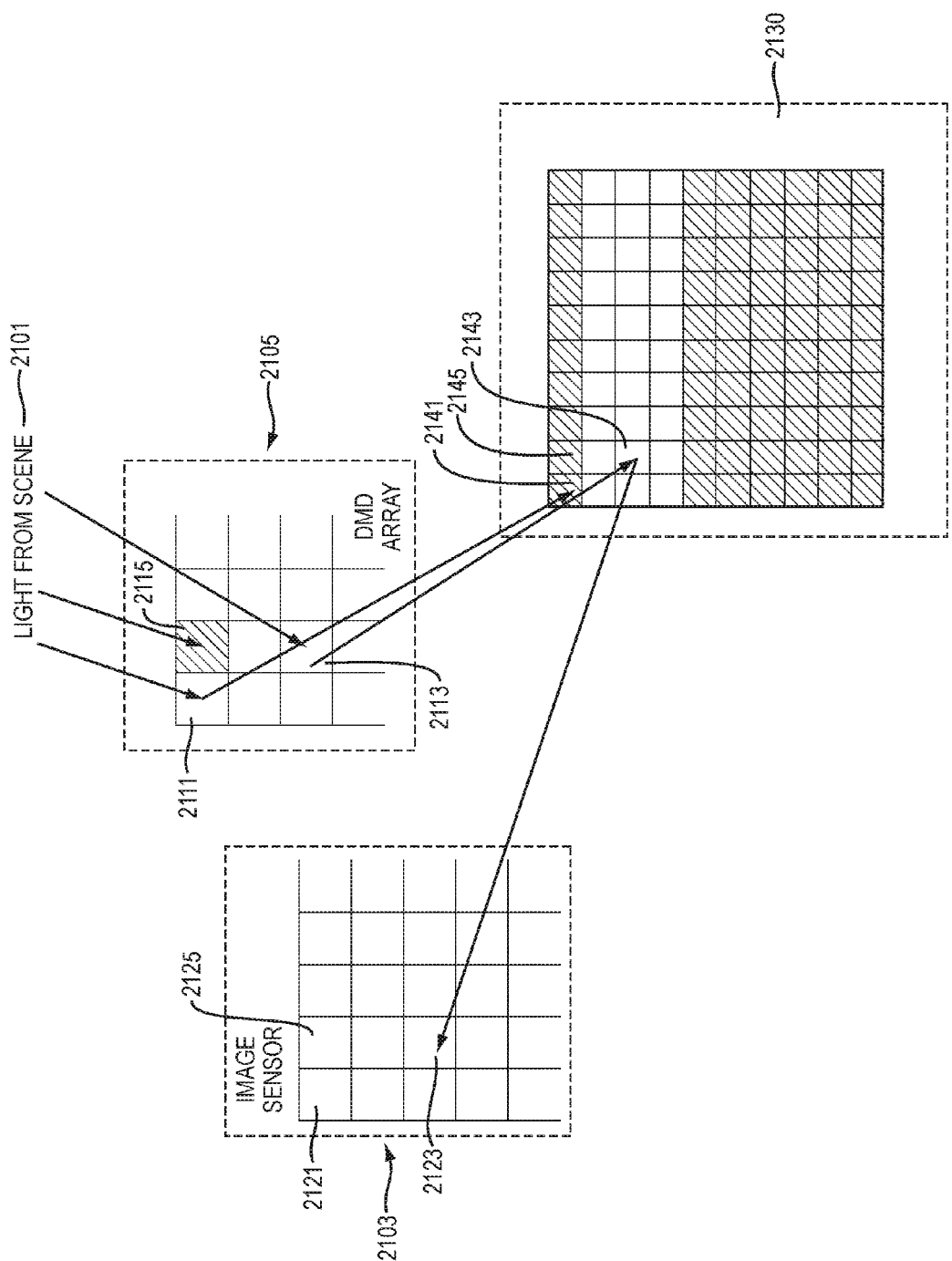
FIG. 21B shows light from a scene traveling to a DMD array that performs superpixel modulation, then to a DMD that performs curtain modulation, and then to a photodetector.

In FIG. 21A, a single reflective DMD array is controlled by the logical AND of the curtain and superpixel modulation signals. In FIGS. 21B and 21C, the two functions are performed by two DMD arrays: one DMD performs curtain modulation and the other DMD simultaneously performs superpixel modulation. In FIG. 21B, light reflects from the DMD that performs superpixel modulation, and then from the DMD that performs curtain modulation. In FIG. 21C, the order is reversed. In FIGS. 21B and 21C, the effect of the two simultaneous modulations is that the light reflected from the two DMDs (taken together) to the photodetector is controlled by the logical AND of the curtain and superpixel modulation signals.

FIGS. 21A, 21B, and 21C show DMD array(s) selectively reflecting light from a scene at a particular time, such that reflected light is steered toward some, but not all, of the pixels of a photodetector. In the examples shown in FIGS. 21A, 21B, and 21C, the pixels in the photodetector and pixels of the DMD array(s) are optically aligned, such that each pixel of a DMD corresponds to a pixel of the photodetector. The pixels in the DMD array(s) are switched between two states, "A" and "B". When the mirror for a DMD pixel is in the A state, the mirror reflects the light in an optical path (directly or indirectly) toward the corresponding pixel in the photodetector. When the mirror for a DMD pixel is in the B state, the light is reflected in another direction. By switching a DMD pixel between these two states, the light incident on the corresponding pixel of the photodetector may be modulated, and thus the response of the pixel to the light coming from the scene may be modulated.

FIG. 21A is a ray diagram that shows a DMD that is controlled by the logical AND of the curtain and superpixel modulation signals, and thus may be loosely said to perform both current modulation and superpixel modulation simultaneously. The DMD selectively reflects light from a scene. In the example shown in FIG. 21A, pixels in a DMD array 2105 are optically aligned with pixels in photodetector 2103. For example, DMD pixels 2111, 2113, 2115 correspond to photodetector pixels 2121, 2123, 2125 respectively. Light from a scene 2101 is striking DMD pixels 2111, 2113 and 2115. DMD pixels 2111 and 2113 are in state "A", such that light reflects from these pixels to photodetectors 2123 and 2123, respectively. DMD pixel 2115 is in state "B", such that light reflects from this DMD pixel in a direction away from photodetector 2125, thus causing the reflected light not to reach the photodetector.

FIG. 21B is a ray diagram that shows light 2101 from a scene traveling to a DMD array 2105 that performs superpixel modulation, then to a DMD array 2130 that performs curtain modulation, and then to a photodetector 2103. In the example shown in FIG. 21B, pixels in photodetector 2103 are optically aligned with pixels in DMD array 2130 and with pixels in DMD array 2105. For example, pixels 2121, 2123, 2125 in photodetector 2103 correspond to pixels 2141, 2143, 2145, respectively, in DMD array 2130 and to pixels 2111, 2113, 2115, respectively, in DMD array 2105. In FIG. 21B, DMD 2105 performs superpixel modulation. Light from a scene 2101 is striking (among other things) pixels 2111, 2113, 2115 in DMD 2105. Pixels 2111 and 2113 in DMD 2105 are in state A. Thus, light reflects from these pixels 2111, 2113 in DMD 2105 to pixels 2141, 2143, respectively, in DMD 2130. Pixel 2115 in DMD 2105 is in state B, and thus reflects light in a direction away from DMD 2130 and photodetector 2103. In FIG. 21B, DMD 2130 performs curtain modulation. Pixel 2143 in DMD 2130 is in state A. Thus, light reflects from pixel 2143 to photodetector pixel 2123. Pixel 2141 in DMD 2130 is in state B. Thus, light reflects from pixel 2141 in a direction away from the photodetector 2103, thus causing the reflected light not to reach the photodetector.

FIG. 21C is a ray diagram that shows light from a scene traveling to a DMD that performs curtain modulation, then to a DMD that performs superpixel modulation, and then to a photodetector. In the example shown in FIG. 21C, pixels in photodetector 2103 are optically aligned with pixels in DMD array 2105 and with pixels in DMD array 2130. For example, pixels 2121, 2123, 2124, 2125 in photodetector 2103 correspond to pixels 2111, 2113, 2114, 2115, respectively, in DMD array 2105 and to pixels 2141, 2143, 2144, 2145, respectively, in DMD array 2130. In FIG. 21C, DMD 2130 performs curtain modulation. Light from a scene 2101 is striking (among other things) pixels 2141, 2143, 2144, 2145 in DMD 2130. Pixels 2143 and 2144 in DMD 2130 are in state A. Thus, light reflects from these pixels 2143, 2144 in DMD 2130 to pixels 2113, 2114, respectively, in DMD 2105. Pixels 2141, 2145 in DMD 2130 are in state B, and thus reflect light in directions away from DMD 2105 and photodetector 2103. In FIG. 21C, DMD 2105 performs superpixel modulation. Pixel 2113 in DMD 2105 is in state A. Thus, light reflects from pixel 2113 in DMD 2105 to photodetector pixel 2123. Pixel 2114 in DMD 2105 is in state B. Thus, light reflects from pixel 2114 in a direction away from the photodetector 2103, thus causing the reflected light not to reach the photodetector.

In FIGS. 21B and 21C, dark shading in a DMD pixel indicates that the pixel is in the B state and thus reflects light away from the photodetector and the other DMD, if any.

Figure 22A:
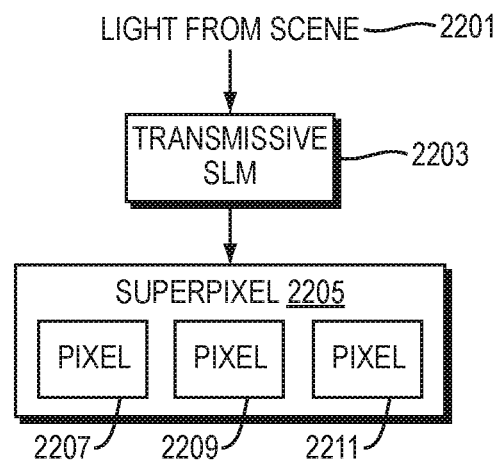
FIG. 22A shows a transmissive SLM that selectively transmits light from a scene and that is controlled by the logical AND of the curtain modulation and superpixel modulation.

FIG. 22A shows a transmissive SLM 2203 that is controlled by the logical AND of the curtain modulation and superpixel modulation. In FIG. 22A, the effect of this logical AND is that SLM 2203 transmits light from the scene such that, at any given time: (a) for each given pixel in the active region of the photodetector, light from the scene is transmitted through SLM 2203 to the given pixel if both the superpixel modulation signal and the curtain modulation signal for the given pixel are high; and (b) light from the scene is not transmitted through SLM 2203 to the inactive region of the photodetector.

Figure 22B:
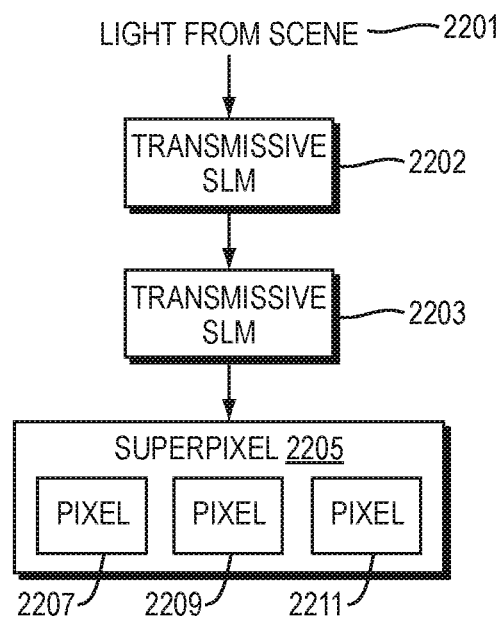
FIG. 22B shows a transmissive SLM that performs curtain modulation and another transmissive SLM that performs superpixel modulation.

FIG. 22B shows two transmissive SLMs: the first SLM 2202 performs curtain modulation and the second SLM 2203 performs superpixel modulation (or vice versa). In FIG. 22B, in order for light from the scene to reach pixels (e.g., 2207, 2209, 2211), the light must be transmitted through both SLM 2202 and SLM 2203 before reaching the pixels. Thus, in FIG. 22B, the logical AND of the curtain and superpixel modulation signals for each pixel is effectively taken. In FIG. 22B, the effect of this logical AND is that the two SLMs 2202, 2203, taken together, transmit light from the scene such that, at any given time: (a) for each given pixel in the active region of the photodetector, light from the scene is transmitted by the SLMs to the given pixel if both the superpixel modulation signal and the curtain modulation signal for the given pixel are high; and (b) light from the scene is not transmitted by the SLMs to the inactive region of the photodetector. However, in FIG. 22B (unlike FIG. 22A), the curtain modulation and superpixel modulation are performed by different SLMs: SLM 2202 performs curtain modulation and SLM 2203 performs superpixel modulation (or vice versa).

In the example shown in FIGS. 22A and 22B, light from a scene 2201 passes through transmissive SLM(s), and is selectively attenuated. Thus, which pixels are illuminated by light passing through the SLM(s) at any given time during a camera frame is controllable. For example, which pixels (out of pixels 2207, 2209, 2211 in superpixel 2205), are illuminated by light passing through the SLM(s) varies during a single camera frame. For example, in some cases, during a single camera frame: (a) at some times pixel 2207 is illuminated by light passing through the SLM(s) but pixels 2209 and 2211 are not; and (b) at other times pixels 2207 and 2209 are illuminated by light passing through the SLM(s) but pixel 2011 is not. In some cases, the transmissive SLM comprises an LCD (liquid crystal display) or an array of ferromagnetic shutters. In some cases, each transmissive SLM may comprise a planar array, or an array positioned on a curved surface (such as a surface of a cylinder or torus).

Figure 23A:
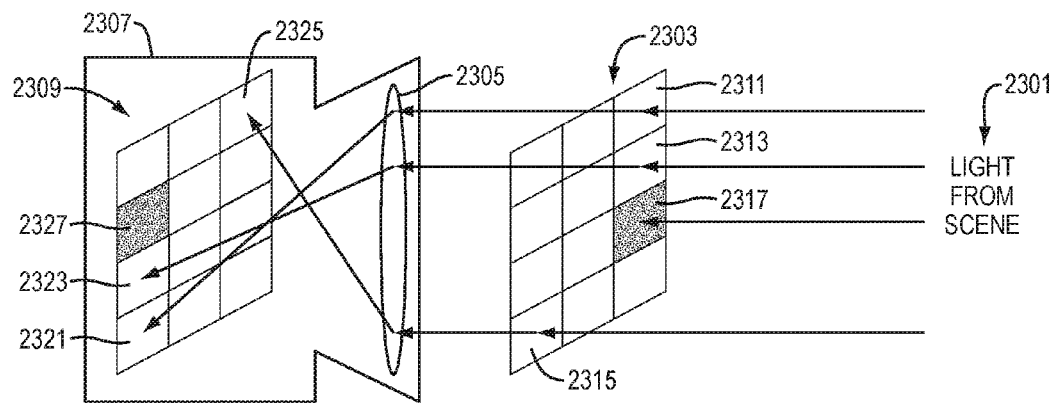
FIG. 23A shows an LCD that selectively transmits light from a scene and that is controlled by the logical AND of the curtain modulation and superpixel modulation.
Figure 23B:
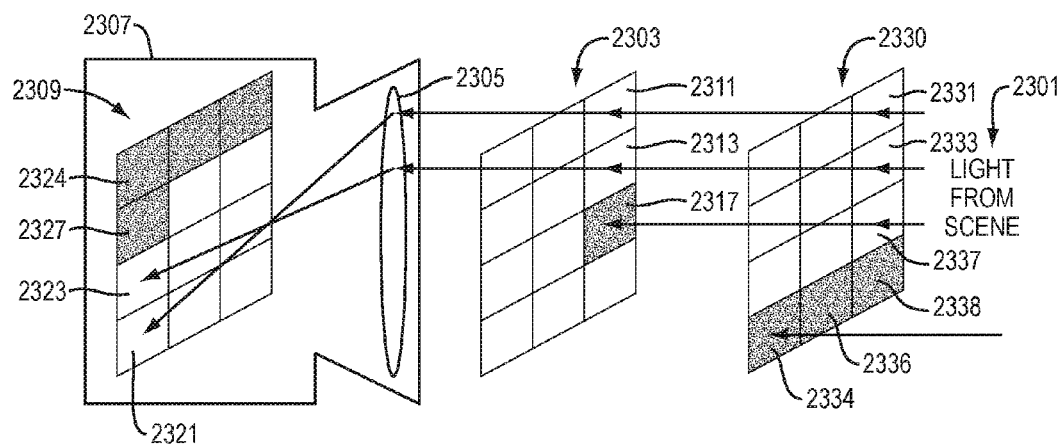
FIG. 23B shows light from a scene traveling to an LCD that performs curtain modulation, then to a LCD that performs superpixel modulation, and then to a photodetector.

In FIG. 23A, a single LCD (liquid crystal display) array is controlled by the logical AND of the curtain and superpixel modulation signals. In FIG. 23B, the two functions are performed by two LCD arrays: one LCD performs curtain modulation and the other LCD simultaneously performs superpixel modulation. In FIG. 23B, light is transmitted by the LCD that performs curtain modulation, and then by the LCD that performs superpixel modulation. In FIG. 23B, the effect of the two simultaneous modulations is that the light transmitted through the two LCDs (taken together) to the photodetector is controlled by the logical AND of the curtain and superpixel modulation signals.

FIGS. 23A and 23B show LCD(s) selectively attenuating light from a scene at a particular time, such that light passing through the LCD(s) reaches some, but not all, of the pixels of a superpixel in a photodetector. In the examples shown in FIGS. 23A and 23B, the pixels in the photodetector and pixels of the LCD(s) are optically aligned, such that each pixel of an LCD corresponds to a pixel of the photodetector. The pixels in the LCD array(s) are switched between two states, "on" and "off". When an LCD pixel is in the "on" state, light from the scene passes through the LCD pixel. When an LCD pixel is in the "off" state, the LCD pixel is opaque and blocks light. By switching an LCD pixel between these two states, the light incident on the corresponding pixel of the photodetector may be modulated, and thus the response of the pixel to the light coming from the scene may be modulated.

FIG. 23A is a ray diagram that shows an LCD that is controlled by the logical AND of the curtain and superpixel modulation signals, and thus may be loosely said to perform both current modulation and superpixel modulation simultaneously. The LCD selectively attenuates light from a scene. In FIG. 23A, pixels in LCD 2303 are optically aligned with pixels in photodetector 2309. For example, LCD pixels 2311, 2313, 2315 and 2317 correspond to photodetector pixels 2321, 2323, 2325 and 2327, respectively. Light from a scene 2301 is striking LCD pixels 2311, 2313, 2315 and 2317. LCD pixels 2311, 2313, 2315 are in the "on" state, such that light passes through these LCD pixels and travels to photodetectors 2321, 2323 and 2325, respectively. LCD pixel 2317 is in the "off" state, such that LCD pixel 2317 is opaque, thus preventing light from passing through LCD pixel 2317 and traveling to photodetector pixel 2327. Photodetector pixels 2321, 2323, 2325 and 2327 are all in the same superpixel.

FIG. 23B is a ray diagram that shows light from a scene traveling to an LCD that performs curtain modulation, then to a LCD that performs superpixel modulation, and then to a photodetector. In FIG. 23B, pixels in photodetector 2309 are optically aligned with pixels in LCD 2303 and with pixels in LCD 2330. For example, pixels 2321, 2323, 2327 in photodetector 2309 correspond to pixels 2311, 2313, 2317, respectively, in LCD 2303 and to pixels 2331, 2333, 2337, respectively, in LCD 2330. In FIG. 23B, LCD 2330 performs curtain modulation. Light from a scene 2301 is striking (among other things) pixels 2331, 2333, 2334, 2336, 2337, 2338 of LCD 2330. Pixels 2331, 2333, 2337 in LCD 2330 are in the "on" state, such that light passes through these LCD pixels and travels to pixels 2311, 2313, 2317, respectively, in LCD 2303. Pixels 2334, 2336, 2338 in LCD 2330 are in the "off" state, and thus are opaque and prevent light from passing through them. In FIG. 23B, LCD 2303 performs superpixel modulation. Pixels 2311, 2313 in LCD 2303 are in the "on" state, such that light passes through these LCD pixels and travels to pixels 2321, 2323, respectively, in photodetector 2309. LCD pixel 2317 is in the "off" state, such that LCD pixel 2317 is opaque, thus preventing light from passing through LCD pixel 2317 and traveling to photodetector pixel 2327.

In FIGS. 23A and 23B: (a) dark shading in an LCD pixel indicates that the pixel is in the "off" state and thus is opaque and blocks light; and (b) dark shading in a photodetector pixel indicates that the pixel does not receive light from the scene because light from the scene is blocked by LCD(s).

In FIGS. 23A and 23B, a camera 2307 includes a lens 2305 and the photodetector 2309. The lens bends light from LCD 2303. Similarly, in some cases: (a) a lens is interposed between a reflective SLM (such as a DMD or reflective LCOS) and the photodetector, and (b) the lens bends light rays that travel from the reflective SLM through the lens to the reflective SLM.

FIGS. 24A-24H show different configurations of an optical system that includes transmissive SLM(s), in illustrative implementations of this invention. In FIGS. 24A-24H, the SLM(s) selectively attenuate light, such that at different times during a single camera frame, the SLM(s) block light from reaching different pixels in the photodetector.

Figure 24A:
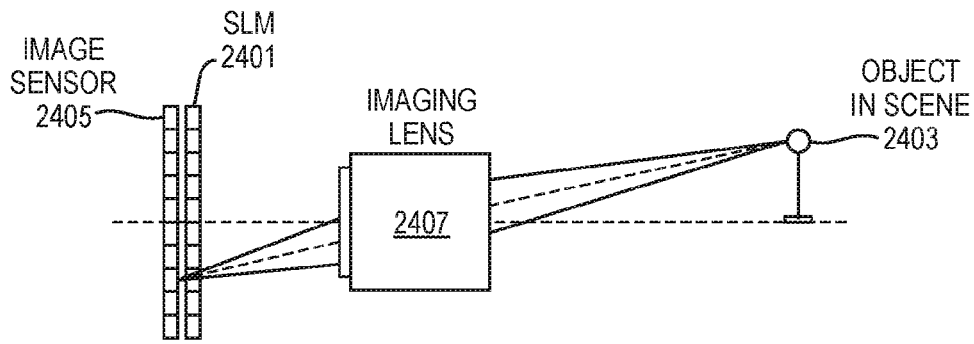
FIGS. 24A, 24B and 24C are each a diagram of an optical system that includes a transmissive SLM.
Figure 24B:
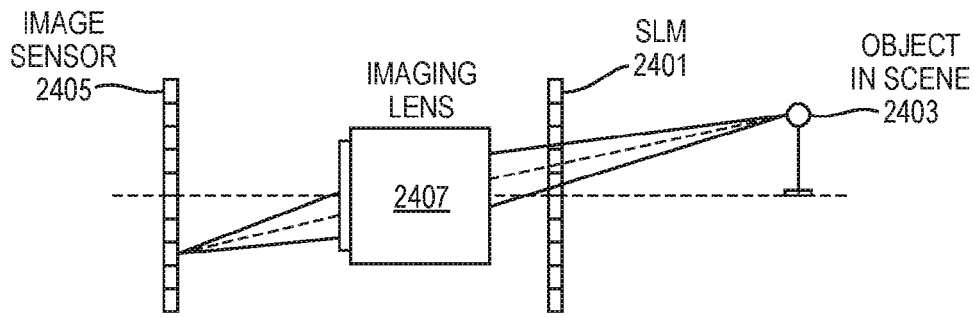
Figure 24C:
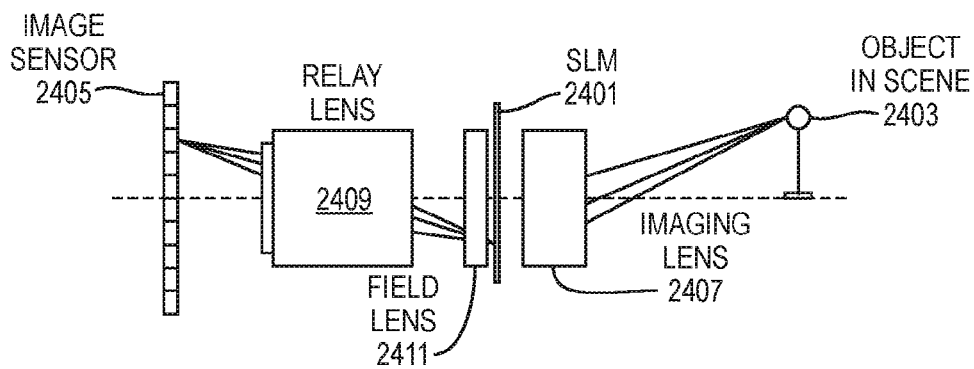

In FIGS. 24A, 24B and 24C, the transmissive SLM is controlled by the logical AND of the superpixel modulation and the curtain modulation, and thus may be loosely said to perform both of these modulations simultaneously.

In FIG. 24A, light from a scene 2403 travels through an imaging lens 2407, then through a transmissive SLM 2401, and then to a photodetector 2405.

In FIG. 24B, light from a scene 2403 travels through a transmissive SLM 2401, then through an imaging lens 2407, and then to a photodetector 2405.

In FIG. 24C, light from a scene 2403 travels through an imaging lens 2407, then through a transmissive SLM 2401, then through a field lens 2411, then through a relay lens 2409, and then to a photodetector 2405.

FIGS. 24D, 24E, 24F, 24G and 24H are each a diagram of an optical system that includes two transmissive SLMs: specifically, an SLM that performs superpixel modulation and an SLM that performs curtain modulation. In FIGS. 24D-24H, the logical AND of the curtain and superpixel modulation signals is effectively taken. In FIGS. 24D-24H, the effect of this logical AND is that two transmissive SLMs (e.g., 2421, 2425), taken together, transmit light from the scene such that, at any given time: (a) for each given pixel in the active region of the photodetector, light from the scene is transmitted through the SLMs to the given pixel if both the superpixel modulation signal and the curtain modulation signal for the given pixel are high; and (b) light from the scene is not transmitted through the SLMs to the inactive region of the photodetector.

Figure 24D:
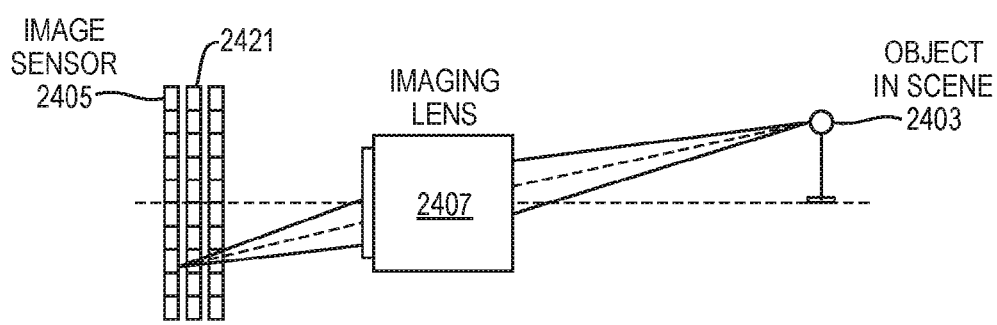
FIGS. 24D, 24E, 24F, 24G and 24H are each a diagram of an optical system that includes two transmissive SLMs: specifically, an SLM that performs superpixel modulation and an SLM that performs curtain modulation.

In FIG. 24D, light from a scene 2403 travels through an imaging lens 2407, then through a transmissive SLM that performs curtain modulation, then through a transmissive SLM 2421 that performs superpixel modulation, and then to a photodetector 2405.

Figure 24E:
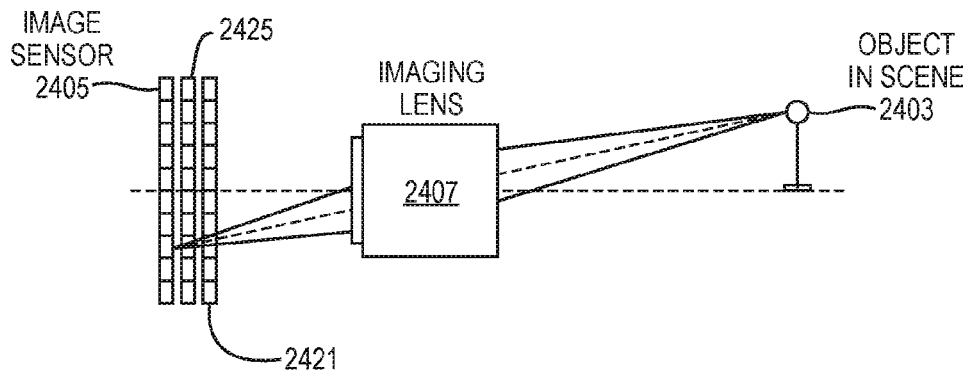

In FIG. 24E, light from a scene 2403 travels through an imaging lens 2407, then through a transmissive SLM 2421 that performs superpixel modulation, then through a transmissive SLM 2425 that performs curtain modulation, and then to a photodetector 2405.

Figure 24F:
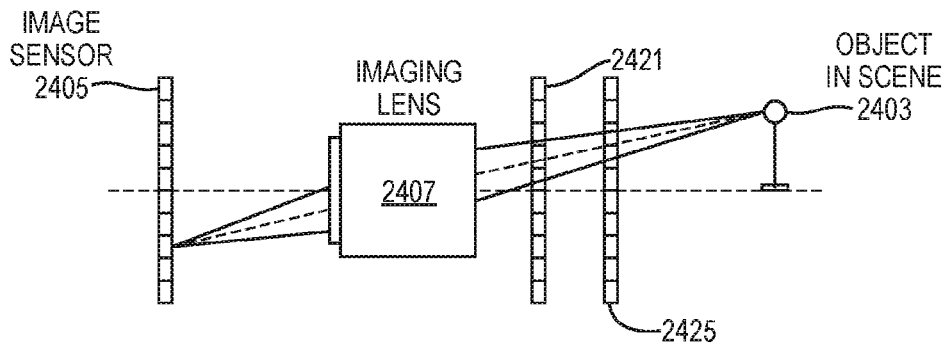

In FIG. 24F, light from a scene travels through a transmissive SLM 2425 that performs curtain modulation, then through a transmissive SLM 2421 that performs superpixel modulation, then through an imaging lens 2407, and then to a photodetector 2405.

Figure 24G:
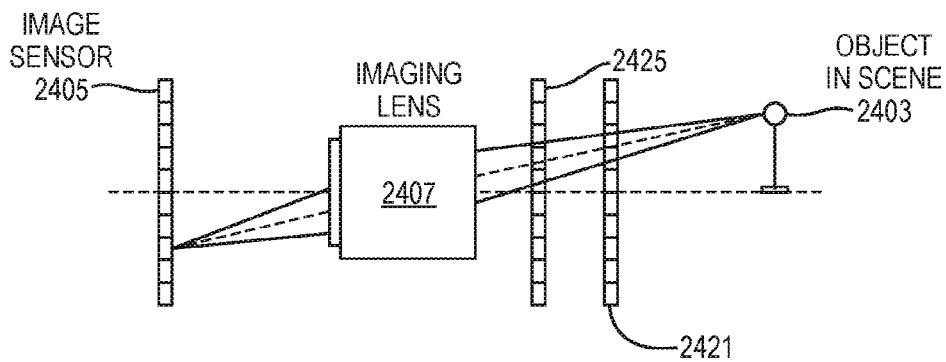

In FIG. 24G, light from a scene travels through a transmissive SLM 2421 that performs superpixel modulation, then through a transmissive SLM 2425 that performs curtain modulation, then through an imaging lens 2407, and then to a photodetector 2405.

Figure 24H:
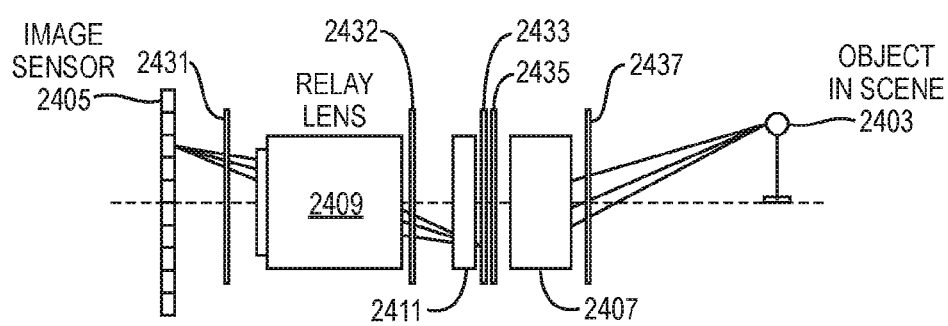

In FIG. 24H, the optical system also includes a relay lens 2409. FIG. 24H shows positions in which a transmissive SLM (that performs curtain modulation, superpixel modulation, or that is controlled by the logical AND of the two) may be located in the optical system. Specifically, in the example shown in FIG. 24H, such a transmissive SLM (that performs curtain modulation, superpixel modulation, or that is controlled by the logical AND of the two) may be positioned at any of locations 2431, 2432, 2433, 2435 or 2437. For example: (a) a transmissive SLM that is controlled by the logical AND of the curtain and superpixel modulations may be positioned at any of those locations; or (b) a transmissive SLM that performs curtain modulation may be positioned at one of these locations and another transmissive SLM that performs superpixel modulation may be positioned at another of those locations.

In some implementations in which an SLM is used, each pixel in the SLM is separately controllable by a computer, and the computer controls the size and shape of a superpixel in the photodetector. For example, in some cases, a computer sends signals to a reflective or transmissive SLM, such that 9 pixels comprise a 3×3 pixel superpixel, or such that 12 pixels comprise a 4×3 pixel superpixel, or such that 16 pixels comprise a 4×4 pixel superpixel.

In some cases, a reflective or transmissive SLM does not have the same size or shape as the photodetector. In those cases: (a) some pixels in the photodetector do not correspond to pixels in the SLM; and (b) light modulation is applied only to pixels in the photodetector that are aligned with pixels in the SLM.

In some cases: (a) the pixels in the SLM and camera are not precisely aligned; and (b) pixels for which the imprecision exceeds a given threshold are ignored; and (c) the value at that position is interpolated or returned as "unknown".

In many cases where a reflective or transmissive SLM is used, each pixel has only storage device that is dedicated to that pixel and does not receive charge from any other pixel during the exposure time of a camera frame.

Comparison to Time-Multiplexed Structured Illumination

It is interesting to compare this superpixel modulation in this invention to conventional time-multiplexed structured illumination.

Figure 25:
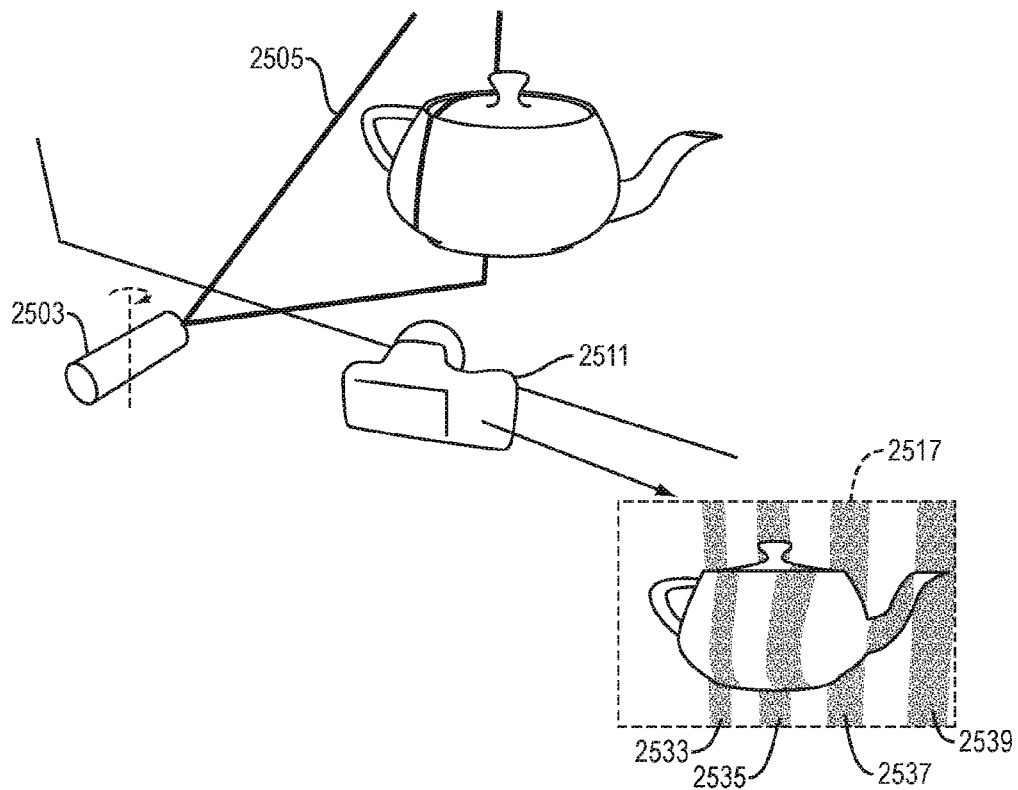
FIG. 25 is a conceptual diagram that shows an example of prior art, time-multiplexed structured illumination.

FIG. 25 is a conceptual diagram that shows a prior art example of conventional time-multiplexed structured illumination. In FIG. 25, the camera 2511 sensitivity is not modulated. The laser 2503 and a Powell lens (not shown) project a plane of laser light 2505. The line of laser light 2505 sweeps across the scene during each camera frame. The intensity of the laser light is modulated by a binary modulation pattern, causing the laser light to turn on and off repeatedly during a single sweep. The camera captures a single frame during the sweep of the laser light across the scene. In the image 2517 captured during this frame, the dark stripes 2533, 2535, 2537, 2539 correspond to the times during the sweep at which the laser light is turned off.

In conventional time-multiplexed structured illumination (such as that shown in FIG. 25): (a) n separate modulation signals that comprise the n-bit code are applied during n separate frames of the camera, one modulation signal per frame, to modify illumination of the scene; and (b) the sensitivity of the camera to light is not modulated.

In contrast, in illustrative implementations of this invention, all n separate superpixel modulation signals that comprise an n-bit code are applied during a single frame of a camera, to separately modify the response of n pixels in each superpixel to incident light.

In illustrative implementations, superpixel modulation signals allow the photodetector to capture (albeit at a lower spatial resolution) in a single camera frame the same type of data as is captured during multiple camera frames with time-multiplexed structured illumination. Capturing all of the data in a single frame (by employing superpixel modulation in illustrative implementations of the present invention) rather than in multiple frames (as in conventional time-multiplexed structured illumination) has the desirable effect of reducing distortion and artifacts in 3D sensing that are caused by motion blur.

3D Scanning

In illustrative implementations, this invention may be used for 3D scanning—i.e., for detection of the 3D position of points in a scene.

In illustrative implementations: (a) the superpixel modulation signals may, taken together, comprise a code, in which the state of each superpixel modulation signal encodes a bit of the code; and (b) a computer may calculate 3D spatial coordinates of points in a scene, based on (i) spatial position, relative to the photodetector, of one or more photodetector pixels that take a measurement of a peak in intensity of incident light, and (ii) which permutation of the code occurs when the measurement is taken.

In some implementations: (a) a system comprises at least one camera with a modulatable photodetector, an optional ordinary camera, a control unit, a processing unit, and at least one illumination unit; (b) superpixel modulation of pixels of a superpixel during a camera frame creates a specific code in the pixels of the superpixel; and (c) a light source emits light, such that the position of the intersection of the light and the scene changes over time.

In some implementations, the spatio-temporal characteristics of the light source are such that the spatial position of a point of the scene captured by a superpixel is computationally recoverable from the camera calibration, the relative position of the light source and the camera, and the charge values recorded by the pixels of the superpixel during a single frame of a camera.

In some implementations, the spatiotemporal characteristics of the light source are such that: (a) for a given point in the scene, the time function of the intensity of direct illumination from the light source in a point of the scene exhibits only one peak; and (b) the intersection of (1) the set of the points illuminated at time t and (2) the pixel ray of the superpixel has only one solution, given constraints consisting of the field of view of the camera, light source field of view, angle of the light emitted by the light source, and the relative position of camera and the light source.

Figure 26:
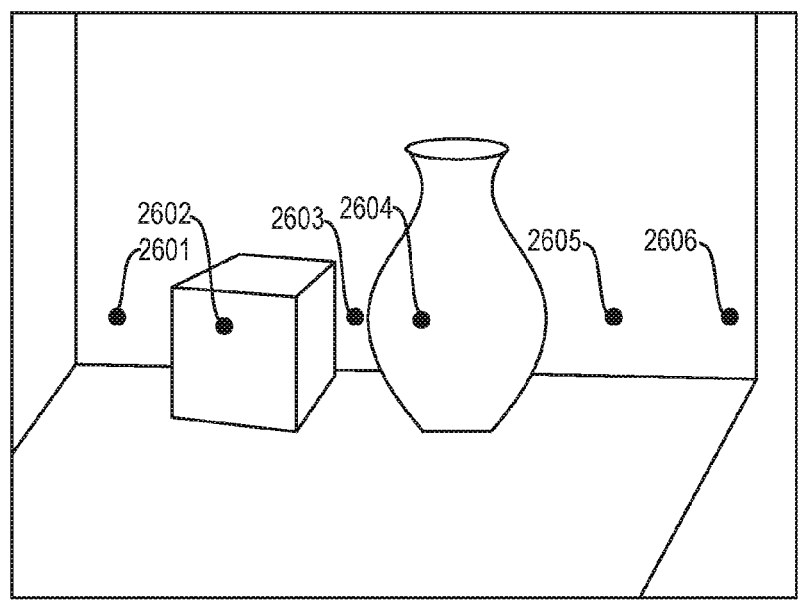
In FIGS. 26, 27A, 27B, and 27C, a moving beam of light illuminates a scene with a moving dot of light.

FIG. 26 is a conceptual diagram that illustrates a moving dot of light produced by controlled movement of a light source (not shown in FIG. 26). For example, in some cases the light source comprises an object that emits collimated light, such as a laser or directional LED system that emits collimated light. In other cases, the light source comprises a specular surface (such as a galvanometer-actuated mirror) that reflects light. In the example shown in FIG. 26, a dot of light moves across a scene, such that the dot of light intersects the scene at different spatial positions 2601, 2602, 2603, 2604, 2605, 2606 at different times.

Figure 27A:
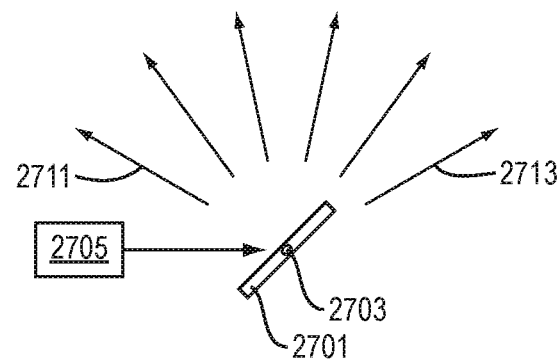
Figure 27B:
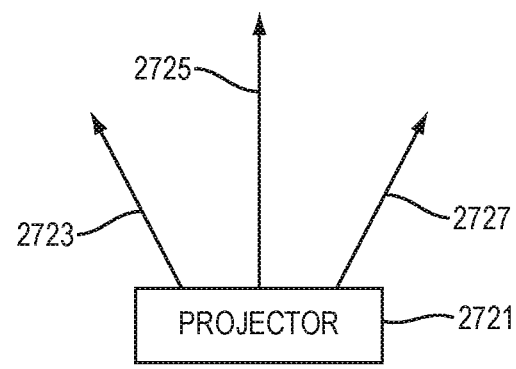
Figure 27C:
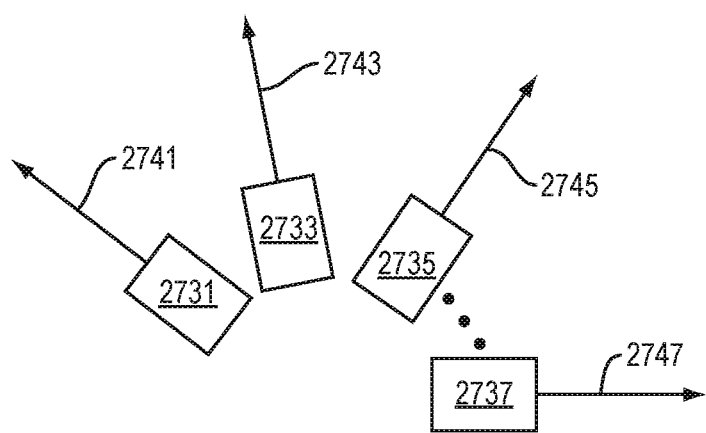

FIGS. 27A, 27B and 27C show three examples of light sources that produce a moving beam of light (e.g., a collimated beam of light that changes orientation relative to the scene), in illustrative implementations of this invention. For example, the light beam may move in the same path in each camera frame. At different times of each camera frame, the path may traverse all parts of a scene (e.g., by moving the light beam in repeated vertical movements, from bottom to top of the scene, with a small horizontal displacement after each vertical movement).

In FIGS. 27A, 27B and 2C, the moving light beam illuminates the scene with a moving dot of light. The moving dot of light may be used for curtain modulation (in order to suppress ambient light) and for 3D scanning.

In illustrative implementations, the moving light beam may be oriented, at different times in each camera frame, in different directions that are not co-planar with each other (i.e., do not all lie in the same geometric plane). Alternatively, in some cases, the light beam may point in directions that lie in only one geometric plane.

FIG. 27A is a diagram, which shows a rotating mirror that reflects a moving laser beam. The mirror 2701 rotates about axis of rotation 2703, which axis is perpendicular to FIG. 27A. A laser 2705 shines a laser beam. As the mirror rotates, the angle of the laser beam varies as a function of time. For example, at one time, the laser beam may be pointed in direction 2711, and at another time the laser beam may be pointed in direction 2713.

FIG. 27B is a diagram, which shows a projector 2721 that projects a moving light beam. In FIG. 27B, the light beam is pointed in different directions at different times. For example, the light beam is pointed, at different times, in directions 2723, 2725, 2727.

FIG. 27C is a diagram, which shows an array of directional light sources (e.g., 2731, 2733, 2735, 2737) that, taken together, emit a moving light beam. The light beam is pointed in different directions at different times. For example, the light beam is pointed, at different times, in directions 2741, 2743, 2745.

In some implementations, 3D scanning may be implemented with superpixel modulation as follows: (a) for each superpixel, n superpixel modulation signals may be applied to n sets of pixels in a superpixel during a single camera frame, one superpixel modulation signal per pixel set; (b) at least pixel in each superpixel is a member of each pixel set; (b) each superpixel modulation signal may modulate the response of pixels to light from a scene, which light is incident on the photodetector; (c) a computer may determine a unique permutation of the n modulation signals, which permutation occurred at a time (the "hit time") when the intensity of light reflected from a given point in the scene and incident on the photodetector reached a maximum for the frame; (d) a computer may use this unique permutation to perform a first algorithm to compute 3D coordinates of the given point in the scene, which given point is the position in the scene from which light reflected directly to the superpixel at the hit time with an intensity that peaked at the hit time; and (e) the first algorithm may include computing the 3D coordinates of the point by triangulation or include accessing values from a lookup table, which lookup table was computed by a second algorithm that includes computing 3D depth by triangulation.

In some implementations, depth-sensing may be implemented with superpixel modulation as follows: The n pixels in the superpixel may record n separate modulation signals during a single frame of the camera, which correspond to the n bits of an n-bit code. Two rotating mirrors may cause a dot of laser light to move in the same path through a scene during each camera frame. There may be $2^n$ permutations of the n-bit code, corresponding to $2^n$ timeslots in each camera frame. The intensity of incident light at the superpixel may be highest during a single timeslot in which the laser light reflects from the scene to the superpixel. Based on the permutation of the n modulation signals that is recorded by the superpixel at the "hit point" (when the intensity of incident light is highest), a computer may determine the timeslot during which the hitpoint occurred. This timeslot in turn may uniquely identify the orientation of the beam of laser light when the hitpoint occurred. From the orientation of the laser beam, and from the known positions of the light source and of the pixel ray for the pixel, a computer may calculate the 3D coordinates of the intersection of (i) the pixel ray and (ii) a vertical plane that is parallel to and that intersects the laser beam. This intersection (of the pixel ray and the vertical plane) may be located at the scene point that directly reflected the laser light to the superpixel. This process may be repeated for each scene point, yielding a cloud of computed 3D points in the scene.

In some 3D scanning implementations of this invention, one or more processors (e.g., in processing unit 2805 in FIG. 28) may perform calculations that: (a) take the camera output, calibration, and other static or dynamic parameters as inputs, and (b) produce a description of the scene, including a 3D reconstruction of the surface geometry of the scene.

In some 3D scanning implementations of this invention, binary Gray code of length 9 may be used for superpixel modulation of pixel sets. The illumination subsystem may project a sweeping laser line. The 9-bit vector may represent the time t (within the frame $0<t<T_{frame}$) at which the laser dot passed that part of the image which contributes to the camera pixel illumination (under the assumption that the scene is consistent—i.e., that there is no excessive reflection and scattering). The output of the camera pixels may be used to decode the 9-bit vector and the time t within the frame. The time t may identify the orientation of the laser beam and therefore identify a vertical plane that is parallel to, and that intersects, the laser beam. Based on this information—and the fact that the imaging system is aligned with known parameters—one or more processors may identify a point in 3D space using a triangulation technique.

Figure 28:
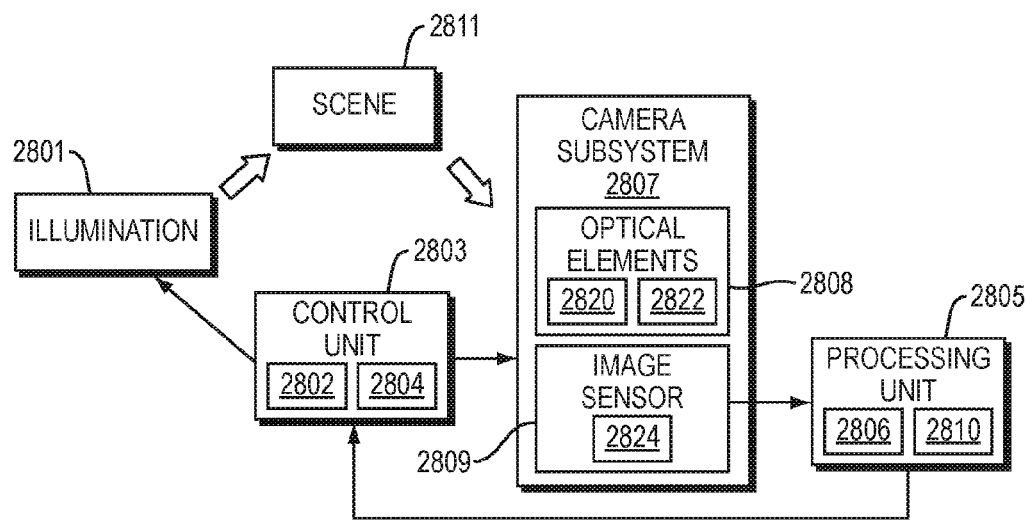
FIG. 28 is a block diagram of hardware components.

FIG. 28 is a block diagram of hardware components of a 3D scanning system, which components comprise an illustrative implementation of this invention. The scanning system comprises an illumination subsystem 2801, control unit 2803, processing unit 2805, and camera subsystem 2807. The illumination subsystem 2801 illuminates a scene 2811. In the example shown in FIG. 28, one or more signal generators (e.g., 2802) may generate separate superpixel modulation signals, or one or more computers (e.g., control unit 2803 or processing unit 2805) may cause separate superpixel modulation signals to be generated. In either case, the generated superpixel modulation signals may control the sensitivity to light of multiple pixel sets 2824 in the photodetector 2809 in camera subsystem 2807.

In the example shown in FIG. 28, the signal generators (e.g., 2802) comprise one or more signal generators, function generators, digital pattern generators, frequency generators or any other electronic device that generates repeating or non-repeating electrical signals, including either digital or analog signals. The system may include one or more computers (e.g., control unit 2803 or processing unit 2805), which may include memory devices (e.g., 2804, 2810) and may each include one or more processors (e.g., 2806).

The illumination subsystem 2801 may comprise a laser, two galvo mirror and optionally a lens.

The camera subsystem 2807 may comprise optical elements 2808 and photodetector 2809. The optical elements 2808 may comprise any optical elements used to transfer or direct light from the scene to the sensor, or to filter the light from the scene. The optical elements may include lenses 2820 (e.g., adjustable lenses) arranged in an appropriate (static or dynamic) position, and other optical elements 2822. For example, in some cases, the other optical elements 2822 include (i) one or more spatial light modulators, mirrors, filters, optical fibers, or other light modulators or devices for attenuating, transferring, filtering, or directing light, and (ii) any adjustable optical elements that transfer, or direct light from the scene to the sensor (e.g., adjustable aperture shape, adjustable aperture size, adjustable aperture position, or other), or to filter the light from the scene (e.g. wavelength, polarization, incident angle, incident position of other). The adjustable optical elements may be controlled by control unit 2803.

The camera subsystem 2807 may be a system for capturing images of the scene 2811 using photodetector 2809. The photodetector may comprise a plurality of pixels (e.g., thousands of pixels, or millions of pixels, or billions of pixel, or any other number).

During 3D scanning, the galvanometer-actuated optical scanners may control the position of mirrors and thus the direction of the projected dot of laser light.

In many cases, the position/orientation of camera subsystem and illumination subsystem may be fixed for the lifetime of the system. The illumination subsystem may comprise the controlled laser light deflection system. The baseline may be the distance between camera center and the light deflection system (the position of galvanometer-actuated mirror closest to the scene). The control unit 2803 may control the orientation (angle) of the galvanometer-actuated mirrors by applying time-changing electrical signals. The set of rotating mirrors may deflect the laser beam in different directions, causing a dot of laser light to move to different positions in a scene. The value of the control signal may be continuous and may be any signal between minimal value (correspond to boundary angle of the mirror—$\alpha_{min}$) and maximal value (correspond to second boundary angle of the mirror—$\alpha_{max}$). The angle of each mirror may change from $\alpha_{min}$ to $\alpha_{max}$ in linear fashion proportional to control signal.

The operator may calibrate the system at least once. During the calibration, the operator may use an automatic/semi-automatic calibration process to calibrate internal parameters of the camera.

Figure 29A:
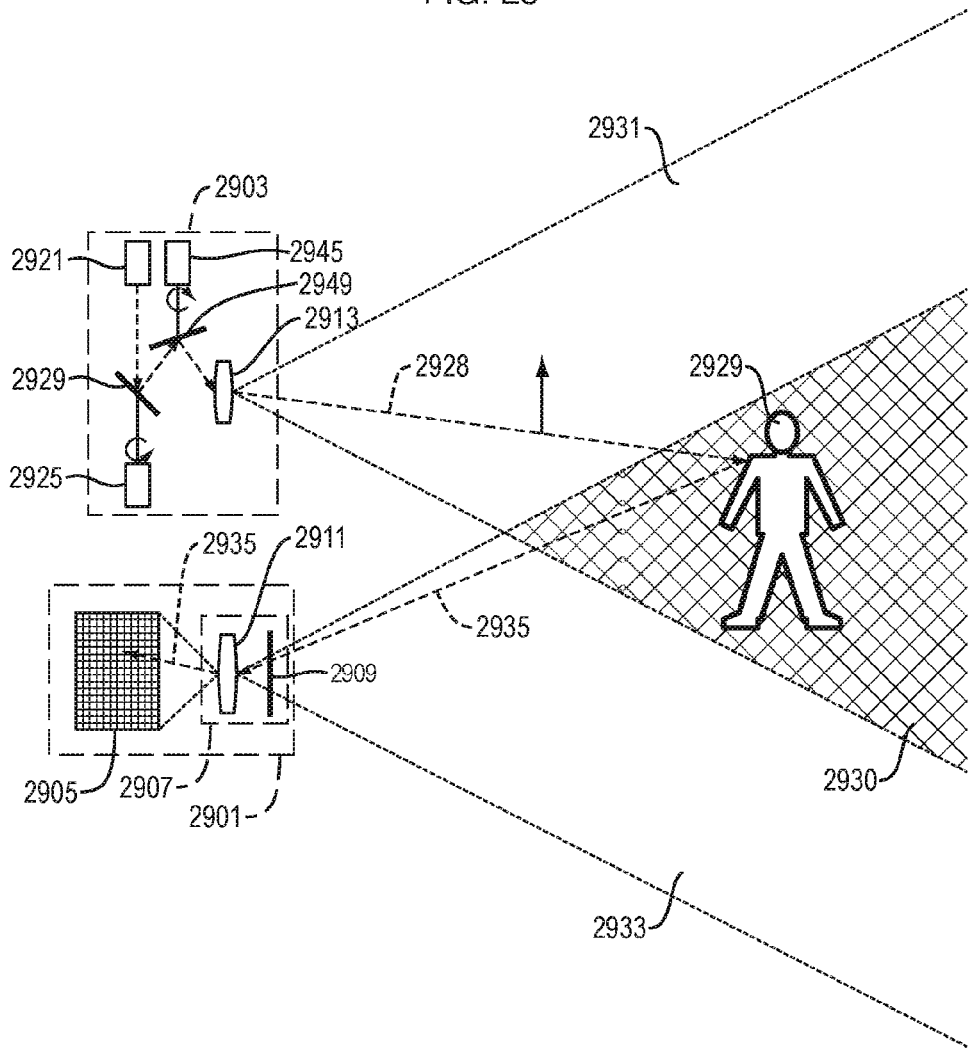
FIG. 29A is a diagram of a 3D scanning system.
Figure 29B:
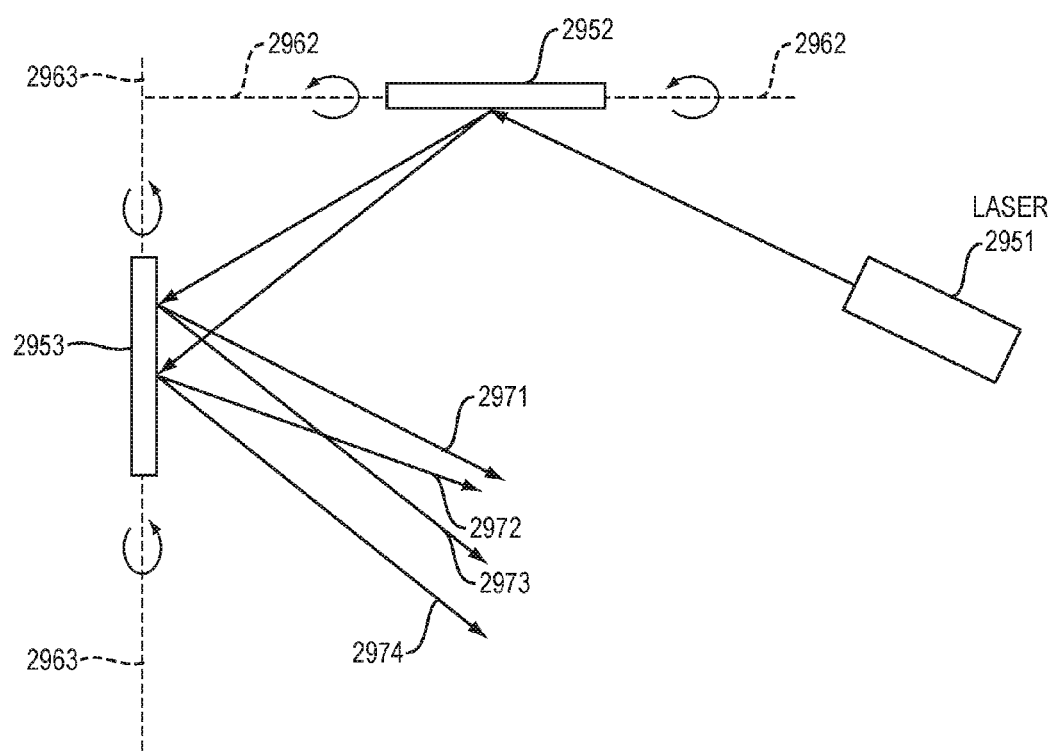
FIG. 29B is a diagram that shows four examples of light paths that may result from rotating two mirrors.

In illustrative implementations, the optical system that is being calibrated may include two rotating mirrors, with axes of rotation that are perpendicular to each other, as shown in FIG. 29B. These two mirrors, by each rotating by different amounts, may deflect the laser beam in different directions. To calibrate the mutual position/orientation of the camera subsystem and the laser beam for all angles $\alpha$ of the first mirror while the second mirror is at a particular angle $\beta$, an operator may perform triangulation. The second mirror may be held steady at a particular angle $\beta$, while the first mirror is rotated through its entire range of angle $\alpha$. While the first mirror is rotated through its entire range of angle $\alpha$ (and the second mirror is held constant at the particular angle $\beta$) the position/orientation may be calibrated in predefined angles $\alpha_i$ (i∈0 . . . n−1; $\alpha_0 = \alpha_{min}$, and $\alpha_{n-1} = \alpha_{max}$). An algorithm may calculate, for every angle of deflection mirror $\alpha_i$, the equation of a vertical plane that is parallel to (and intersects) the laser beam, which equation is $n_{ix}*x+n_{iy}*y+n_{iz}*z+d_i=0$, where x, y, z are Euclidian coordinates in world coordinate space; $n_i$ is the 3D normal vector of the plane (the angle between $n_i$ and $n_{i+1} \leq $πrad), and $d_i$ is the orthogonal distance between the plane and the center of the origin.

The computed equations may be stored in memory. In runtime, the algorithm may compute the equation of the plane for any other $\alpha$ between $\alpha_i$ and $\alpha_{i+1}$ ($\alpha_i < \alpha_{i+1}$) using interpolation. The angle of the mirror may be controlled by linear signal. A computer may calculate the exact plane equation for any $\alpha i$ (the algorithm computes new normal vectors n and d. At first, the computer may use binary search to find indexes i and i+1. The computer may perform an algorithm in which: (a) n lies in same plane as $n_i$ and $n_{i+1}$; and (b) the angle $\sphericalangle$ |n; $n_i$|: $\sphericalangle$ |n; $n_{i+1}$|=|$\alpha-\alpha_i$|:|$\alpha_{i+1}-\alpha$| and $\sphericalangle$ |n; $n_{i+1}$|+$\sphericalangle$ |n; $n_{i+1}$|=$\sphericalangle$ $n_i$; $n_{i+1}$, where (1) the symbol "$\sphericalangle$ |; |" means the angle between vectors, (2) the symbol ":" means the ratio between two real values, (3) the distance d=$d_i$+[($\alpha-\alpha_i$)/($\alpha_{i+1}-\alpha_i$)]*($d_{i+1}-d_i$), (4) the symbol "/" means division of real numbers, and (5) the symbol "*" means multiplication of real numbers.

The calibration procedure described in the previous two paragraphs may then repeated for different angles $\beta$, until calibration has been performed for all combinations of angle $\alpha$ of the first mirror and angle $\beta$ of the second mirror. For each angle $\beta$ of the second mirror, the entire range of angle $\alpha$ of the first mirror may be calibrated, as described above.

During operation, the control unit may control the angle of the deflection mirrors and the modulation signals to individual sets of pixels. The system may work in cycles or frames. One cycle or frame may comprise a setup phase, exposure phase, readout phase, processing phase and output phase. The individual phases may be processed in a pipeline, so that the exposure phase of the current frame is executed simultaneously with the processing phase of previous frame.

During the setup phase, the control unit may prepare the illumination subsystem and the camera subsystem for the upcoming exposure phase. This preparation may include photodetector reset, preparation of modulation signals (from the modulation functions), setting of photodetector exposure, setting the angle of deflection mirror to $\alpha_{min}$, and adjusting the power of the laser. In some implementations, control unit perform other preparatory steps.

During the exposure phase, the control unit may send the signal to illumination subsystem, to turn on the laser source and to change the angle of deflection mirrors. Control unit may change the angle $\alpha$ for each mirror, such that=$\alpha_{min}$+ $(t/T)*(\alpha_{max}-\alpha_{min})$, where T is time of frame exposure in seconds ($0 \leq t \leq T$ s).

In some implementations, the dependency between angle of deflection and the time during exposure is nonlinear.

The control unit may apply superpixel modulation signals to individual pixel sets. For example, in some cases, a 9-bit binary Gray code is used to drive superpixel modulation of individual pixel sets. The 9-bit Gray code may encode 512 discrete codewords $C_{xy}$. The time T may be divided into 512 individual time periods $T_i = <t_i, t_{i+1})$ ($i \in 0 \ldots 511$) of the same duration ($|T_i|=T/512$), so that, in succession of the coding, each time period have its own 9 bit codeword (000000000, 000000001, 000000011, 000000010, . . . ). For example, during the frame, any time t ($t_{hit}$) may fit into some interval $T_i$. During the interval $T_i$, the associate codeword may be used by control unit to modulate response of the pixel sets. The effect of the superpixel modulation (not counting the effect of curtain modulation) may be that the first pixel set is controlled by first bit of the codeword, the second set is controlled by second bit of the codeword, . . . , and the ninth set is controlled by the ninth bit of the associated codeword (for example, if a particular bit is 0, then all pixels in the particular pixel set may be "off", and if the bit is 1, then all pixels in the particular pixel set may be "on"—responsive to light).

The method described here for a 9-bit gray code may be the same as the method for a 5-bit gray code that is shown in FIG. 3, with appropriate modifications for the different number of bits in the code.

During the readout phase, the control unit may send control signals to the camera subsystem to read the image. The image may be sent to the processing unit.

In processing phase, the raw image from the camera may be split into 9 different sub-images. This images may have the same structure as superpixels. The first sub-image may comprise image values captured by the pixels in the first pixel set. The second sub-image may comprise image values captured by the pixels of second pixel set, . . . , the ninth sub-image may comprise image values captured by the pixels of the ninth pixel set. All nine sub-images may have the same resolution. The sub-image matrix P may be an image, where every pixel have 9 values from particular sub-images ($v_1, \ldots, v_9$). The value of the sub-image matrix may be an 9D intensity vector (the components of the vector corresponds to specific sub-image pixel value). Pixels in a superpixel may be in close proximity to each other, such that the individual pixels in the superpixel capture the light from approximately the same area. The centers of the superpixels may be treated as centers of pixels in sub-image matrix (for purposes of geometric computations).

Each pixel in sub-image matrix P may capture light from a part of the scene (either part of the object of interest, or the background of the area of interest). If the illumination module does not illuminate the area of interest, the pixel may capture no light, other than any ambient light. If the illumination module illuminates the area of interest, it may illuminate the area in unknown time t (it is in general a very short period of time due to rotation of the deflection mirrors). In this example, when this (illumination of the area of interest) happens during exposure during a camera frame, $t \in T_i$. In time period $T_i$, the response of the pixel sets of the photodetector may be modulated by i-th codeword. Thus, the light may hit the area of interest in time period $T_i$. In some cases, only a portion of the pixel sets in the active region are "on" based on the bits of the particular codeword. The 9D intensity vector of P may be ($v_1, v_2, \ldots, v_8$). Intensity values that correspond to pixel sets that are "on" during $T_i$ may be higher that a threshold (while they receive the reflected illumination from the area of interest). Intensity values that correspond to pixel sets that are "off" may capture no light, so the values are below the threshold. This binarization by the threshold may create an 9-bit codeword for superpixel modulation. By decoding this codeword (e.g., GrayToBinary in FIG. 4), a computer may calculate the index of the time interval i (Timeslot). Thus, this algorithm may decode the time t with the accuracy of up to T/512 (as the center of the timeslot $T_i$). The codeword 000000000 may be reserved for pixels that were not lit by the illumination subsystem. The 3D coordinate of (0, 0, 0) may be sent to output for such pixels. (Keep in mind that, in many cases, due to curtain modulation which is simultaneously occurring, the entire inactive region of the photodetector is not sensitive to light, and thus the superpixel modulation may have a practical effect only in the active region of the photodetector.)

For the time t, processing units may compute the plane equation of the vertical plane that (i) is parallel to the laser beam, (ii) intersects the laser beam, and (iii) corresponds to the particular angle $\alpha$ of the first deflection mirror and the particular angle $\beta$ of the second deflection mirror. Using this plane equation and data gathered during calibration of the camera subsystem, a computer may compute the intersection of the vertical plane and the pixel ray for the superpixel. The pixel ray is the half-line along which light from the scene travels to the center of the superpixel. The intersection may be a 3D coordinate in world coordinate system, and may be saved as an output value for the particular pixel P. The algorithm may be executed for all pixels of the sub-image matrix.

In output phase, the control unit may send the computed 3D coordinates out of the system.

In an illustrative embodiment of the system, the projector space correspondence may be encoded into code for superpixel modulation. Thus, the 3D coordinate may be computed for every pixel of sub-image matrix, respectively.

FIG. 29A is a diagram of a 3D scanning system, in an illustrative implementation of this invention. The system includes a camera subsystem 2901 and an illumination subsystem 2903.

In some implementations of the system, the illumination subsystem 2903 comprises a laser 2921, two galvanometer-actuated optical scanners (galvos), and lens 2913. The first galvo may comprise a first galvanometer actuator 2925 and a first mirror 2929. The second galvo may comprise a second galvanometer actuator 2945 and a second mirror 2949. During scanning, the first galvanometer actuator 2925 may control the orientation of the first mirror 2929 and the second galvanometer actuator 2945 may control the orientation of the second mirror 2949. Together, the two gyros may control the angle of deflection of a beam of laser light 2928 from the laser 2921. Lens 2913 may be used, for example, to focus a beam. However, lens 2913 is optional. In many cases, illumination subsystem 2903 does not include a lens.

In the example shown in FIG. 29A, a beam of laser light 2928 is projected toward the scene 2929. The beam of laser light 2928 projects a dot of laser illumination on the scene. The scene is within both the illumination subsystem's field of view 2931 and the camera subsystem's field of view 2933. The projected light is reflected 2935 from the objects in the scene or surrounding walls toward the camera subsystem.

In the example shown in FIG. 29A, the illumination subsystem projects the beam of laser light into its field of view. The projected light 2928 is reflected from the scene 2929, and passes though the camera optics 2907. The camera optics 2907 include a filter 2909 and a lens 2911. The reflected light 2935 then falls onto photodetector 2905. The laser light 2928 traverses the same path through the scene during each camera frame. As the laser light 2928 traverses this path during each camera frame, the laser light 2928 illuminates different parts of the scene at different times during each frame, such that each part of the scene is illuminated at least once during each frame.

FIG. 29B is a diagram that shows four examples of light paths that may result from two rotating mirrors, in illustrative implementations of this invention. In the example shown in FIG. 29B, a first mirror 2952 rotates about axis of rotation 2962 and a second mirror 2953 rotates about axis of rotation 2963. Axes 2962 and 2963 may be perpendicular to each other (e.g., horizontal and vertical). By rotating the two mirrors 2952, 2953 to different combinations of rotational positions, the two mirrors, taken together, may deflect light from laser 2951 in different directions in a 3D volume. For example, rotating the set of two mirrors 2952, 2953 may cause a light beam from laser 2951 to deflect from the mirror set in directions 2971, 2972, 2973, 2974, each at a different time.

In illustrative implementations, an illumination system (e.g., 2903 in FIG. 29A and 2951, 2952, 2953 in FIG. 29B) may be employed for curtain modulation. For example, the illumination system may project a beam of light in different directions in a scene at different times, such that a dot of light moves over the scene (e.g., in a zig-zag path) for curtain modulation.

In some embodiments, a mechanical deflection system is used to change the direction of the projected light. For example, in some cases, the deflection system comprises a galvanometer-actuated optical scanner, MEMS mirror or polygonal mirror. In some cases, a sensor for detecting the angle of rotation of the mirror is included in the illumination subsystem. In some cases, control signals for the reflective surfaces (e.g., two mirrors or mirrors in a DMD) specify particular positions of the reflective surfaces. Alternately, a set of mirrors (e.g., two mirrors) may each oscillate, and control signals for the mirrors may specify a periodic oscillation of position of the mirrors.

Figure 30:
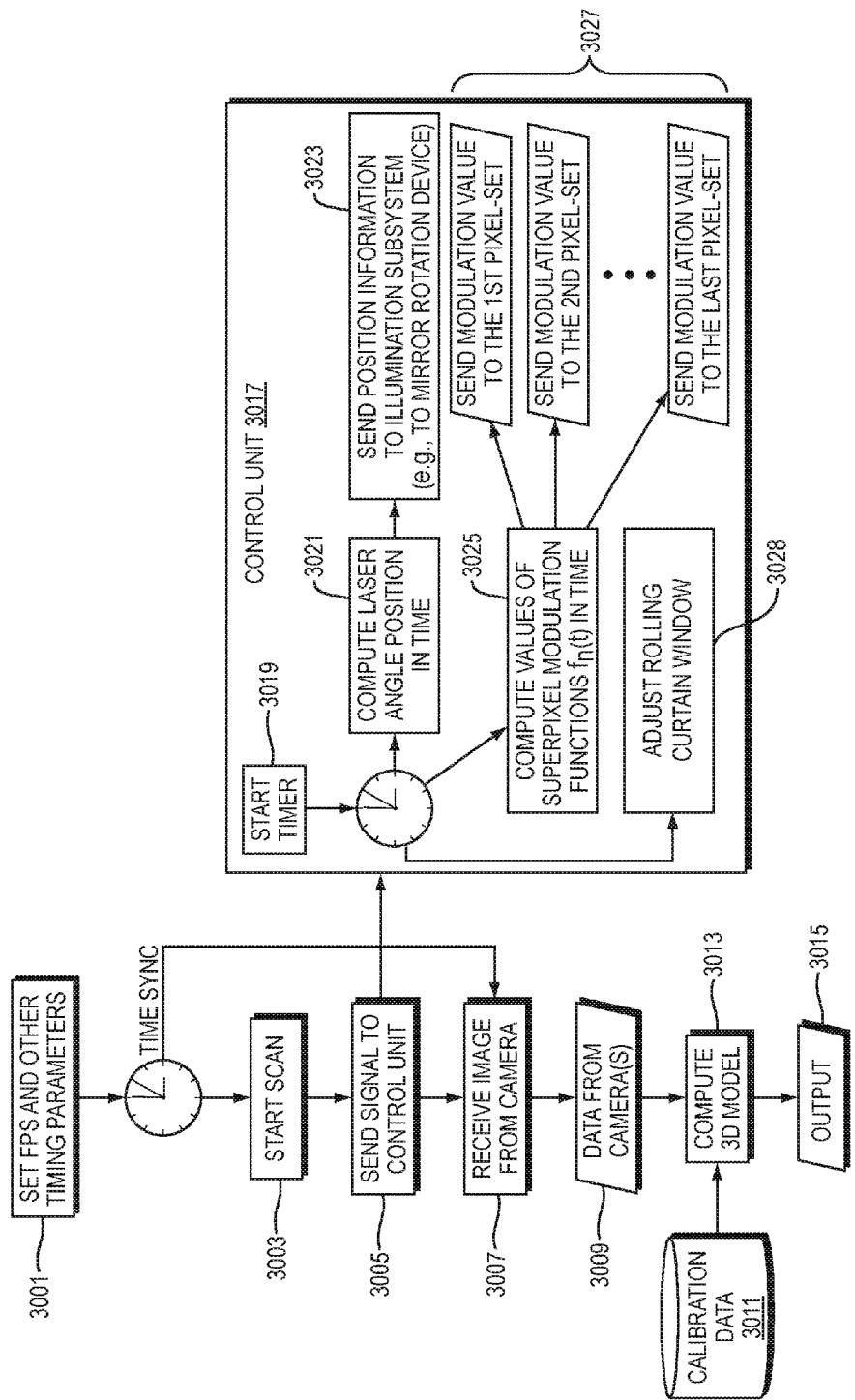
FIG. 30 is a flowchart that shows steps in a method of 3D scanning, in which different pixel sets are separately modulated.

FIG. 30 is a flowchart that shows steps in a method of 3D scanning. In the example shown in FIG. 30, desired timing parameters (such as the number of frames per second) are set. (Step 3001). The timer is activated; it triggers the frame capture at the desired frame rate. (Step 3003). The system sends signals to the control unit (Step 3005). The control unit 3017 has a timer which is started at the beginning of each frame (Step 3019). According to the time provided by the control unit timer, the control unit computes the superpixel modulation for each of the pixel sets (Step 3025) and computes the position information for the illumination subsystem (Step 3021). Superpixel modulation signals are sent to the respective pixel sets (Step 3027). For curtain modulation, a computer calculates adjustments to the rolling curtain window—i.e., calculates changes in position of the active region of the photodetector. These adjustments cause the active region to move repeatedly over the photodetector, such as by making repeated vertical up movements (Step 3028). A positioning signal is sent to the illumination subsystem. For example, this positioning signal may control actuators for rotating mirrors, to control the angle at which a laser beam is deflected, and thus to control the position of a dot of laser light that moves rapidly over the scene for curtain modulation. (Step 3023). At the end of the frame (which is determined by the timer to be in sync with the desired frame rate), a processing unit receives data from the camera (Step 3007). Using the data from the camera 3009 and previously gathered calibration data 3011, a computer calculates a 3D model (Step 3013) and sends it as output (Step 3015).

Figure 31:
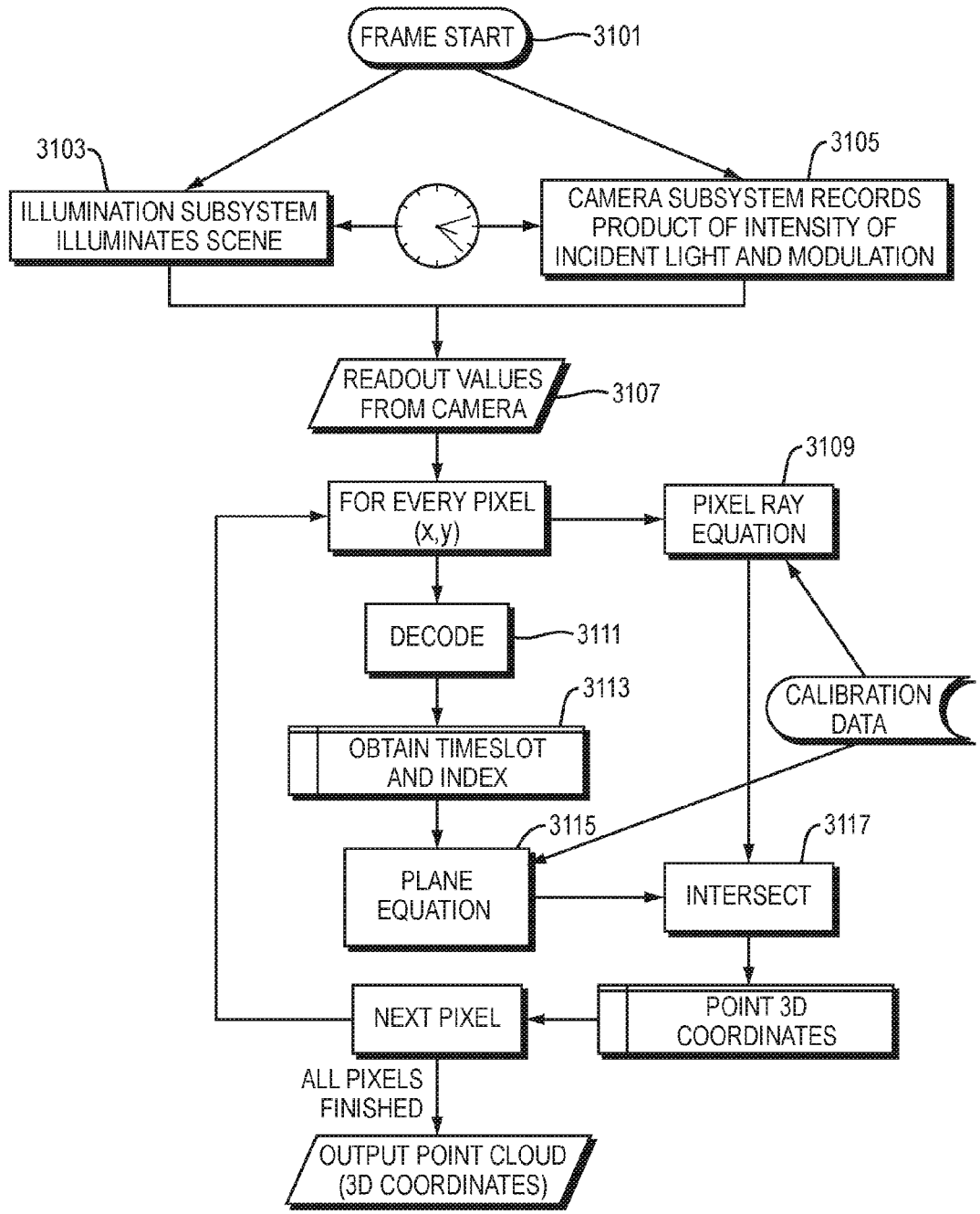
FIG. 31 is a flowchart that shows steps in a method of 3D scanning, in which a timeslot is calculated.

FIG. 31 is a flowchart that shows steps in a method of 3D scanning, in which a timeslot is calculated. In the example shown in FIG. 31, the steps of the method include frame start (Step 3101), illumination (Step 3103), recording intensity 3105, reading values from camera pixels (Step 3107), comparing to thresholds, producing code, decoding (Step 3111), obtaining a timeslot and index (Step 3113), for each given distance at which dots are placed, calculating equation of a plane that best fits a set of dots photographed during various timeslots (Step 3115), computing pixel ray equation, which is the equation of a ray from the center of the camera pixel to the scene 3109, and computing an intersection of these two mathematical equations 3117.

Figure 32:
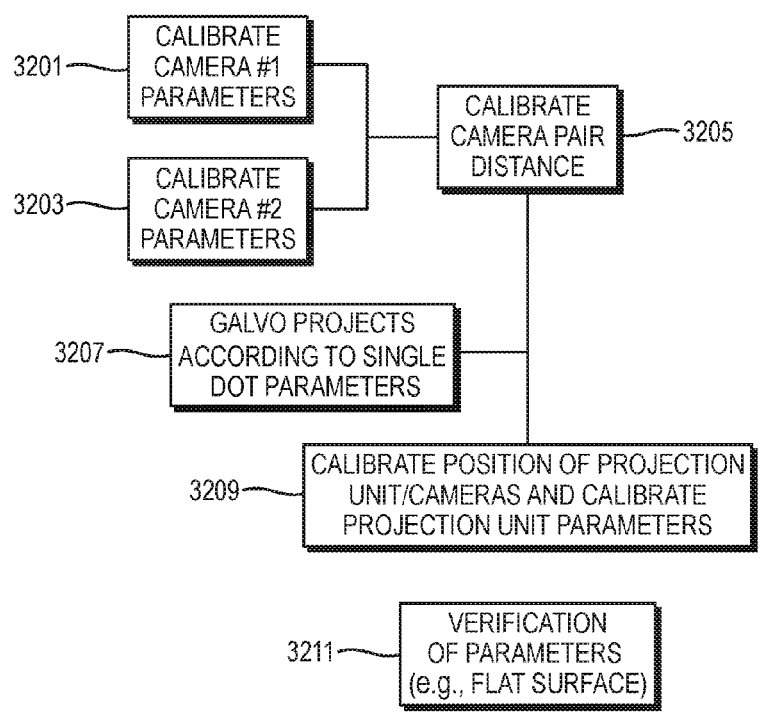
FIG. 32 is a flowchart that shows steps in a method of calibrating an image system.

In illustrative implementations, FIG. 32 is a flowchart that shows steps in a method of calibrating the imaging system, in an illustrative implementation of this invention. The method includes: As a preliminary step, place the camera and projector units into position so as to mechanically align the camera and projection unit as precisely as possible. In some cases, also rigidly attach a temporary second camera to the imaging system. The temporary second camera may be attached adjacent to the projection unit (e.g., above or below illumination subsystem 2903 in FIG. 29A), in order to provide a baseline for calibration. Then calibrate parameters of a first camera 3201. Calibrate parameters of a second camera 3203. Calibrate camera pair distances 3205. Use a galvo-actuated light source to project according to single dot parameters 3207. Calibrate position of the projection unit and cameras and calibrate parameters of the projection unit 3209. Verify parameters (e.g., by 3D scanning a flat surface) 3211. In FIG. 32, the projection unit projects a moving beam of laser light onto a scene. For example, the projection unit may comprise illumination subsystem 2903 in FIG. 29A or laser 2951 and mirrors 2952, 2953 in FIG. 29B.

In some implementations of this invention, a calibration method may include at least some of the steps and features described in the following six paragraphs.

In some cases, parameters of each single camera are determined using a calibration pattern. A precisely printed or etched calibration pattern is placed at different locations in the view of camera. The locations evenly cover the desired range and field of view of the camera. In many cases, the camera takes at least 10 pictures of the calibration pattern. Then a computer runs algorithm on this input to calculate the matrix in standard format, containing the determined parameters of a camera. If the mathematical uncertainty indicated by the algorithm is not below a desired threshold, the process is repeated. This may be repeated for all cameras, one by one.

In some cases, after all cameras are calibrated, the positions of the cameras relative to each other are determined as follows: One camera, the first one (#1), is selected as the primary reference point from which the relative position of other cameras is determined. For each pair of camera #1-camera #x, at least 10 pictures of the calibration pattern, shot from both cameras, are taken. The pattern is placed in different location, facing the cameras, so as to evenly cover the desired range and field of view of the cameras. An algorithm takes the images as an input and computes the relative positions of the cameras. If the mathematical uncertainty indicated by the algorithm is not below a desired threshold, the process of determining the positions of the cameras is repeated with newly taken images.

In some cases, the position and projection parameters of the light source(s) are determined as follows: A flat white object is placed in front of the system, so that the light from the source is reflected and the image of the projected dot can be taken by the cameras. The light source projects a number of single-dot patterns, covering its whole range. The flat white object is then placed in a different distance and the process is repeated. The flat white object is placed in at least 5 positions at different distances so as to evenly cover the desired range of the system.

In some cases, images of the patterns are provided as input for algorithm computing the relative position of the projection unit, and the parameters of the projection (mapping of numeric inputs given to projection unit to the real angle of projected line). In some cases, if the mathematical uncertainty indicated by the algorithm is not below a desired threshold, the process of determining the position of the projection unit and its parameters is repeated with newly taken images.

In some cases, a verification step is performed as follows: The images collected in the previous step are provided to the triangulation algorithm which computes the position of the projected dot. A plane is mathematically computed to be the best fit for the dots taken while the flat white object is at one distance. A next position of the flat white object produces another plane, etc.

In some cases, if the system uses one camera, an additional second camera is temporarily, but rigidly attached to the system. The additional camera is detached after the calibration process is accomplished This invention is not limited by the preceding six paragraphs. For example, calibration may be performed in other ways in this invention.

Here is another non-limiting example of a calibration technique, used in some implementations of this invention. This example is described in the following five paragraphs.

In this calibration example, the calibration parameters consist of an internal part and an external part. The internal properties of the camera include local behavior of projection, the camera matrix and the parameters of lens distortion model. The external properties include the position/rotation of the camera in respect to world coordinate system.

In this calibration example, all parameters are calculated by an automatic or semiautomatic process as follows: The cameras capture known calibration pattern (e.g. FIG. 33) in multiple different positions/orientations (FIG. 34). The automatic algorithm computes the position of the individual circles of the pattern. Each individual circle has encoded the position of its center in pattern coordinate space (in metric coordinates).

In this calibration example, when the system knows the internal parameters of the camera and the position/orientation of the calibration pattern, the position of each individual center of circle (in world coordinate space) is projected to camera coordinate space (projected coordinate). Position of each circle is computed (image coordinate). The reprojection error is the difference between projected coordinate and the image coordinate for each circle.

In this calibration example, the internal parameters of the camera and the position/orientation of calibration patterns are initially unknown. A computer calculates the parameters using an optimization technique to minimize reprojection error for all captured images of calibration pattern (e.g. mean square error).

In this calibration example, after the internal parameters of all cameras are calculated, the same captured patterns are used to determine the position of individual cameras with the optimization technique to minimize reprojection error.

This invention is not limited by the preceding five paragraphs. For example, calibration may be performed in other ways in this invention. For example, calibration may be performed by mechanical aligning components to exact locations.

Figure 33:
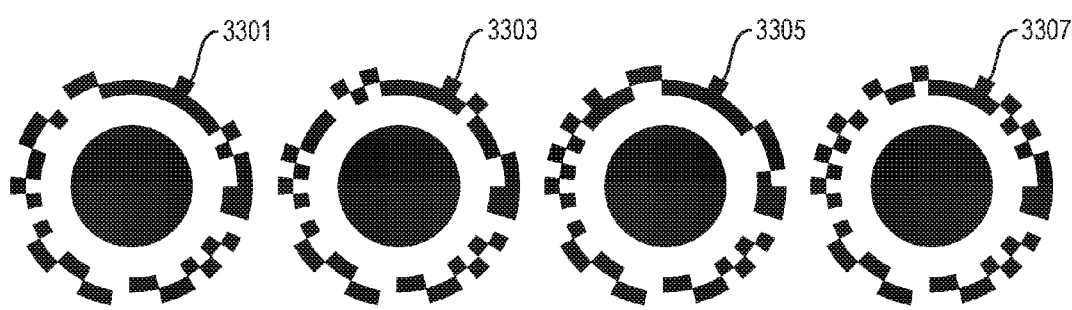
FIG. 33 is a diagram that shows four examples of circles used in an optical calibration pattern.
Figure 34:
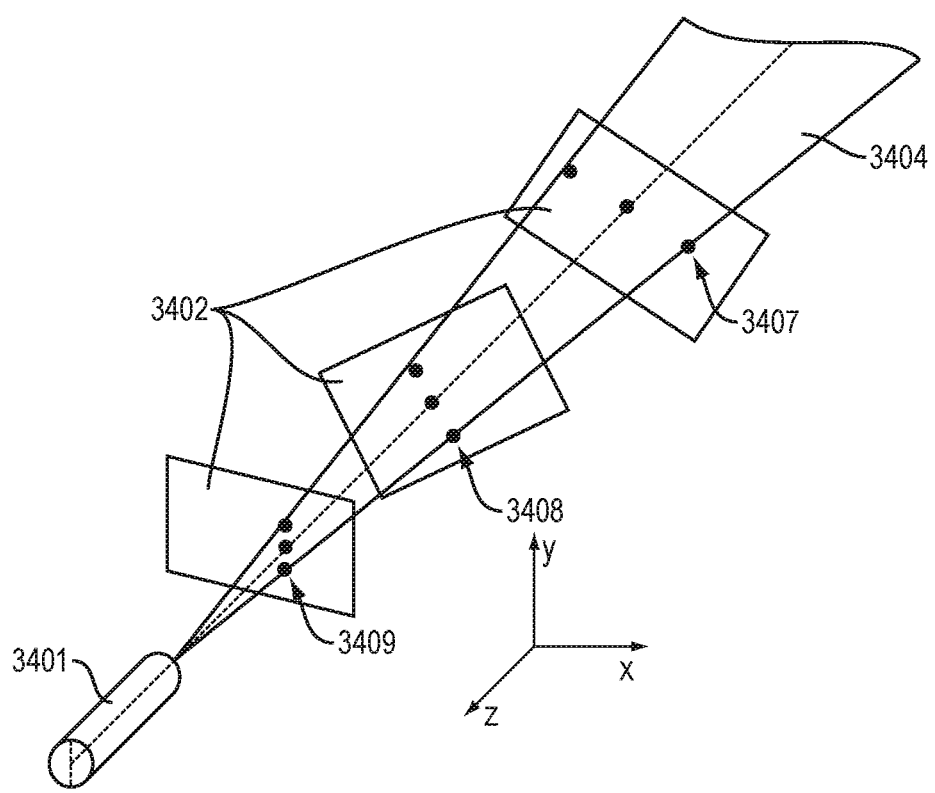
FIG. 34 is a diagram that shows examples of use of calibration patterns.

FIG. 33 is a diagram that shows four examples of circles used in an optical calibration pattern, in an illustrative implementation of this invention. In some cases, an optical calibration pattern comprises a large number of such circles. In FIG. 33, each circle in calibration pattern (e.g., 3301, 3303, 3305, 3307) is encoded with a unique visual code, and thus each circle in the calibration pattern is uniquely identifiable.

FIG. 34 is a diagram that shows an example of a use of a calibration pattern, in an illustrative implementation of this invention. In FIG. 34: (a) a calibration pattern is precisely printed or etched on a planar surface; (b) the calibration pattern is placed at different locations 3402 (one location at a time) in the view of a camera 3401; and (c) the locations evenly cover the desired range and field of view of the camera. In some cases, the camera captures 10 or more pictures of the calibration pattern. In FIG. 34, nine dots (three dots 3407, three dots 3408 and three dots 3409) indicate positions of dots of laser light that illuminated the calibration pattern, one dot at a time, when the calibration pattern was placed at different distances. (In many cases, photos are captured during calibration for more than nine dot positions).

Coordinate System

In some implementations, computations for 3D scanning involve use of coordinate systems. A wide variety of coordinate systems may be used.

The following 10 paragraphs describe a non-limiting example of a coordinate system that is used in some implementations of this invention, for purposes of triangulation and calibration.

In this coordinate system example, the photodetector consists of plurality of pixels (e.g. thousands of pixels, or millions of pixels, or billions of pixel, or any other number). The pixels are arranged in 2D matrix, forming an 2D coordinate system (u, v), which is the image coordinate system. Every position on the photodetector is described by 2 real numbers (u, v)—2D vector from $R^2$. The coordinates lie in interval (<0, U-Resolution, <0, V-Resolution>), where U-Resolution is the horizontal number of pixels in the photodetector, and V-Resolution is the vertical number of pixels in the photodetector.

In this coordinate system example, the image plane is a planar surface and the coordinate system consists of 2 orthogonal axes U and V. In another implementation of the invention, the photodetector is a curved surface.

In this coordinate system example, light reflects from the objects in the scene, passes through camera optics (including, in many cases, a lens) and forms an image on the sensor surface. The image captured by the photodetector has the same coordinate system as the photodetector. The camera has a camera center and the image plane is in front of the camera center. The perpendicular distance between camera center and image plane is equal to the focal distance) of the camera. The line perpendicular to the image plane, which crosses the camera center is the principal axis. The intersection of the principal axis with the image plane is called the principal point (p).

In this coordinate system example, the camera coordinate system is a local Cartesian coordinate system with 3 orthonormal axes. The origin of the coordinate system is in the camera center c. The x-axis has the same direction as the sensor's u-axis, the y-axis has the same direction as v-axis and the z-axis has the same orientation as principal axis). Each camera subsystem has its own Camera coordinate system. The coordinate system of the scene, the World Coordinate System, is a global coordinate system. The coordinate transforms between any camera coordinate system and the world coordinate system are standard coordinate conversions (represented by a coordinate conversion matrix and its inverse transform). The camera coordinate system is the same as camera subsystem coordinate system. The coordinate conversion matrix $R_t$ is $$R_t = \begin{pmatrix} r_{1,1} & r_{1,2} & r_{1,3} & t_1 \\ r_{2,1} & r_{2,2} & r_{2,3} & t_2 \\ r_{3,1} & r_{3,2} & r_{3,3} & t_3 \end{pmatrix}$$

where, $r_{i,j}$ is rotation parameter, and $t_i$ is translation parameter.

In this coordinate system example, the projection from world coordinates to image coordinates is performed as follows. The world coordinate of a point in the scene is $x_h = (x, y, z, 1)^T$—in homogeneous coordinates. World coordinates are converted to camera coordinate space by matrix multiplication, as follows:

$$x = R_t * x_h$$

In this coordinate system example, point x is projected to a normalized image plane (which is located at a focal distance of 1 from the camera center). The coordinates of Point x in the scene, as projected to the normalized image plane, are $$x_n = \Pi * x, \text{ where } \Pi = \begin{pmatrix} 1 & 0 & 0 & 0 \\ 0 & 1 & 0 & 0 \\ 0 & 0 & 1 & 0 \end{pmatrix}$$

In this coordinate system example, to convert to image coordinates $x_i$, the $x_n$ is multiplied by a Camera Matrix A (which represents camera intrinsic parameters)

$$A = \begin{pmatrix} \alpha_x & 0 & x_0 \\ 0 & \alpha_y & y_0 \\ 0 & 0 & 1 \end{pmatrix}$$

$$x_i = A * x_n$$

In this coordinate system example, a transformation E (mapping 2D homogeneous space to 2D homogeneous space) compensates (at least partially) for optical distortion of the lens system. The image coordinate is computed as follows.

$$x_i = A * e[\Pi * (R_t * x_h)]$$

In this coordinate system example, having a specific location of the pixel $x_i$, there exist a bijection between image coordinates of a point $x_i$ and a corresponding normalized coordinates $x_n$, (coordinates on normalized image plane). Having the normalized coordinates $x_n$, there exists an infinite number of points, each projecting to $x_n$ on the normalized image plane. All of these points lie on a half-line (ray). The equation of the half line is $$x = c(x_n - c) * d$$

where x is a vector of coordinates of a 3D point in space, c is a vector of a coordinates of the center of the camera (3D point), $x_n$ is a vector of normalized coordinates of the point $x_i$ and d>0 is a real number equal to the distance (parameter). The symbol "*" is the multiplication of vector by scalar. This relation between 2D image coordinate and the 3D half-line may be called image point/coordinate re-projection. Alternatively, a more complex geometrical model may be used, in which projection of a pixel into space is treated as a distribution function of possible light participation on a final pixel intensity.

In this coordinate system example, a 3D scanning system employs triangulation to determine depth and employs a moving dot of laser light to illuminate the scene. In such a laser triangulation system, the calibration is sometimes performed as follows. The calibration is done in iterations. At first, the method for calibrating the camera subsystem(s) is performed as stated before. For calibrating the surface in the space, which is lit by the laser, calibration pattern comprising of multiple circles (such as 3301, 3303, 3305, 3307) is used. In the process, each of the camera subsystem captures images of the calibration pattern (the white areas comprise a diffuse surface with albedo near 1, the black areas comprise a diffuse surface with albedo near 0.5).

This invention is not limited by the preceding ten paragraphs. For example, other coordinate systems (and other ways of using coordinate systems) may be employed in this invention.

The following three paragraphs describe a non-limiting example of calibration that is used in some implementations of this invention.

In this calibration example, the calibration pattern is printed on a stable planar surface (e.g. on top of glass table). During the exposure of the camera, the mutual position of the camera subsystem(s), the laser and the calibration pattern is fixed. At first, the camera(s) captures the image of a calibration pattern illuminated by ambient light, while the laser is off. From this frame, for every camera, the algorithm computes the equation of plane, which corresponds (during this step of calibration) to the planar surface of the calibration pattern (This part of the process is a sub-part of the camera calibration).

In this calibration example, the position/orientation of all elements of the system stays fixed, while camera(s) take image of the pattern lit by the laser (the laser is turned on before the second exposure). The laser light projects a moving dot of laser light on the calibration pattern. An algorithm analyzes captured images to detect the trajectory of these dots (e.g., by using thresholding and by finding the center of gravity of the intensity values). The trajectory of the dots provides information regarding multiple positions of the calibration pattern. The representation of the trajectory of the dots may be a continuous chain of 2D image coordinates. The algorithm may re-project these coordinates into 3D, which gives a set of half-lines directing from camera center.

In this calibration example, the algorithm computes the 3D intersections of half-lines with the plane of the calibration patterns. These 3D coordinates are stored in memory as the chain (sample), which is a 3D representation of the projection of the laser light. The operator then changes the position of the calibration pattern (in some implementations, a robotic arm automatically changes the position of the calibration pattern), so that the new position of the calibration pattern defines a plane, that is different from all previous. During the calibration process, the operator/robot places the calibration pattern to multiple positions to ensure homogeneous coverage of measured samples in the measurement range of the system. After a sufficient number of samples is captured (at least 2), a geometrical representation of the laser illuminated 3D surface (e.g. ruled surface) is computed by minimizing the error (e.g. mean square distance) of measured sample points and the geometrical representation of the surface.

This invention is not limited by the preceding three paragraphs. For example, other methods and apparatus for calibration may be employed in this invention.

Triangulation

In some implementations, the system computes the 3D position of the surface points in the field of view of the camera subsystem, by using triangulation.

The following four paragraphs describe a non-limiting example of triangulation that is used in some implementations of this invention.

In this triangulation example, for every pixel of the camera, the algorithm computes a pixel ray. The pixel ray is the re-projection (the half-line from the camera center). To compute the exact 3D position along the half-line, the algorithm computes d in the equation using an additional constraint. Specifically, the additional constraint is that the plane and the half-line line going from the camera center through the pixel are never parallel, i.e. there is always an intersection (as discussed below). In some implementations, the distance d is computed directly and substituted into the equation. In some implementations, the distance d is computed from triangulation principle. The additional constraint is either a plane or second half-line where the specific point lies.

In this triangulation example, for the plane as additional constraint (the plane and the pixel's re-projection can not be parallel), the 3D point x for a specific pixel p has to satisfy two criteria:

$$x = c + (x_n - c) * d$$

$$n_p \cdot x + d_p = 0$$

where $n_p$, is a 3D normal vector of the plane, $d_p$ is the Euclidian distance between the plane and the origin of the coordinate system and symbol "." is the dot product of two 3D vectors. To get the exact 3D point x, the algorithm performs an algorithm to compute unknown d:

$$d = (n_p \cdot c + d_p)/(n_p \cdot (c - x_n))$$

where symbol "/" is the division of real numbers.

In this triangulation example, because the line and the plane are not parallel, it follows that $(n_p \cdot c - n_p \cdot x_n)$ is non-zero, and that d exists. A computer calculates x if the d is >0.

$$x = c + (x_n - c) * (n_p \cdot c + d_p)/(n_p \cdot (c - x_n))$$

In this triangulation example, 3D position of a surface points in the scene is retrieved using laser light, camera and triangulation technique. For example, the system shown in FIG. 28 uses laser triangulation. Laser light emits from the illumination subsystem 2801 in form of laser line(s), laser dot(s) or different light shape (e.g. Ruled surface in 3D). The mutual position and orientation of every illumination subsystem and every camera subsystem is known in any time t. In time t, the illumination subsystem emits light on the scene 2811. For every pixel of the camera, if the laser illuminates a part of the scene that is observed by the pixel, the processing unit 2805 computes the 3D position of the illuminated part of the scene. All points illuminated by the laser lies on a defined 3D surface in the scene. The pixel of the camera collects light from a ray. The 3D point lies on intersection of this ray and the surface defined by the laser. In some cases, there is more that one such intersection and the processing unit chose the final 3D position by other regularization criteria.

This invention is not limited by the preceding four paragraphs. For example, other methods and apparatus for triangulation may be employed in this invention.

In some implementations that employ laser triangulation, the simple equation of plane is chosen as the representation of the laser illuminated 3D surface. In this case, the algorithm for plane fitting (based on principal components) may be used.

In some implementations that employ laser triangulation, the mutual position and orientation of the laser and the camera does not change over time. However, the position, and orientation of the laser source could change in time in a well controlled manner (e.g. mechanical change in position, rotation, deflection by mirror). In this case, the calibration may be performed for fixed number of different laser source positions/orientations. The equation of the laser illuminated surface for all other positions/orientations may be computed using sufficient mathematical model and interpolation.

In many implementations that utilize triangulation, profile inspection is performed. In that case, the illumination subsystem may comprise the laser line source. During the measurement, the laser light may illuminate a single profile of the scene, the camera subsystem may capture the projection of the laser light and the algorithm may analyze the image with an approach described above. The 3D points may represent a profile of the measurement.

The triangulation methods described above are non-limiting examples. Other triangulation methods and apparatus may be employed instead.

Multiple Camera Subsystems

In some implementations, the 3D scanning system includes two camera subsystems. For each camera and each pixel, the algorithm may compute time t of the light peak. The values may be stored in time images (in which values oft are encoded by pixel location).

In some implementations: (a) the first camera subsystem is primary; (b) for every pixel of the primary camera, the algorithm computes the pixel re-projection; (c) the corresponding 3D points lies on epipolar lines in the image of the second camera; (d) on the time image of the second camera, the epipolar line cuts the image, which creates a 1D function of time values; (e) the algorithm computes any value on the epipolar line using bilinear interpolation from adjacent pixels; (f) the corresponding projection of the surface point lies on the epipolar line and has the same time t, as the pixel from the primary camera; (g) the algorithm computes the position of the value t in the 1D function (with subpixel accuracy using bilinear interpolation); (h) this position corresponds to pixel position on the second camera; (i) the algorithm re-projects the pixel position as a half-line in 3D; and (j) the algorithm computes the 3D point as an intersection of two half-lines. An advantage of this approach is higher robustness and accuracy, while the geometry calculations are not dependent on calibration of Illumination subsystem Alternative Implementations In some implementations of the system, the system comprises plurality of illumination subsystems. In some implementations of this invention: (a) the features in the scene are formed artificially by an illumination subsystem; and (b) there are different coding strategies that create specific coding for different points in the scene. This allows for more robust and accurate feature detection and position estimation.

In some implementations, this invention operates in multiple modes. One such mode is a high spatial resolution mode ("high-resolution" mode), which uses the same modulation signal for all pixels. In the high resolution mode, pixels from different sets may be combined to produce one high spatial resolution image. In this mode, all pixels in the photodetector may act like one pixel set. In some cases, the ability to switch to this mode allows the scanner to select between real-time (lower resolution) mode and non-real-time (multiple sequential camera frames) high resolution mode for a more precise reconstruction.

In some implementations of the system, the system operates either in realtime mode (with different pixel modulation signals), or in high-resolution mode. In high-resolution mode, the scanning process may comprise multiple exposures and laser sweeps in succession. In every exposure during high-res mode, the control units may apply the superpixel modulation signals to whole photodetector. The multiple pixel values may consist of values captured in succession. This may facilitate rapid computation of the time t of the light peak and of 3D position of points in a scene.

In some implementations of the invention, the system uses different coding strategies to encode the time of pixel illumination alongside Gray codes. In some implementations, the control units creates a set of periodic sinusoidal functions with equal period and different phase shift (e.g. 4 sinusoidal functions shifted by $\pi/2$ rad each after another). The set of modulation function (phase shifting modulation functions) may be applied to appropriate number of image sets (in some cases, multiple image sets are modulated by the same function to collect more samples). The corresponding pixel sets (and the corresponding pixels in every superpixels) may be phase shifting pixels (for the simplicity of description). The number of periods of the modulation functions may increase the possible accuracy of the coding. In many cases, the period of the function is at least 2 times longer that the time period $T_s$ to leave time for the projected laser line to traverse a path (e.g., sweep across a scene).

In some implementations, the system uses 4 sinusoidal functions shifted by $\pi/2$ rad each after another. In these implementations, the values of corresponding phase shifting pixels are A0, A1, A2, A3. The algorithm computes the phase value $\varphi$ using the following equation:

$$\varphi = \text{atan2}(A0 - A2, A1 - A3)$$

$$\text{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases}$$

The time t of the light peak may be calculated as:

$$t = \text{PeriodIndex} * T_{period} + [(\varphi + \pi)/(2*\pi)] * T_{period}$$

where $T_{period}$ is the length of the period of the sinusoidal function, and the PeriodIndex is the index of the period derived from time period $T_i$.

In some implementations, the system uses phase shifting superpixel modulation signals with different periods. For example, the first set of phase shifting modulation signals may have a period of the same length as the exposure T, and the second set may have a period of T/256. The algorithm may decode the phase value of the light peak for both sets. (In some implementations, the phase value of a light peak that occurs at a given photodetector pixel is the time when the laser dot moves across the projection of the given pixel). The second phase value may represent accurate measurement of the time of the occurrence of the light peak (up to the period index). The first phase value may represent unambiguous measurement. Because of the physical limitations of the sensor, the measurement obtained from the first phase value is typically less accurate than the one obtained from multiple periods of phase shifting superpixel modulation signals.

In some implementations, the system uses different modulation functions (e.g. square waves).

In some implementations of the system, each pixel stores charge in multiple storage devices. The modulation signals may control the allocation of the accumulated photo-electrons to different storages. This may allow for capturing multiple phase shifting values in single pixel.

Computers

In exemplary implementations of this invention, one or more electronic computers (e.g. 2803, 2805) are programmed and specially adapted: (1) to control the operation of, or interface with, hardware components of an imaging system, including by controlling sensitivity to light of pixels; (2) to control the generation of curtain modulation signals and superpixel modulation signals; (3) to control transfer of charge in a pixel photodiode to one or more storage devices; (4) to control a reflective or transmissive SLM to control intensity of light incident on photodetector pixels; (5) to control the operation of, or interface with, hardware components of a 3D scanning system, including an illumination subsystem and a camera subsystem; (6) to process data captured by a photodetector; (7) to perform triangulation to reconstruct 3D surface geometry; (8) to perform calibration, including calibration of any camera or light source; (9) to output modulation signals for modifying the response of pixels to incident light; (10) to output control signals to synchronize illumination of a scene with modulation of pixels; (11) to perform any other calculation, computation, program, algorithm, computer function or computer task described or implied above, including any optimization algorithm; (12) to receive signals indicative of human input; (13) to output signals for controlling transducers for outputting information in human perceivable format; and (14) to process data, to perform computations, to execute any algorithm or software, and to control the read or write of data to and from memory devices (items (1) to (14) being sometimes referred to herein as "Computer Tasks". The one or more computers may be in any position or positions within or outside of a 3D scanning system or imaging system. For example, in some cases (a) at least one computer is housed in or together with other components of the system, and (b) at least one computer is remote from other components of the system. The one or more computers are connected to each other or to other components in the system either: (a) wirelessly, (b) by wired or fiber-optic connection, or (c) by a combination of wired, wireless or fiber-optic connections.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more a tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to perform the Computer Tasks.

Definitions

As used herein, the terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"Average percent contribution" is defined in the Summary section above.

To compute "based on" specified data means to perform a computation that takes the specified data as an input.

"Boolean logic" means Boolean algebra.

Here are some non-limiting examples of a "camera": (a) a digital camera; (b) a video camera; and (c) a time-of-flight camera. The term "camera" includes: (a) any computer or circuitry that processes data captured by the camera; and (b) any light source that is under common control with the camera. To say that a light source is "under common control" with a camera means that timing of operation of the light source and timing of operation of the camera are directly or indirectly controlled, at least in part, by the same electronic timer or same computer.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. For example, in some cases, a "computer" comprises: (a) a central processing unit, (b) an ALU (arithmetic/logic unit), (c) a memory unit, and (d) a control unit that controls actions of other components of the computer so that encoded steps of a program are executed in a sequence. For example, in some cases, the term "computer" also includes peripheral units, including an auxiliary memory storage device (e.g., a disk drive or flash memory). However, a human is not a "computer", as that term is used herein.

To say that light is "contributed" by a light source means that the light is from the light source.

"Defined Term" means a term or phrase: (a) that is in quotation marks in this Definitions section; or (b) that is in quotation marks in a patent claim herein.

As used herein, "different" positions of a region (relative to the photodetector) may be partially overlapping as long as they are not identical. As a non-limiting example, if a region comprises three adjacent rows of pixels of a photodetector, then shifting the entire region up one row would cause the region to be in a different position.

To "discharge" or "drain" a charge does not include transferring the charge to a storage device for later readout.

To say that light is "due to" a light source means that the light is from the light source.

"During" a period means during at least a portion of the period.

As used herein, a "dot of light" means illumination of a portion of a scene that is due to collimated light striking the portion of the scene. "Dot of light" does not imply any particular shape or size of a region of illumination.

The term "e.g." means for example.

To say that a rectangular region of pixels in a photodetector is "elongated" means that the aspect ratio of the region is X:Y, where X is the length of the two longest sides of the rectangle and Y is the length of the two shortest sides of the rectangle.

To "emit collimated light" means to produce collimated light, either (a) by emitting collimated light (e.g., by a laser) or (b) by emitting uncollimated light and then collimating the uncollimated light (e.g., by a collimator or a lens).

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

Light that is "from" a light source means light (a) that is emitted by the light source, or (b) that has, after being emitted by the light source (i) reflected one or more times or (ii) been refracted, transmitted or scattered one or more times.

"Herein" means in this document, including text, specification, claims, abstract, and drawings.

"Hero Region" is defined in the Summary section above.

Unless the context clearly indicates otherwise, "high" and "low" values of a signal are Boolean logic values. For example, "high" and "low" Boolean logic values may be physically represented by particular voltage ranges. Which voltage range is assigned to which Boolean logic value is arbitrary. Thus, for example: (a) the Boolean logic value "high" may be represented by a first voltage range; (b) the Boolean logic value "low" may be represented by a second voltage range; and (c) voltages in the first voltage range may be greater than voltages in the second voltage range, or vice versa.

To say that a light source "illuminates" a scene means that the light source illuminates at least part of the scene.

"Illumination system" means a system that comprises one or more artificial light sources. As a non-limiting example, an "illumination system" may comprise one or more lasers, LEDs, or other solid-state light sources that emit light. As used herein, an "illumination system" includes any computers and electrical circuits that control the illumination system.

As used herein: (1) "implementation" means an implementation of the present invention; (2) "embodiment" means an embodiment of the present invention; (3) "case" means an implementation of the present invention; and (4) "use scenario" means a use scenario of the present invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density. Unless the context clearly indicates otherwise, in a ratio of two intensities, both of the intensities have the same SI units.

"Irradiance" means radiant flux received by a surface per unit area. The SI unit of irradiance is watt per square meter (W/m$^2$).

In the case of an imaging system in which attenuation of light that would otherwise strike a photodetector is controllable on a per-pixel basis by an SLM, the terms "irradiance" and "incident" shall—unless the context clearly indicates otherwise—be construed as if: (a) the SLM were not present and did not attenuate any light, and thus (b) all light that would otherwise be blocked by the SLM from reaching the photodetector did reach the photodetector.

"Law of Reflection" is defined in the Summary section above.

"LED" means light-emitting diode.

"Light" means electromagnetic radiation of any frequency. For example, "light" includes, among other things, visible light, infrared light, ultraviolet light, x-ray radiation, and terahertz radiation. Likewise, any term that directly or indirectly relates to light (e.g., "imaging") shall be construed broadly as applying to electromagnetic radiation of any frequency.

"Light source" means a device which (a) includes one or more components (such as lasers or LEDs) that emit light and (b) may optionally include optical elements, such as lens or mirrors, that refract, reflect, collimate or steer light before the light exits the device.

The phrase "logical AND" of X and Y means a Boolean value that is equal to X AND Y, where "AND" in capital letters means the Boolean algebra operator AND.

Unless the context clearly indicates otherwise, "measuring" light does not include accumulating charge in a photodiode, to the extent that the charge (i) is discharged before being read out or (ii) is drained before being read out.

This paragraph clarifies the definition of "measuring" light, in the special context of a photodetector that, during a given period, comprises a first region of pixels that are taking a first set of measurements of light and a second region of pixels that are taking a second set of measurements of light, where the first set of measurements are used to produce a first digital image but not a second digital image and the second set of measurements are used to produce the second digital image but not the first digital image. In this special context, a statement to the effect that "the first region includes pixels that are measuring light, and the second region includes no pixels that are measuring light" during the given period shall be conclusively treated as true, regardless of which region is treated as the first region and which region is treated as the second region.

To say that X is "much less" than Y means that $$X < \frac{Y}{4}.$$

The term "n-ary" is defined elsewhere in this document.

"Percent contribution of the light source" is defined in the Summary.

Two pixels are "neighbors" if the two pixels are positioned such that (i) the two pixels are adjacent to each other and (ii) no pixel is between the two pixels.

Unless the context clearly indicates otherwise, "open" and "closed" values of a signal are Boolean logic values that have the same meaning as Boolean logic values "high" and "low", respectively.

"Optical projection" is defined above.

The term "or" is inclusive, not exclusive. For example, to do A "or" B means to do A, to do B, or to do both A and B. Also, for example, in Boolean algebra: (1) A or B is true if A is true and B is false; (2) A or B is true if A is false and B is true; (3) A or B is true if A is true and B is true; and (4) A or B is false if A is false and B is false.

To say that a first region and a second region "overlap" means that the first region includes at least one point that is in the second region. To say that a first period "overlaps" a second period means that the first period includes at least one time that is in the second period. To say that a superpixel and a pixel set "overlap" means that the superpixel includes at least one pixel that is in the pixel set. To say that a first set "overlaps" a second set means that the first set includes at one member of the second set. To say that a first event "overlaps" a second event means that a first period overlaps a second period, where the first period starts at the beginning of the first event and ends at the end of the first event, and the second period starts at the beginning of the second event and ends at the end of the second event.

In the context of propagation of light, a "path" means a route that light travels.

To say that attenuation of light is controllable on "a per-pixel basis" by an SLM means that the SLM is configured to control attenuation of light on a pixel by pixel basis, such that attenuation for any given pixel may vary over time in a time-varying pattern that is not the same as the time-varying pattern of attenuation for another pixel.

Unless the context clearly indicates otherwise, a "period" means a period of time.

"Photodetector" means a sensor that measures incident light. The following are non-limiting examples of photodetectors: (a) a CMOS (complementary metal oxide semiconductor) sensor, CCD (charge-coupled device) sensor, active pixel sensor, NMOS (N-type metal-oxide-semiconductor) light sensor, photodiode light sensor, phototransistor light sensor, reverse-biased LED light sensor, semiconductor light sensor or other solid state light sensor; or (b) an array of any of the sensors listed in part (a) of this sentence. A non-limiting example of an "photodetector" is a light sensor that includes multiple pixels and that is part of a camera.

"Photodetector plane" means a geometric plane that intersects at least ten pixels in a photodetector.

"Pixel" means a component of a photodetector, which component takes measurements of intensity of light incident on a region of the photodetector, such that the intensity is measured for the entire region and is not separately measured for any subregion of the region.

"Radiant intensity" means the radiant flux emitted, reflected, transmitted or received, per unit solid angle. The SI unit of radiant intensity is watt per steradian (W/sr).

To say that a surface or pixel is "receiving" light at a given time means that the light is incident on the surface or pixel at the given time.

"Reflective SLM" means a device that (i) reflects light from the device, and (ii) attenuates the light, such that the amount of attenuation of a light ray incident at a point on a surface of the device depends on at least the 2D spatial position of the point on the surface.

The term "region" does not imply path-connected (in the topological sense). For example, in FIG. 37, the active region 3601 includes a top portion and a bottom portion, which top and bottom portions are not path-connected (in the topological sense) to each other.

"Responsiveness" of a given pixel means a ratio, the numerator of which is irradiance that is incident at the given pixel and that is sensed by the given pixel, and the denominator of which is actual irradiance incident at the given pixel.

As used herein, the phrase "same path" is construed such that, whether a dot of light that is projected onto a scene travels in the "same path": (a) depends solely on the time-varying angular orientation, relative to an illumination system, of the collimated light that projects the dot of light; and (b) does not depend on the position of the dot of light relative to the scene, including relative to a moving feature in the scene.

"Scene point" means a point in a scene.

As used herein, to say that a sensor "senses" a phenomenon means that the sensor takes a reading, which reading quantifies the phenomenon. For example, to say that a pixel "senses" irradiance at the pixel means that the pixel takes a reading that quantifies the irradiance.

To say that a first signal is "separate" from a second signal means that: (a) the first and second signals do not overlap in time; or (b) the first signal differs in value from the second signal during at least one time at which both signals are occurring. A non-limiting example is that if a first periodic signal has a different phase or frequency than a second periodic signal during at least one time when both signals are occuring, then the first periodic signal is "separate" from the second periodic signal. A set of "separate" signals means a set of signals, such that each signal in the set is separate from each other signal in the set. To say that sensitivity of a first pixel and a second pixel are "separately" modulated or "separately" modified means that: (a) modulation of the first pixel is controlled by a first modulation signal, (b) modulation of the second pixel is controlled by a second modulation signal, and (c) the first modulation signal is separate from the second modulation signal.

As used herein, the term "set" does not include a so-called empty set (i.e., a set with no elements) and does not include a set with only one element. Mentioning a first set and a set does not, in and of itself, create any implication regarding whether or not the first and second sets overlap (that is, intersect).

Non-limiting examples of a "signal generator" include any signal generator, function generator, digital pattern generator, frequency generator and any other electronic device that generates repeating or non-repeating electrical signals, including either digital or analog signals. As used herein, a device that is a "signal generator" includes any computers and electrical circuits that control the device.

"Signal-to-noise ratio" or "SNR" is defined in the Summary section above.

To say that two events are "simultaneous" with each other means that the two events overlap in time. To say that a set of multiple events are "simultaneous" with each other means that each event in the set overlaps (in time) each other event in the set.

"Single-bounce light" and "single-bounce path" are defined above.

"Some" means one or more, except that this definition does not apply to the phrase "at some time".

A "spatial light modulator", also called an "SLM", means an electronically controlled device that (i) transmits light through the device or reflects light from the device, and (ii) attenuates the light, such that the amount of attenuation of a light ray incident at a point on a surface of the device depends on at least the 2D spatial position of the point on the surface.

A "storage device" means any device for storing electric charge, including a capacitor, floating diffusion or capacitive bin.

"Subperiod" of a first period means a part, but not all, of the first period. A "subperiod" is itself a period of time.

"Subregion" of a first region means a part, but not all, of the first region. A "subregion" is itself a region.

As used herein, a "subset" of a set consists of less than all of the elements of the set.

"Substantially" means at least ten percent. For example: (a) 112 is substantially larger than 100; and (b) 108 is not substantially larger than 100. To say that X occurs "at substantially all times" during a period means that X is occurring at all times throughout one or more intervals, which one or more intervals comprise at least 90% of the total time of the period.

"Superpixel" means a set of pixels, such that each pixel in the set is a horizontal, vertical or diagonal neighbor of another pixel in the set.

The term "such as" means for example.

To say that a region "sweeps" through (or over) a set of multiple positions, relative to a photodetector, means that the region moves to each different position in the set of positions, one position at a time. The term "sweep" does not imply any particular order of positions. For example, a "sweep" through (or over) a set of multiple positions, relative to a photodetector, may comprise moving from position to position in the set of positions, such that each movement in the sweep is in the same direction relative to the photodetector. For example, each movement in the sweep may be from a higher to a lower row of pixels in the photodetector. Or, for example, a "sweep" through (or over) a set of multiple positions, relative to a photodetector, may comprise moving from position to position in the set of positions, such that different movements in the sweep are in different directions relative to the photodetector. For example, a first movement in the sweep may be from the highest row of pixels to the lowest row of pixels in the photodetector, and a second movement in the sweep may be from the lowest row of pixels to a middle row of pixels in the photodetector.

In the context of a time period, to say that X is "then" performing an action means that X is performing the action during the time period. For example, in the context of a time period in which a region is at a particular position, to say that X is "then" performing an action means that X is performing the action during the time period.

To say that X occurs "throughout" a period means that X occurs at all times in the period.

"Transmissive SLM" means a device that (i) transmits light through the device, and (ii) attenuates the light, such that the amount of attenuation of a light ray incident at a point on a surface of the device depends on at least the 2D spatial position of the point on the surface.

To say that X happens "while" an event occurs means that X happens during at least a portion of the event.

To say that X occurs "while" a region is located at each respective position in a set of positions means that X occurs during each of multiple time periods, where (a) the number of these time periods equals the number of positions in the set of positions, (b) each time period corresponds to a different position, respectively, in the set of positions, and (c) throughout each time period, respectively, the region is located at one of the positions. For example, if a set of positions consists of only three positions (i.e., a first position, second position and third position), then to say that X occurs "while" a region is located at each respective position in the set of positions means that X occurs during each of three time periods (i.e., during a first time period, during a second time period and during a third time period), where: (i) throughout the first time period, the region is located at the first position; (ii) throughout the second time period, the region is located at the second position; and (iii) throughout the third time period, the region is located at the third position.

The term "xor" or "XOR" means exclusive or. For example: (1) A xor B is true if A is true and B is false; (2) A xor B is true if A is false and B is true; (3) A xor B is false if A is true and B is true; and (4) A xor B is false if A is false and B is false.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

A Defined Term that is set forth in quotation marks in a patent claim herein is merely a symbol that signifies the item that is defined. In the case of a Defined Term that is set forth in quotation marks in a patent claim herein: any word that appears inside the Defined Term itself has no effect on the definition. For example, if "red elephant" were a Defined Term set forth in quotation marks in a patent claim herein, then the word "red" in that Defined Term would have no effect on the meaning of that Defined Term (e.g. it would not imply that the item in question is red). This paragraph does not affect—or create any implication regarding—the meaning of any other Defined Term.

Variations:

In many implementations of this invention, both curtain modulation and superpixel modulation are applied simultaneously. Alternatively, in some cases, curtain modulation (for ambient light suppression) is not performed concurrently with superpixel modulation. In those cases, superpixels do not undergo superpixel modulation while in the active region of the photodetector. Ambient light suppression without superpixel modulation is useful in many scenarios, including some scenarios in which the scene is illumined with light of desired color, intensity, direction, polarization or combinations of these parameters and it is desirable to record reflected light from the illumination, rather than ambient light.

This invention may be implemented in many different ways. For example:

In some implementations, this invention is a method comprising, during a period of time: (a) a first set of signals ("curtain modulation signals") and a second set of signals ("superpixel modulation signals") controlling sensitivity to light of pixels in a photodetector, such that the sensitivity changes over time; and (b) a light source emitting collimated light, such that the direction in which the light is emitted changes over time; wherein (1) during the period (i) the pixels comprise pixel sets and superpixels, such that each superpixel includes at least one pixel from each of the pixel sets, (ii) the superpixel modulation signals modulate the pixel sets, and (iii) the superpixel modulation signal for each pixel set is separate from the superpixel modulation signal for each other pixel set, (2) during the period, the curtain modulation signals cause a first region of the photodetector to sweep through a set of multiple positions, relative to the photodetector, by changing which pixels of the photodetector are included in the first region, and (3) while the first region is located at each respective position in the set of positions, the curtain modulation signals (i) cause the first region to include pixels of the photodetector that are then measuring light, (ii) cause a second region to include no pixels of the photodetector that are then measuring light, which second region comprises all pixels of the photodetector that are not in the first region, and (iii) cause the number of pixels in the first region to be much less than the number of pixels in the second region. In some cases, the frequency of each curtain modulation signal is greater than the frequency of each superpixel modulation signal. In some cases, immediately before and immediately after the first region undergoes a movement relative to the photodetector, the longest dimension of the first region is perpendicular to the direction of the movement. In some cases: (a) a given signal comprises a curtain modulation signal or superpixel modulation signal; and (b) the given signal affects storage of electric charge that accumulates in a pixel. In some cases: (a) a specific signal comprises a curtain modulation signal or superpixel modulation signal; and (b) the specific signal affects attenuation of light that reaches, or would in the absence of the attenuation reach, a pixel. In some cases: (a) at any given time during the period, the superpixel modulation signal for a specific pixel is high xor low and the curtain modulation signal for the specific pixel is high xor low; and (b) during the period, the specific pixel is more sensitive to light when both the curtain modulation signal and the modulation signal are high than when at least one of the curtain modulation signal and the modulation signal are low. In some cases: (a) the sensitivity to light of a specific pixel of the photodetector is controlled by another signal ("sensitivity signal") that is applied to the specific pixel; and (b) during the period, the sensitivity signal (i) is high when the curtain modulation signal for the specific pixel and the superpixel modulation signal for the specific pixel are simultaneously high, and (ii) is otherwise low. In some cases, the set of superpixel modulation signals, taken together, comprise a code, each of the superpixel modulation signals representing a digit of the code. In some cases, a computer calculates 3D spatial coordinates of points in a scene, based (i) on spatial position of one or more pixels of the photodetector that take a measurement of a peak in intensity of light, and (ii) on which permutation of the code occurs when the measurement is taken. In some cases, while the first region is located at each respective position in the set of positions, the curtain modulation signals cause the first and second regions to be located such that a first irradiance is greater than a second irradiance, the first irradiance being average per pixel irradiance due to light from the light source that is incident on the first region, and the second irradiance being average per pixel irradiance due to light from the light source that is incident on the second region. In some cases: (a) the photodetector is part of a camera; and (b) while the first region is located at each respective position in the set of positions, the curtain modulation signals cause the first region to overlap a region of the photodetector which is then receiving light that has traveled directly from the light source to a scene, reflected only once and, after reflecting, traveled directly from the scene to the camera. In some cases: (a) the light source and photodetector are each part of a camera; and (b) while the first region is located at each respective position in the set of positions, the curtain modulation signals cause the first region to overlap a region of the photodetector that is then receiving single-bounce light. Each of the cases described above in this paragraph is an example of the method described in the first sentence of this paragraph, and is also an example of an embodiment of this invention that may be combined with other embodiments of this invention.

In some implementations, this invention is a method comprising, during a period of time: (a) a first set of signals ("curtain modulation signals") and a second set of signals ("superpixel modulation signals") controlling sensitivity to light of pixels in a photodetector, such that the sensitivity changes over time; and (b) a light source emitting collimated light, such that the direction in which the light is emitted changes over time; wherein (1) during the period (i) the pixels comprise pixel sets and superpixels, such that each superpixel includes at least one pixel from each of the pixel sets, (ii) the superpixel modulation signals modulate the pixel sets, and (iii) the superpixel modulation signal for each pixel set is separate from the superpixel modulation signal for each other pixel set, (2) during the period, the curtain modulation signals cause a first region of the photodetector of the photodetector to sweep through a set of different positions, relative to the photodetector, by changing which pixels of the photodetector are included in the first region, and (3) while the first region is located at each respective position in the set of positions, the curtain modulation signals (i) cause the average per-pixel responsiveness of the first region to be greater than the average per-pixel responsiveness of the second region, and (ii) cause the number of pixels in the first region to be much less than the number of pixels in the second region. In some cases, while the first region is located at each respective position in the set of positions, the curtain modulation signals cause the first and second regions to be located such that a first percent is greater than a second percent, the first percent being the average percent contribution of the light source to the first region, and the second percent being the average percent contribution of the light source to the second region. In some cases: (a) the photodetector is part of a camera; and (b) while the first region is located at each respective position in the set of positions, the curtain modulation signals cause the first region to overlap a region of the photodetector which is then receiving light that has traveled directly from the light source to a scene, reflected only once and, after reflecting, traveled directly from the scene to the camera. Each of the cases described above in this paragraph is an example of the method described in the first sentence of this paragraph, and is also an example of an embodiment of this invention that may be combined with other embodiments of this invention.

In some implementations, this invention is a system comprising: (a) a camera that includes a photodetector; (b) an illumination system that is programmed to emit collimated light, such that the direction in which the light is emitted changes over time during a period; and (c) one or more signal generators; wherein (1) pixels of the photodetector comprise pixel sets and superpixels, (2) each superpixel includes at least one pixel from each of the pixel sets, and (3) the one or more signal generators are programmed to generate a first set of signals ("curtain modulation signals") and to generate a second set of other signals ("superpixel modulation signals"), such that (i) during the period, the curtain modulation signals and superpixel modulation signals control sensitivity to light of the pixels, such that the sensitivity changes over time, and (ii) during the period (A) the superpixel modulation signals modulate the pixel sets, (B) the superpixel modulation signal for each pixel set is separate from the superpixel modulation signal for each other pixel set, (iii) during the period, the curtain modulation signals cause a first region of the photodetector to sweep through a set of multiple positions, relative to the photodetector, by changing which pixels of the photodetector are included in the first region, and (iv) while the first region is located at each respective position in the set of positions, the curtain modulation signals (A) cause the first region to include pixels of the photodetector that are then measuring light, (B) cause the second region to include no pixels of the photodetector that are then measuring light, (C) cause the number of pixels in the first region to be much less than the number of pixels in the second region, and (D) cause the first region to overlap one or more Hero Regions. In some cases, the one or more signal generators are programmed to generate the curtain modulation signals and the superpixel modulation signals, such that frequency of each curtain modulation signal is greater than frequency of each superpixel modulation signal. In some cases, the one or more signal generators are programmed to generate curtain modulation signals such that, immediately before and immediately after the first region undergoes a movement relative to the photodetector, the longest dimension of the first region is perpendicular to the direction of the movement. In some cases, the one or more signal generators are programmed to generate the superpixel modulation signals such that: (a) the superpixel modulation signals, taken together, comprise a code; and (b) each of the superpixel modulation signals represent a digit of the code. In some cases, the system further comprises a computer that is programmed to calculate 3D spatial coordinates of points in a scene, based (i) on spatial position of one or more pixels of the photodetector that take a measurement of a peak in intensity of light, and (ii) on which permutation of the code occurs when the measurement is taken. Each of the cases described above in this paragraph is an example of the apparatus described in the first sentence of this paragraph, and is also an example of an embodiment of this invention that may be combined with other embodiments of this invention.

Each description above of any method or apparatus (e.g., each description of curtain modulation, superpixel modulation, modulating sensitivity to light by controlling storage of charge, modulating sensitivity to light by modulating the amount of light that reaches a pixel, calibration, 3D scanning, triangulation, coordinate systems, hardware and software) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The PCT Application and Provisional Application do not limit the scope of this invention in any way. The PCT Application and Provisional Application describe non-limiting examples of this invention, which examples are in addition to—and not in limitation of—the implementations of this invention that are described in the main part of this document. For example, if any given feature described in the PCT Application or Provisional Application is different from, or in addition to, the features described in the main part of this document, this additional or different feature of the PCT Application or Provisional Application does not limit any implementation of this invention described in main part of this document, but instead merely describes another example of this invention. For example, the Provisional Paragraph 12 Feature (defined below) and the PCT Paragraph 121 Feature (defined below): (a) are non-limiting examples of this invention; (b) do not in any way limit this invention; and (c) do not limit the implementations of this invention described in the main part of this document. For example, many implementations of this invention that are described in the main part of this document have neither the Provisional Paragraph 12 Feature nor the PCT Paragraph 121 Feature. As used herein, the "Provisional Paragraph 12 Feature" means the feature (regarding intensity of reflected light from the light beam being greater in at least part of the sensitive region of the imaging sensor than in any other region of the imaging sensor) that is described in Paragraph [0012] of the Provisional Application. As used herein, the "PCT Paragraph 121 Feature" means the feature (regarding the active region may include substantially all of the pixels in the direct reflection region) that is described in Paragraph [0121] of the PCT Application. As used herein, the "main part of this document" means this entire document (including any drawings listed in the Brief Description of Drawings above), except that the "main part of this document" does not include paragraph [0001] of this document which paragraph is titled "Related Applications".

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

The invention claimed is:
1. A method comprising, during a period of time:
 (a) a first set of signals ("curtain modulation signals") and a second set of signals ("superpixel modulation signals") controlling sensitivity to light of pixels in a photodetector, such that the sensitivity changes over time; and
 (b) a light source emitting collimated light, such that the direction in which the light is emitted changes over time;
 wherein
 (1) during the period
  (i) the pixels comprise pixel sets and superpixels, such that each superpixel includes at least one pixel from each of the pixel sets,
  (ii) the superpixel modulation signals modulate the pixel sets, and

(iii) the superpixel modulation signal for each pixel set is separate from the superpixel modulation signal for each other pixel set, (2) during the period, the curtain modulation signals cause a first region of the photodetector to sweep through a set of multiple positions, relative to the photodetector, by changing which pixels of the photodetector are included in the first region, and (3) while the first region is located at each respective position in the set of positions, the curtain modulation signals
   (i) cause the first region to include pixels of the photodetector that are then measuring light,
   (ii) cause a second region to include no pixels of the photodetector that are then measuring light, which second region comprises all pixels of the photodetector that are not in the first region, and
   (iii) cause the number of pixels in the first region to be much less than the number of pixels in the second region.

2. The method of claim 1, wherein the frequency of each curtain modulation signal is greater than the frequency of each superpixel modulation signal.

3. The method of claim 1, wherein immediately before and immediately after the first region undergoes a movement relative to the photodetector, the longest dimension of the first region is perpendicular to the direction of the movement.

4. The method of claim 1, wherein:
(a) a given signal comprises a curtain modulation signal or superpixel modulation signal; and
(b) the given signal affects storage of electric charge that accumulates in a pixel.

5. The method of claim 1, wherein:
(a) a specific signal comprises a curtain modulation signal or superpixel modulation signal; and
(b) the specific signal affects attenuation of light that reaches, or would in the absence of the attenuation reach, a pixel.

6. The method of claim 1, wherein:
(a) at any given time during the period, the superpixel modulation signal for a specific pixel is high xor low and the curtain modulation signal for the specific pixel is high xor low; and
(b) during the period, the specific pixel is more sensitive to light when both the curtain modulation signal and the modulation signal are high than when at least one of the curtain modulation signal and the modulation signal are low.

7. The method of claim 1, wherein:
(a) the sensitivity to light of a specific pixel of the photodetector is controlled by another signal ("sensitivity signal") that is applied to the specific pixel; and
(b) during the period, the sensitivity signal
   (i) is high when the curtain modulation signal for the specific pixel and the superpixel modulation signal for the specific pixel are simultaneously high, and
   (ii) is otherwise low.

8. The method of claim 1, wherein the set of superpixel modulation signals, taken together, comprise a code, each of the superpixel modulation signals representing a digit of the code.

9. The method of claim 8, wherein a computer calculates 3D spatial coordinates of points in a scene, based (i) on spatial position of one or more pixels of the photodetector that take a measurement of a peak in intensity of light, and (ii) on which permutation of the code occurs when the measurement is taken.

10. The method of claim 1, wherein while the first region is located at each respective position in the set of positions, the curtain modulation signals cause the first and second regions to be located such that a first irradiance is greater than a second irradiance, the first irradiance being average per pixel irradiance due to light from the light source that is incident on the first region, and the second irradiance being average per pixel irradiance due to light from the light source that is incident on the second region.

11. The method of claim 1, wherein:
(a) the photodetector is part of a camera; and
(b) while the first region is located at each respective position in the set of positions, the curtain modulation signals cause the first region to overlap a region of the photodetector which is then receiving light that has traveled directly from the light source to a scene, reflected only once and, after reflecting, traveled directly from the scene to the camera.

12. The method of claim 1, wherein:
(a) the light source and photodetector are each part of a camera; and
(b) while the first region is located at each respective position in the set of positions, the curtain modulation signals cause the first region to overlap a region of the photodetector that is then receiving single-bounce light.

13. A method comprising, during a period of time:
(a) a first set of signals ("curtain modulation signals") and a second set of signals ("superpixel modulation signals") controlling sensitivity to light of pixels in a photodetector, such that the sensitivity changes over time; and
(b) a light source emitting collimated light, such that the direction in which the light is emitted changes over time;
wherein
   (1) during the period
      (i) the pixels comprise pixel sets and superpixels, such that each superpixel includes at least one pixel from each of the pixel sets,
      (ii) the superpixel modulation signals modulate the pixel sets, and
      (iii) the superpixel modulation signal for each pixel set is separate from the superpixel modulation signal for each other pixel set,
   (2) during the period, the curtain modulation signals cause a first region of the photodetector of the photodetector to sweep through a set of different positions, relative to the photodetector, by changing which pixels of the photodetector are included in the first region, and
   (3) while the first region is located at each respective position in the set of positions, the curtain modulation signals
      (i) cause the average per-pixel responsiveness of the first region to be greater than the average per-pixel responsiveness of the second region, and
      (ii) cause the number of pixels in the first region to be much less than the number of pixels in the second region.

14. The method of claim 13, wherein while the first region is located at each respective position in the set of positions, the curtain modulation signals cause the first and second regions to be located such that a first percent is greater than a second percent, the first percent being the average percent contribution of the light source to the first region, and the second percent being the average percent contribution of the light source to the second region.

15. The method of claim 13, wherein:
(a) the photodetector is part of a camera; and
(b) while the first region is located at each respective position in the set of positions, the curtain modulation signals cause the first region to overlap a region of the photodetector which is then receiving light that has traveled directly from the light source to a scene, reflected only once and, after reflecting, traveled directly from the scene to the camera.

16. A system comprising:
(a) a camera that includes a photodetector;
(b) an illumination system that is programmed to emit collimated light, such that the direction in which the light is emitted changes over time during a period; and
(c) one or more signal generators;
wherein
(1) pixels of the photodetector comprise pixel sets and superpixels,
(2) each superpixel includes at least one pixel from each of the pixel sets, and
(3) the one or more signal generators are programmed to generate a first set of signals ("curtain modulation signals") and to generate a second set of other signals ("superpixel modulation signals"), such that
(i) during the period, the curtain modulation signals and superpixel modulation signals control sensitivity to light of the pixels, such that the sensitivity changes over time, and
(ii) during the period
(A) the superpixel modulation signals modulate the pixel sets,
(B) the superpixel modulation signal for each pixel set is separate from the superpixel modulation signal for each other pixel set,
(iii) during the period, the curtain modulation signals cause a first region of the photodetector to sweep through a set of multiple positions, relative to the photodetector, by changing which pixels of the photodetector are included in the first region, and
(iv) while the first region is located at each respective position in the set of positions, the curtain modulation signals
(A) cause the first region to include pixels of the photodetector that are then measuring light,
(B) cause the second region to include no pixels of the photodetector that are then measuring light,
(C) cause the number of pixels in the first region to be much less than the number of pixels in the second region, and
(D) cause the first region to overlap one or more Hero Regions.

17. The system of claim 16, wherein the one or more signal generators are programmed to generate the curtain modulation signals and the superpixel modulation signals, such that frequency of each curtain modulation signal is greater than frequency of each superpixel modulation signal.

18. The system of claim 16, wherein the one or more signal generators are programmed to generate curtain modulation signals such that, immediately before and immediately after the first region undergoes a movement relative to the photodetector, the longest dimension of the first region is perpendicular to the direction of the movement.

19. The system of claim 16, wherein the one or more signal generators are programmed to generate the superpixel modulation signals such that:
(a) the superpixel modulation signals, taken together, comprise a code; and
(b) each of the superpixel modulation signals represent a digit of the code.

20. The system of claim 19, wherein the system further comprises a computer that is programmed to calculate 3D spatial coordinates of points in a scene, based (i) on spatial position of one or more pixels of the photodetector that take a measurement of a peak in intensity of light, and (ii) on which permutation of the code occurs when the measurement is taken.

* * * * *